US006647016B1

(12) United States Patent
Isoda et al.

(10) Patent No.: US 6,647,016 B1
(45) Date of Patent: Nov. 11, 2003

(54) COMMUNICATION CONTROL METHOD, COMMUNICATION CONTROL APPARATUS, AND STORAGE MEDIUM

(75) Inventors: Takashi Isoda, Kawasaki (JP); Akihiro Shimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,311

(22) Filed: Dec. 9, 1999

(30) Foreign Application Priority Data

Dec. 11, 1998 (JP) .......................................... 10-353627

(51) Int. Cl.⁷ .............................................. G06K 15/00
(52) U.S. Cl. ....................................... 370/412; 370/414
(58) Field of Search ............................ 710/48; 370/351, 370/412, 414

(56) References Cited

U.S. PATENT DOCUMENTS 5,129,072 A * 7/1992 Larner et al. ................. 710/48

FOREIGN PATENT DOCUMENTS

EP          0 578 013 A1     1/1994

OTHER PUBLICATIONS

Berkema, A., ed., "IEEE 1394 High Speed Bus Imaging Device Communications Specification, Rev. 0.2" 1394 Printer Working Group, Mar. 19, 1998, pp. 1–32.

Ueda S., et al., "Simple High Performance Transport—SHPT (Draft), Rev. 0.4d", Canon Inc., Mar. 31, 1998, pp. 1–19.

* cited by examiner

Primary Examiner—Salvatore Cangialosi
(74) Attorney, Agent, or Firm—Fitzpatrick, Cella, Harper & Scinto

(57) ABSTRACT

To manage each channel of a system connected by multi-channels every channel, an initiator has at least one I/O request queue every channel and a management queue. When the channel is extinguished, a KILL command is assigned to the management queue and transmitted to a target. A management queue agent of the target sends the KILL command to an execution agent of each queue and extinguishes the queues.

28 Claims, 41 Drawing Sheets

FIG. 7B

| Value | SHPT-2 COMMAND |
|---|---|
| 0 | write |
| $1\text{-}3F_{16}$ | reserved for future standardization |
| $40_{16}$ | read |
| $41_{16}\text{-}BF_{16}$ | reserved for future standardization |
| $80_{16}\text{-}BF_{16}$ | service dependent |
| $C0_{16}$ | reserved for future standardization |
| $C1_{16}$ | connect |
| $C2_{16}$ | disconnect |
| $C3_{16}\text{-}FF_{16}$ | reserved for future standardization |

COMMUNICATION CONTROL METHOD, COMMUNICATION CONTROL APPARATUS, AND STORAGE MEDIUM

BACKGROUND OF THE INVENTION

1. Field of the Invention

The invention relates to communication control method and system for connecting equipment such as initiator (host computer) and target (printer or the like).

2. Related Background Art

In recent years, the IEEE1394 interface is being used to connect a computer and peripheral equipment or connect both peripheral equipment. The IEEE1394 interface has a processing speed higher than that of the hand shaking system such as a centronics interface or the like and can perform a bidirectional communication. The IEEE1394 interface is also an interface for a memory bus model and equipment connected by it can read or write data at a designated address from/to partner's equipment.

According to IEEE1394, although a protocol for a physical layer and a link layer to apply it in a wide range is determined, a detailed protocol for each equipment is not decided. Therefore, a protocol for a transport layer such as SBP (Serial Bus Protocol)-2 or the like using IEEE1394 has been proposed as physical/link layers. The transport layer is a layer which provides a data transmitting function for an application. The applications using such a layer can mutually exchange data.

The SBP-2 protocol is a protocol utilizing a feature as a memory bus model of IEEE1394, and the reception side of data can receive the data in accordance with circumstances of itself. On the other hand, as protocols other than SBP-2, there are a protocol which can transmit data which is asynchronously generated and a protocol which can realize multichannels. However, such protocols cannot utilize the feature as a memory bus model of IEEE1394. That is, in case of a communication between a host and a printer, data transmission cannot be performed in accordance with circumstances on the printer side and the host has to perform the data transmission while monitoring a status of the printer.

According to SBP-2, in case of transmitting data, an operation called "login" is first performed on the transmission side, thereby establishing a channel with a communication partner. In this instance, the login side is called an initiator and the partner side connected to the initiator is called a target. The data transmission is performed by reading or writing data from/into a buffer of the initiator from the target in accordance with an instruction from the initiator. In such a system, the initiator forms an ORB (Operation Request Block) in which an address, a size, and the like of the buffer in which the data to be transmitted has been stored have been written and notifies the target of the address of the ORB. The target reads out or writes the data from/to the initiator on the basis of the address and size written in the ORB in accordance with its own circumstances, forms a status block after completion of those processes, and notifies the initiator of states of the processes.

In case of performing a communication by using the SBP-2 protocol established on IEEE1394, particularly, in the case where a data source such as a host computer or the like is used as an initiator and it is applied to a data transmission from the initiator to peripheral equipment such as a printer apparatus or the like as a target, there are the four following problems.

(Problem 1)

A procedure is complicated because of a full duplex communication.

In SBP-2, the data transmission is fundamentally managed by the initiator and the target cannot perform the asynchronous data transmission to the initiator. That is, in SBP-2, when the target wants to transmit data to the initiator, it sends a data reading request to the initiator in an unsolicited status. The initiator forms an ORB in response to it and includes the formed ORB into the end of a list of the pending ORBs (a data transmission request from the initiator to the target and the like are included). Since the ORBs are processed in order from the head, the data is transmitted from the target to the initiator for the first time when the process of the ORB on the initiator side is progressed and the ORB processes in response to the data reading request from the target instead of a timing when the target issues the reading request to the initiator. That is, in the case where the bidirectional asynchronous data transmission cannot be performed and the data to be transmitted from the target to the initiator is asynchronously generated, for example, assuming that the target is a printer, in the case where an error occurs in the printer, or the like, the data to be transmitted immediately to the initiator cannot be momentarily transmitted.

Therefore, for example, to immediately send data which is asynchronously generated from the printer to the host, a login procedure has to be performed by using the printer as an initiator and a data transmission in which the host computer is used as a target has to be performed.

In a situation such that the host computer and the printer mutually login and each of them is the initiator or the target as mentioned above, a process as an initiator and a process as a target have to be provided for both the host computer and the printer. The operation of login has to be also performed by the printer. In a peripheral apparatus such as a printer for handling an image, a large amount of memory resources or processor resources are consumed for image processes. Therefore, costs have to be shaved by simplifying a construction of the apparatuses or resources which are used for applications other than the image processing application have to be saved as much as possible in order to perform the processes promptly. However, as mentioned above, the more often the processes are executed, the larger amount of resources are consumed. This is contrary to the purpose of shaving costs and realization of high efficiency of processes.

As for the relation between the host computer and the printer, data flowing in each direction is correlated as a relation between print data and a processing situation of it. However, if a channel is set by an independent login with respect to each direction, those data and response have to be mutually concerned and it is necessary to newly add a processing procedure for such a purpose.

As mentioned above, it is not proper to apply IEEE1394 and SBP-2 to the communication between the host computer and the printer apparatus as they are. It is difficult to reduce the resources necessary for each apparatus and improve the efficiency.

(Problem 2)

Multichannels cannot be realized.

In recent years, a hybrid apparatus in which various functions are combined as peripheral apparatuses is being used. For example, there is a digital hybrid apparatus or the like such that a facsimile apparatus is used as a scanner unit apparatus, a printer unit apparatus, and a facsimile and can be used from the host computer or the like. When such a hybrid apparatus is used, if a communication is performed through a plurality of independent channels every unit apparatus function, a plurality of functions can be simultaneously used.

In SBP-2, however, since the multichannels cannot be provided, it is difficult to simultaneously use such unit apparatus functions.

Even if the multichannels are realized, only a command called "Abort Task Set" which has been determined in the SBP-2 layer has means for cancelling an error situation such as protocol contravention or the like. According to such a command, all of the ORBs chained to the ORB list are erased and the channel which is operating irrespective of the error situation is also reset. It is impossible to manage the communication path using the channel in which no error occurs or the unidirectional path constructing the channel (for example, in case of a full duplex channel, one channel is constructed by a pair of an upstream path and a downstream path) as a unit.

(Problem 3)

It is impossible to cope with a bus reset.

In IEEE1394, a bus reset occurs when a status change which becomes a cause of a change of a network construction such that new equipment is connected to a 1394 serial bus or the equipment is disconnected or a power source of the connected equipment is turned on or off occurs. The bus reset occurs when a node which detects the status change as mentioned above on the bus transmits a bus resetting signal onto the bus. The generated bus resetting signal is transmitted from one node to another. When all nodes on the network receive the bus resetting signal, a series of operations for the bus reset is performed in each node.

As mentioned above, the bus reset occurs asynchronously with the process in a node on a network. Even in case of a node which is not concerned with a node which becomes a cause of the bus reset with respect to the application, if the bus reset has once occurred, a bus resetting process has to be performed. In the bus resetting step, in the node which performs a communication by SBP-2, the set connection is disconnected. Even if it is re-connected, a guarantee such that the process can be continued from the state just before the bus reset is not given.

Since the initiator transmits commands to the target so as not to exceed the number of commands in each queue, there is a case where commands assured in the queues which are not used are in vain.

SUMMARY OF THE INVENTION

The invention is made in consideration of the above conventional technique and it is an object of the invention to provide communication control method and apparatus which enable a full duplex communication (mutually asynchronous bidirectional communication) to be performed by a login of once and can efficiently use resources such as processes and memories necessary for exchanging data.

Another object of the invention is to provide communication control method and apparatus for realizing multichannels which can be managed on a unit basis of a channel or a path.

Still another object of the invention is to provide communication control method and apparatus which guarantee the continuation of processes from a state just before a bus reset even if the bus reset occurs.

Further another object of the invention is to provide communication control method and apparatus which can efficiently use resources by unitarily managing the number of commands which can be transmitted from an initiator to a target instead of managing it every queue of the target.

Further another object of the invention is to provide communication control method and apparatus in which an initiator dynamically performs an allocation to all of command pool areas of a target in a multiplex path by queues, thereby improving communicating efficiency and resource using efficiency of the target, and the number of command pool areas of the target is increased or decreased in accordance with the number of queues which are used for connection, thereby improving the resource using efficiency of the target.

To accomplish the above objects, according to the invention, there is provided a communication control method of communicating between an initiator connected through a plurality of paths and a target, wherein the initiator uses at least one of the plurality of paths and transmits an erase command of a desired path different from the path to the target, when the erase command is received, the target aborts the communication using the desired path, erases the target side of this path, and sends a response showing this fact to the initiator, and when the response is received from the target, the initiator erases the initiator side of the path as a target of the erasure.

Preferably, when the communication using the desired path is aborted, if the command received from the path is being executed, the target aborts the execution.

More preferably, when the response is received from the target, the initiator erases a command in a process waiting state and erases the initiator side of the path as a target of the erasure.

Further preferably, when the command is transmitted from the initiator through the path in which the target side has been erased, the target informs the initiator of a fact that the destination is incorrect.

There is also provided a communication control method of communicating between an initiator connected through a plurality of paths and a target having a function to erase all commands in the paths by an abort command from the initiator, wherein when the abort command is received from the initiator, the target erases all of the commands in the paths, aborts an execution of a command which is being executed, stores an identifier of the aborted command and a position of data which is not processed yet, erases the command, and sends a response showing this fact to the initiator, when the response is received from the target, the initiator discriminates the presence or absence of an error for each of the plurality of paths, re-transmits the command to which the identifier of the command aborted by the target has been assigned and the subsequent commands to the target with respect to the path having no error, and cancels all of the aborted command and subsequent commands with respect to the path having an error, and when the command transmitted from the initiator is received after the process of the aborted command, the target discriminates whether the command has the same identifier as that of the aborted command or not, and resumes the process of the command from the stored position of the unprocessed data if it has the same identifier.

Preferably, the initiator notifies a requesting source which issued the aborted command of a fact that the command was aborted with respect to the path having an error after the reception of the response from the target, and when a request to re-transmit the command is issued from the requesting source, the initiator issues a command having the same identifier as that of the aborted command to the target.

BRIEF DESCRIPTION OF THE DRAWINGS

FIGS. 7A and 7B are diagrams showing a general format of an ORB;

DETAILED DESCRIPTION OF THE PREFERRED EMBODIMENTS (First Embodiment)

Figure 24:
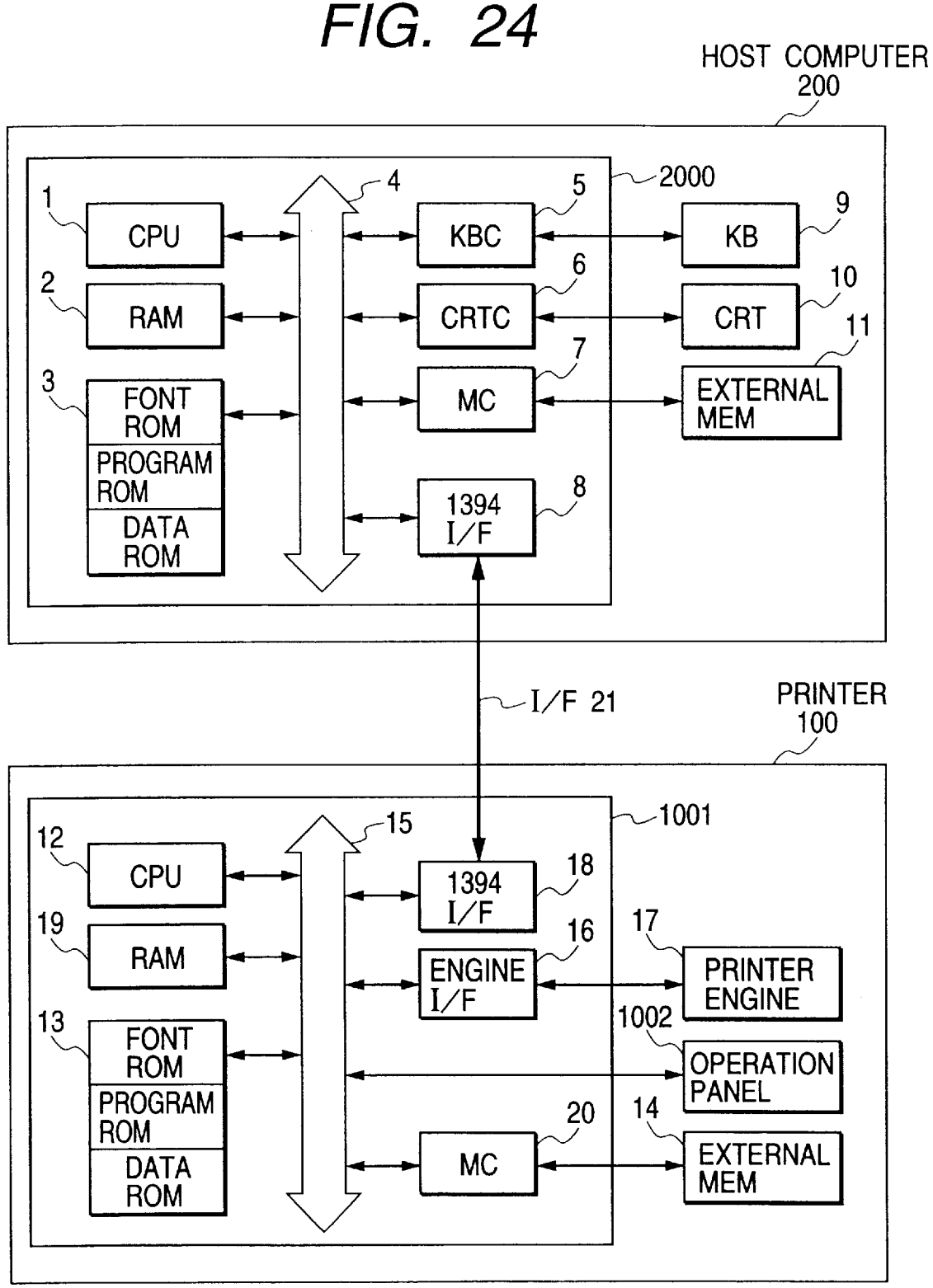
FIG. 24 is a constructional diagram of hardware of a printer system using the IEEE1394 interface.

A printer system in which a host computer and a printer are connected by IEEE1394 and an SBP-2 protocol constructed on IEEE1394 is used and a data transmission is performed in accordance with a protocol (hereinafter, referred to as SHPT-2) according to the invention will now be described as a first embodiment of the invention. FIG. 24 is a constructional diagram of hardware in the printer system.

<Hardware Construction of System>

In FIG. 24, a host computer 200 has a CPU 1 for executing processes of a document in which a figure, an image, characters, a table (including a spreadsheet or the like), and the like mixedly exist on the basis of a document processing program or the like stored in a program ROM of an ROM 3. The CPU 1 integratedly controls each device connected to a system bus 4. A control program and the like of the CPU 1 are stored in the program ROM of the ROM 3. Font data and the like which is used in the document process is stored in a font ROM of the ROM 3. Various data which is used when the document process or the like is executed is stored in a data ROM of the ROM 3. An RAM 2 functions as a main memory, a work area, or the like of the CPU 1.

The programs can be also stored in the RAM 2. A transmission data buffer or a system memory to store an ORB is assured in the RAM 2.

A keyboard controller (KBC) 5 controls a key input from a keyboard 9 or a pointing device (not shown). A CRT controller (CRTC) 6 controls a display on a CRT display (CRT) 10. A memory controller (MC) 7 controls an access to an external memory 11 such as hard disk (HD), floppy disk (FD), or the like to store a boot program, various applications, font data, a user file, an edit file, and the like. A 1394 interface 8 is connected to a printer 100 and executes a communication control process of a communication with the printer 100 in accordance with the IEEE1394 standard. For example, the CPU 1 executes a developing (rasterizing) process of an outline font into a display information RAM set on the RAM 2, thereby enabling WYSIWYG on the CRT 10. The CPU 1 opens various registered windows on the basis of commands instructed by a mouse cursor or the like (not shown) on the CRT 10 and executes various data processes.

In the printer 100, a printer CPU 12 integratedly controls accesses to various devices connected to a system bus 15 on the basis of a control program stored in a program ROM of an ROM 13, a control program stored in an external memory 14, or the like, and outputs an image signal as output information to a printing unit (printer engine) 17 connected through a printing unit interface (engine interface) 16. Various agents, which will be explained hereinlater, a control program for the CPU 12 to realize image processes, and the like are stored in the program ROM of the ROM 13. Font data and the like which are used when the output information is formed are stored in a font ROM of the ROM 13. In case of a printer without the external memory 14 such as a hard disk or the like, information and the like which are used on the host computer are stored in a data ROM of the ROM 13. The CPU 12 can execute a communicating process of a communication with the host computer through a 1394 interface 18 and notify the host computer 200 of information or the like in the printer.

An RAM 19 functions as a main memory, a work area, or the like of the CPU 12 and is constructed so that a memory capacity can be expanded by an option RAM which is connected to an expanding port (not shown). The RAM 19 is used as an output information rasterizing area, an environmental data memory area, an NVRAM, or the like. An access to the external memory 14 such as hard disk (HD), IC card, or the like mentioned above is controlled by a memory controller (MC) 20. The external memory 14 is connected as an option and stores font data, an emulation program, form data, and the like. Switches for operation, an LED display, and the like are arranged on an operation panel 1002. The number of external memories is not limited to 1. The apparatus can be also constructed in a manner such that at least one or more external memories are provided and an option font card in addition to built-in fonts and a plurality of external memories in which programs to interpret printer control languages of different language systems have been stored can be connected. Further, the apparatus can have an NVRAM (not shown) and store printer mode set information from the operation panel 1002.

Although not shown, a finisher having a stapler function, a sorter function, and the like can be also connected.

<Construction of Initiator>

Figure 1:
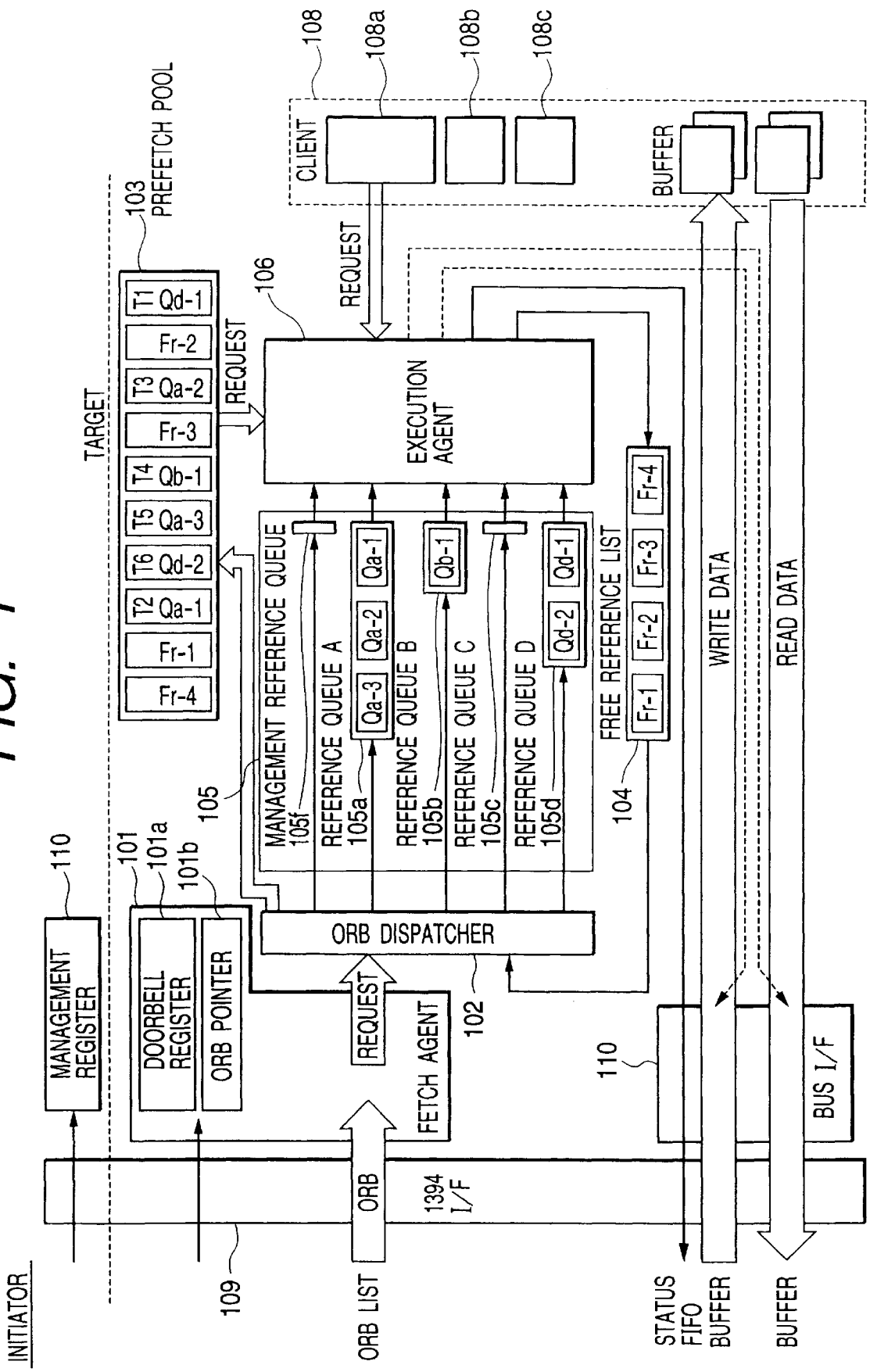
FIG. 1 is a block diagram of a target (printer)
Figure 2:
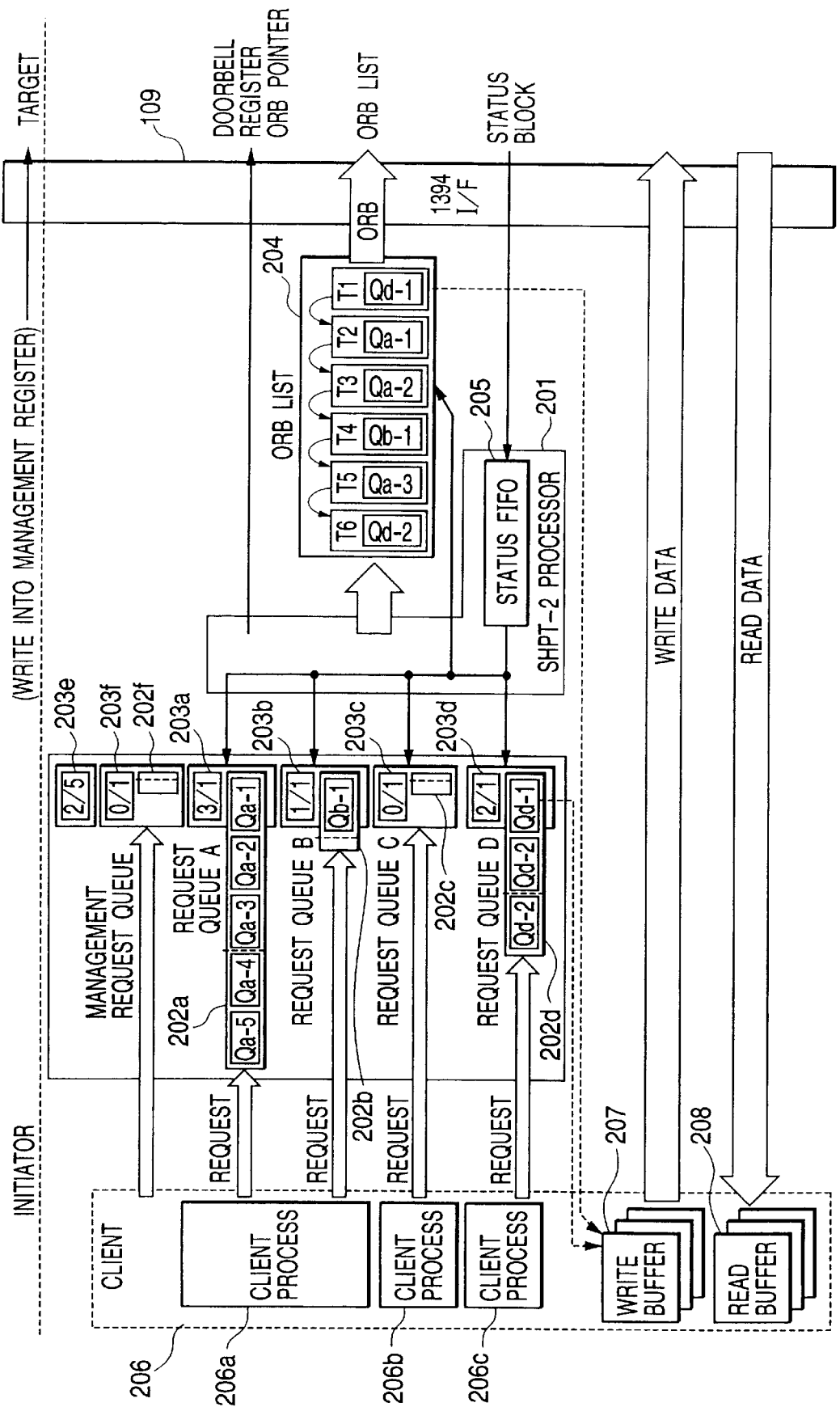
FIG. 2 is a block diagram of an initiator (host computer)

In the foregoing hardware construction, FIGS. 1 and 2 show communication systems in which the printer 100 is used as a target and the host computer 200 is used as an initiator. In the embodiment, those constructions are realized by executing programs by CPUs in the host computer and the printer, respectively. First, the initiator in FIG. 2 will be described.

In FIG. 2, in the host computer as an initiator, a client 206 such as a printer driver or the like issues a data transmission request for a printer through an SHPT-2 processor 201 and receives a response from the printer.

The SHPT-2 processor 201 manages a management request queue, I/O request queues, and ORBs which are formed in the system memory. The client 206 comprises one or a plurality of client processes. The I/O request command from each client process is queued into each I/O request queue which is used for communication of each client process. Although four I/O request queues are shown as an example in the diagram, the number of I/O request queues is not limited to 4. The I/O request queue is dynamically prepared at the time of a connection of a communication of each client process. One or a plurality of I/O request queues are used for communication of each client process.

In the example shown in the diagram, two I/O request queues 202a and 202b are used for communication of a client process 206a. A write request command from the client process 206a is queued into the I/O request queue 202a. A read request command from the client process 206a is queued into the I/O request queue 202b. A state where an asynchronous full duplex communication is performed by those two I/O request queues is shown. Similarly, an I/O request queue 202c is used for communication of a client process 206b. A write request command is queued into the I/O request queue 202c and a unidirectional communication is performed. An I/O request queue 202d is used for communication of a client process 206c. A state where a synchronous semi duplex communication is performed by queueing one or both of the write request command and read request command into the I/O request queue 202d is shown.

Different from the I/O request queue, the management request queue is formed at the time of login to the initiator. A forming procedure itself is substantially the same as that of an I/O request queue, which will be explained hereinlater. The management request queue is a queue provided to manage the I/O request queue. A management path is constructed by a pair of the management request queue and a management reference queue, which will be explained hereinlater. The management request queue is used to process a specific request for the other I/O request queue. An example of using the management request queue will be described hereinlater. The I/O request queue and the management request queue are managed by a queue management agent (not shown).

ORB is a block in which an address, a size, and the like of a data buffer which are sent from the host computer as an initiator to the printer as a target or from the printer to the host computer have been stored. The blocks are sequentially linked to an ORB list 204 from the head ORB. With respect to the ORB, there are the following processing rules.

(1) ORBs are formed in order from a command extracted from the head of each I/O request queue and included to the end of the ORB list. The order of including the commands to the end of the ORB list is not particularly limited. It is also possible to allocate a priority order to each I/O request queue and allocate the command at the head of a specific I/O request queue preferentially to the end of the ORB list.

(2) The ORBs are sequentially fetched from the head of the ORB list. When a completion notice (status block) is received, the ORB corresponding to the status is removed from the ORB list.

(3) The upper limit of the number of ORBs which are linked is the same as a capacity (also including commands which are being processed as well) of a prefetch pool in a target, which will be explained hereinlater.

By the above items (1) and (2), it is guaranteed that the I/O request of each I/O request queue is issued to the target in generating order in each I/O request. By the above item (3), it is guaranteed that the I/O request in the ORB list is sent to the target. To realize the item (3), the SHPT-2 processor 201 prepares one counter for each request queue and one counter for the prefetch pool, respectively.

A counter for each I/O request queue is a counter called Current-QUE. In the example shown in the diagram, four Current-QUE counters 203a, 203b, 203c, and 203d for four I/O request queues and a counter 203f for the management queue are shown. In each Current-QUE counter, the number of reserved areas in the prefetch pool allocated to the respective I/O request queues is held in the denominator (right side). The number of commands (in the current ORB list) belonging to the I/O request queue is held in the numerator (left side).

The example in the diagram shows a state where the number of reserved areas in the prefetch pool allocated to the I/O request queues is equal to "1" and the numbers of commands (in the current ORB list) belonging to the I/O request queues 202a, 202b, 202c, and 202d and the management queue 203f are equal to "3", "1", "0", "2", and "0" respectively.

A counter for the prefetch pool is a counter 203e called Current-POOL. The total number ("1+1+1+1+1"="5") of the numbers of reserved areas in the I/O request queues and the management queues is subtracted from the total number "10" of areas in the prefetch pool and a resultant value "5" is set to the denominator (right side). This counter indicates the number of free areas in the prefetch pool other than the reserved areas allocated to the I/O request queues.

The number "2" of areas which can be lent to the request queues is set to the numerator (left side). Specifically speaking, among the values of the counters 203a to 203d in which the numerator is larger than the denominator, in this case, the values of (the numerator−the denominator), namely, (3−1=2, 2−1=1) of the counters 203a and 203d are calculated. A value "3"obtained by adding "2" and "1" calculated from the number "5" of free areas in the prefetch pool other than the reserved areas allocated to the I/O request queues is subtracted from "5" of the denominator. A resultant value "2" is set to the numerator.

The example in the diagram shows a state where the number of free areas in the prefetch pool other than the reserved areas allocated to the I/O request queues is equal to "5".

The total number of areas in the prefetch pool is held by the equipment as a target. This value is read out from the target at the time of login or the like and stored into the initiator.

The example in the diagram shows a state where the total number of areas in the prefetch pool is equal to "10". The number (in the current ORB list) in the Current-QUE counter associated with the I/O request queue is increased or decreased in accordance with the formation and deletion of the ORB.

Upon formation of the ORB, if the current value in the Current-QUE counter, namely, the number (in the current ORB list) of commands does not exceed the number of reserved areas in the prefetch pool allocated to the I/O request queues at the initial stage, the number in the Current-QUE counter is increased and the ORB is added into the ORB list. Otherwise, a check is made to see if the number in the Current-POOL counter is equal to or larger than "1". If it is equal to or larger than "1", the number in the Current-POOL counter is decreased, the number in the Current-QUE counter is increased, and the ORB is added into the ORB list. If the number in the Current-POOL counter is already equal to "0", the ORB is not added into the ORB list.

Upon deletion of the ORB, when the current value in the Current-QUE counter, namely, the number (in the current ORB list) of the commands exceeds the number of reserved areas in the prefetch pool allocated to the I/O request queues at the initial stage, the number in the Current-POOL counter is increased. In any case, the number (in the current ORB list) in the Current-QUE counter is reduced.

When the ORB is formed, a predetermined value is written into a register called a doorbell register on the target side or the address of the ORB at the head of the list is written into a register called an ORB pointer, thereby notifying the target of the generation of the ORB. If the ORB has already been added to the end of the ORB list which is being executed by the target, the predetermined value is written into the doorbell register. When the head ORB is newly formed in a state without an ORB list, the address is written into the ORB pointer. This procedure is specified in SBP-2.

The SHPT-2 processor 201 includes a status FIFO 205. The status received through a 1394 interface 109 is processed by the SHPT-2 processor 201. The SHPT-2 processor 201 removes the ORB corresponding to the received status from the ORB list 204 and removes the command corresponding to the removed ORB from the I/O request queue.

To perform the management of the SBP-2 layer, the command can be written from the initiator to the management register of the target. Since this writing is specified in the SBP-2 and is out of a management range of the SHPT-2 layer, its detailed description is omitted. The writing to the management register is used for management of SBP-2.

The host computer as an initiator has the functional construction as mentioned above.

<Construction of Target>

FIG. 1 is a block diagram showing a functional construction of the printer as a target. In FIG. 1, a doorbell register 101a is a register in which a value is written by the initiator and shows that the ORB has newly been formed. The address of the newly formed ORB is written into an ORB pointer 101b by the initiator. When the value is written into the doorbell register 101a, a fetch agent 101 reads out the ORB shown by the ORB pointer through the 1394 interface 109. An ORB dispatcher 102 extracts a pointer from a free reference list 104, stores the command of the ORB read by the fetch agent 101 into free areas (Fr-1 to Fr-4) in a prefetch pool 103 shown by the pointer, and connects the pointer to the end of the reference queue in accordance with a "QueueID" field, which will be explained hereinlater, of the relevant ORB.

The example in the diagram shows a state where four reference queues 105a, 105b, 105c, and 105d and a management reference queue 105f exist. The number of reference queues is not limited to 4. The reference queues are dynamically prepared when a communication of each client process is connected. One or a plurality of reference queues are used for communication of each client process.

An execution agent 106 fetches the commands queued into each reference queue from the head, performs the writing of data into the buffer of the initiator, the reading of the data from the buffer of the initiator, or the like in accordance with commands, and after that, returns a normal status to the host computer.

In the execution agent 106, one execution thread can independently schedule and execute the processes for all of the reference queues so as not to be blocked by the processes of the other reference queues, or the threads can be scheduled and executed by another execution thread every reference queue. Or, a combination of those executing methods can be used. The execution agent 106 writes the data into the buffer of the initiator designated by a read command in the prefetch pool which is referred to by the reference queue 105b in response to a data transmission request from a client process 108a such as a rasterizer or the like for interpreting, for example, a PDL and forming raster data. Since the data transmission request is generated asynchronously with a write command or a read command from the initiator, the initiator always queues the read command into the prefetch pool which is referred to by the reference queue 105b by the read command ORB. The target can send the data to the initiator any time so long as the read command is queued in the prefetch pool which is referred to by the reference queue 105b. A bus interface 110 is an interface for accessing from the printer 100 as a target to a desired memory location in a system memory 208 of the host computer 200 as an initiator.

A management register 111 is a register to write the management ORB as a command from the initiator. This management ORB is processed by a management register execution agent. An AbortTaskSet command, which will be explained hereinlater, and the like are written into this register.

The constructions and operations of the initiator and target have been simply described above. The detailed contents of the ORB will be first explained prior to describing them further in detail.

<Contents of Command ORB (Operation Request Block)>

Figure 7A:
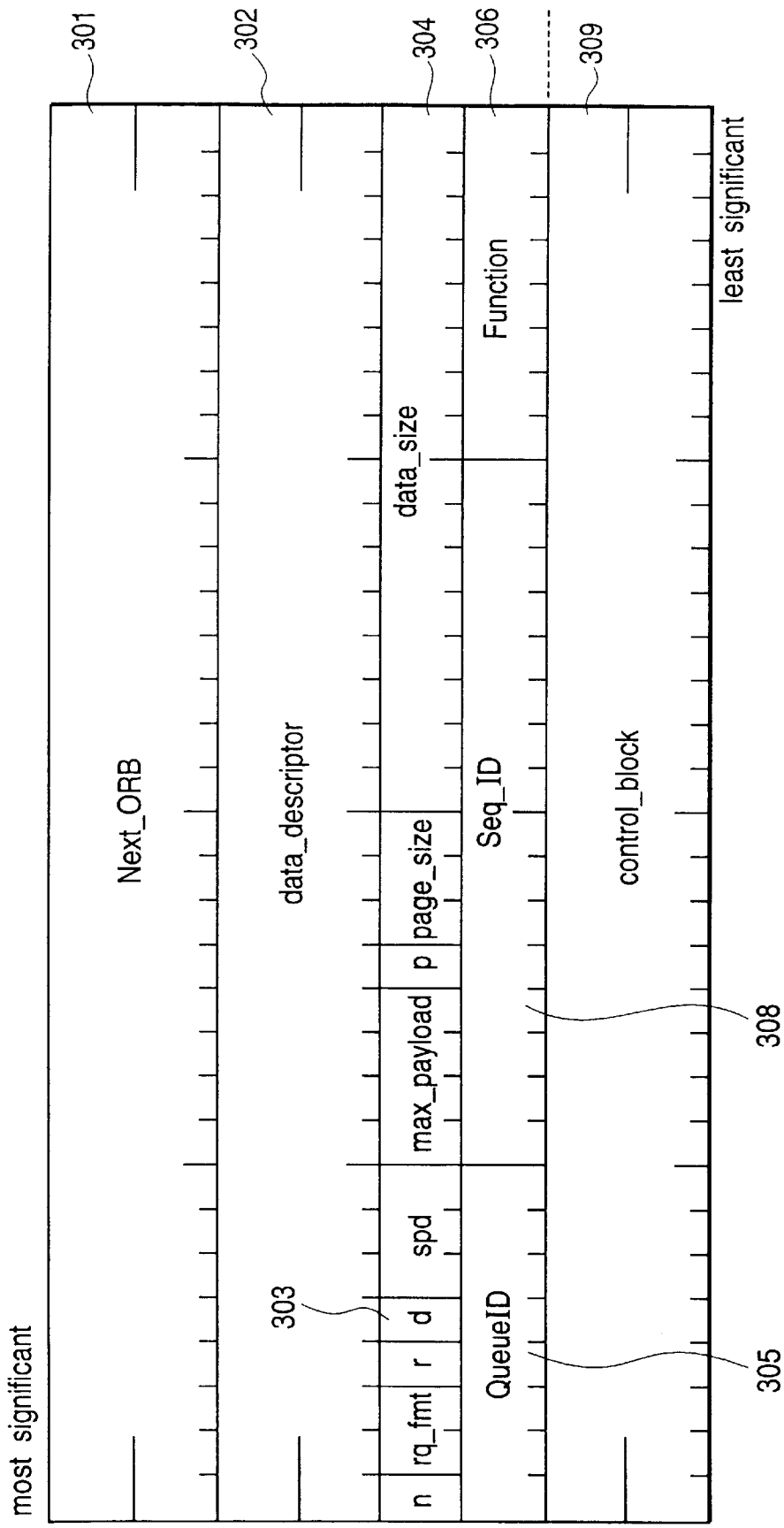

FIGS. 7A and 7B are diagrams showing a general construction of the ORB. In FIG. 7A, a "Next_ORB" (link) field 301 is a link to the next ORB.

When there is not the next ORB, a predetermined value showing the absence of the next ORB is inserted. The head ORB is shown by a predetermined address register.

A "data_descriptor" field 302 shows an address in a data buffer. A "d" (direction) field 303 shows a data transmission (0: write) from the host computer to the printer or a data transmission (1: read) from the printer to the host computer. A "data_size" field 304 indicates a size of data buffer shown by the address field 302. The fields (also including fields which are not described yet) locating above a dotted line in the diagram are the fields specified by SBP-2 and fields 305 to 308 which will be described from now on are fields which are used for processes peculiar to SHPT-2.

The "QueueID" field 305 indicates an ID of a reference queue which is used. The "function" field 306 indicates a kind of ORB as shown in FIG. 7B. 0H indicates the write command. 40H indicates the read command.

The "seq_ID" (sequence ID) field 308 indicates a sequential identifier which is allocated every reference queue in forming order of the ORBS. In the embodiment, the identifier is given so as to increase each time the ORB is formed.

After the "seq_ID" field increases to the maximum value, it is returned to "0" in the next increase. A counter which gives a value to the sequence ID field and serves as a reference is provided in a region where it is not influenced by the bus reset or another obstacle. This is because the processes are performed in the target while increase performance of the sequence ID is used as a prerequisite. Various values are inputted into a control block field 309 in accordance with the value in the function field 306 or a function which is realized by the target for each function. The address and size of the buffer are obtained at the time of formation of the ORB from the command inputted in the I/O request queue.

The contents of the ORB will now be described every function.

(Write Command ORB)

Figure 8:
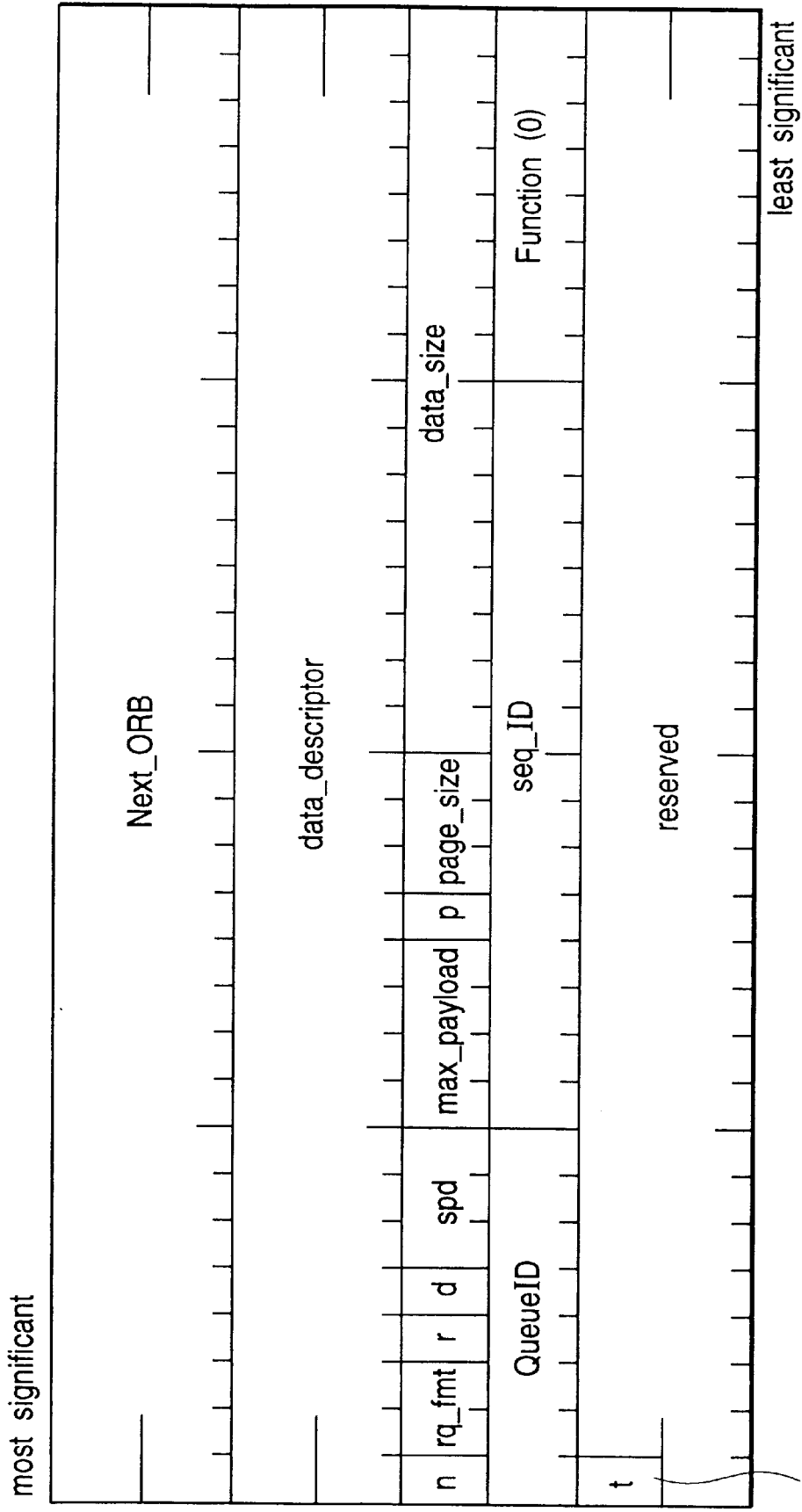
FIG. 8 is a diagram showing a format of a write command ORB.

FIG. 8 shows a write command ORB of a function=0H. This command is a command to send the data in the designated buffer from the initiator to the target. A value in the function field is equal to "0H". The "t" (tag) bit 307 shows a data tag.

(Read Command ORB)

Figure 9:
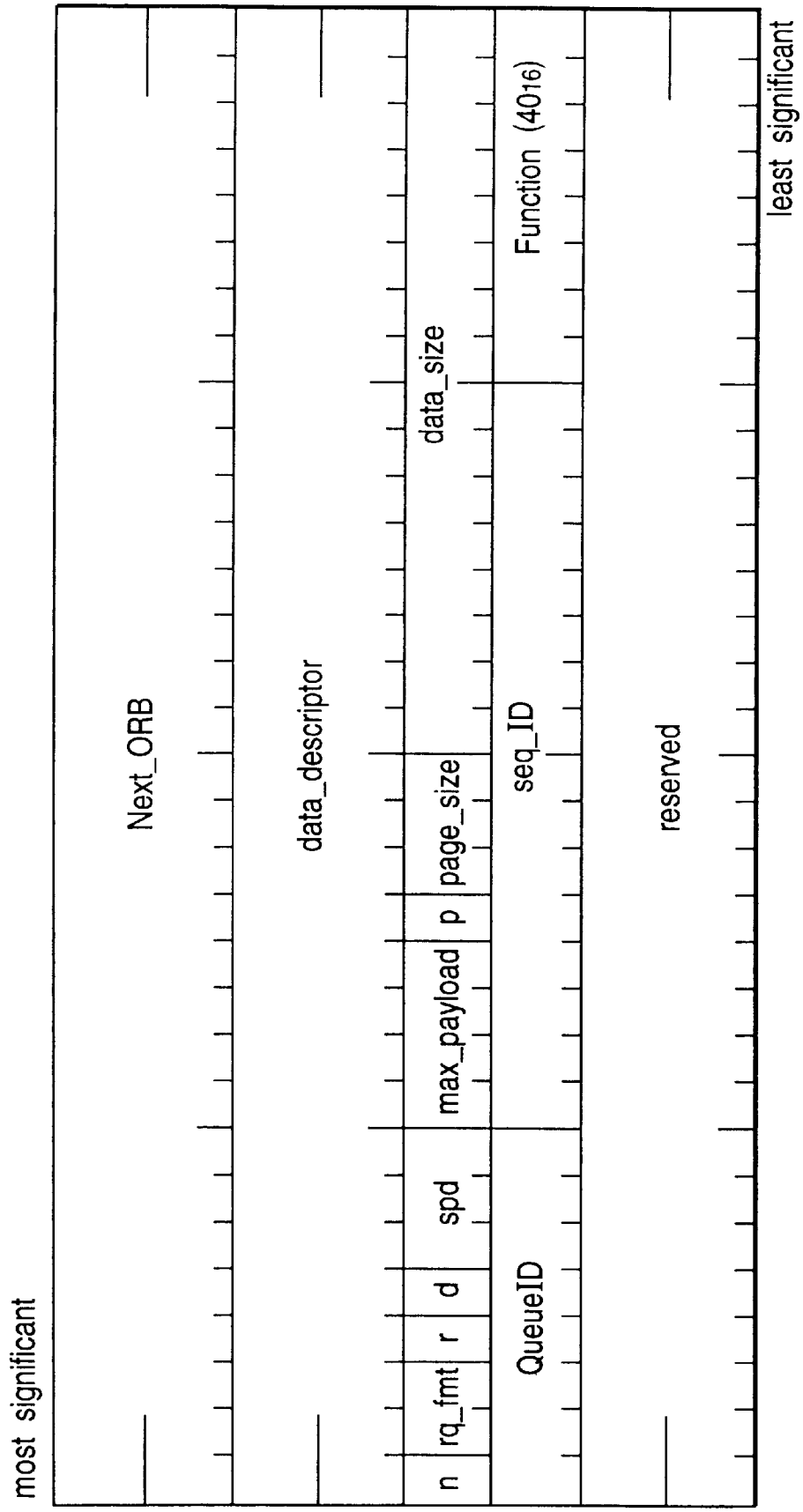
FIG. 9 is a diagram showing a format of a read command ORB.

FIG. 9 shows a read command ORB of the function=40H.

This command is a command to read out the data from the target by the initiator. A value in the function field is equal to 40H.

(Connection Command ORB)

Figure 10:
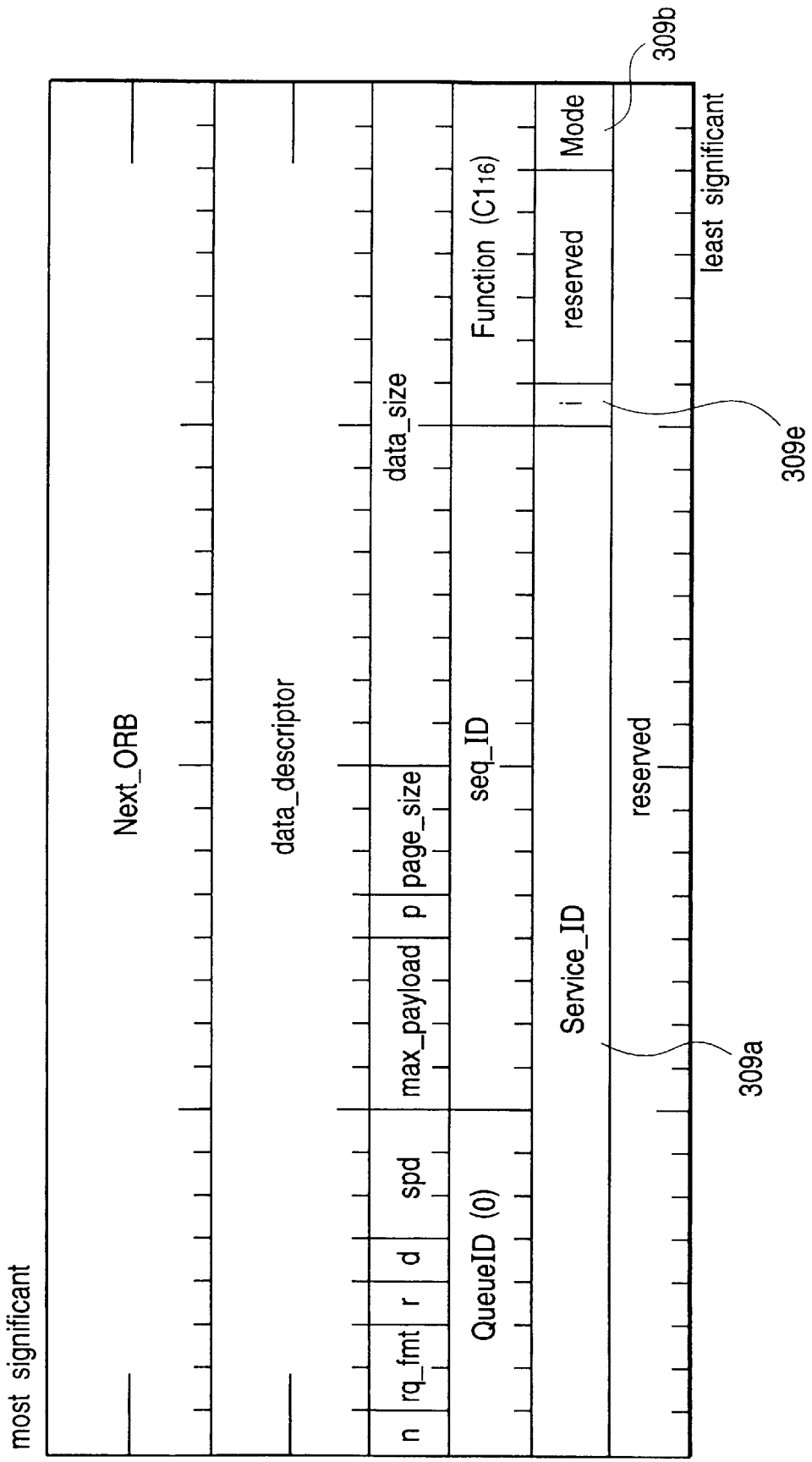
FIG. 10 is a diagram showing a format of a connection command ORB.

FIG. 10 shows a connection command ORB of the function=C1H. This command is issued for a reference queue for a connection service in which "QueueID"=0 and used to open a new connection and obtain an ID of a reference queue which is used for such connection. An ID of a service of a new connection destination is designated in a "Service_ID" field 309a. Information indicating that to which one of the full duplex bidirection, unidirection, and semi duplex bidirection the connection is set is designated in a "Mode" field 309b.

An "i" bit 309e is set to 1 when the initiator requests an increase in the prefetch pool to the target.

(Disconnection Command ORB)

Figure 11:
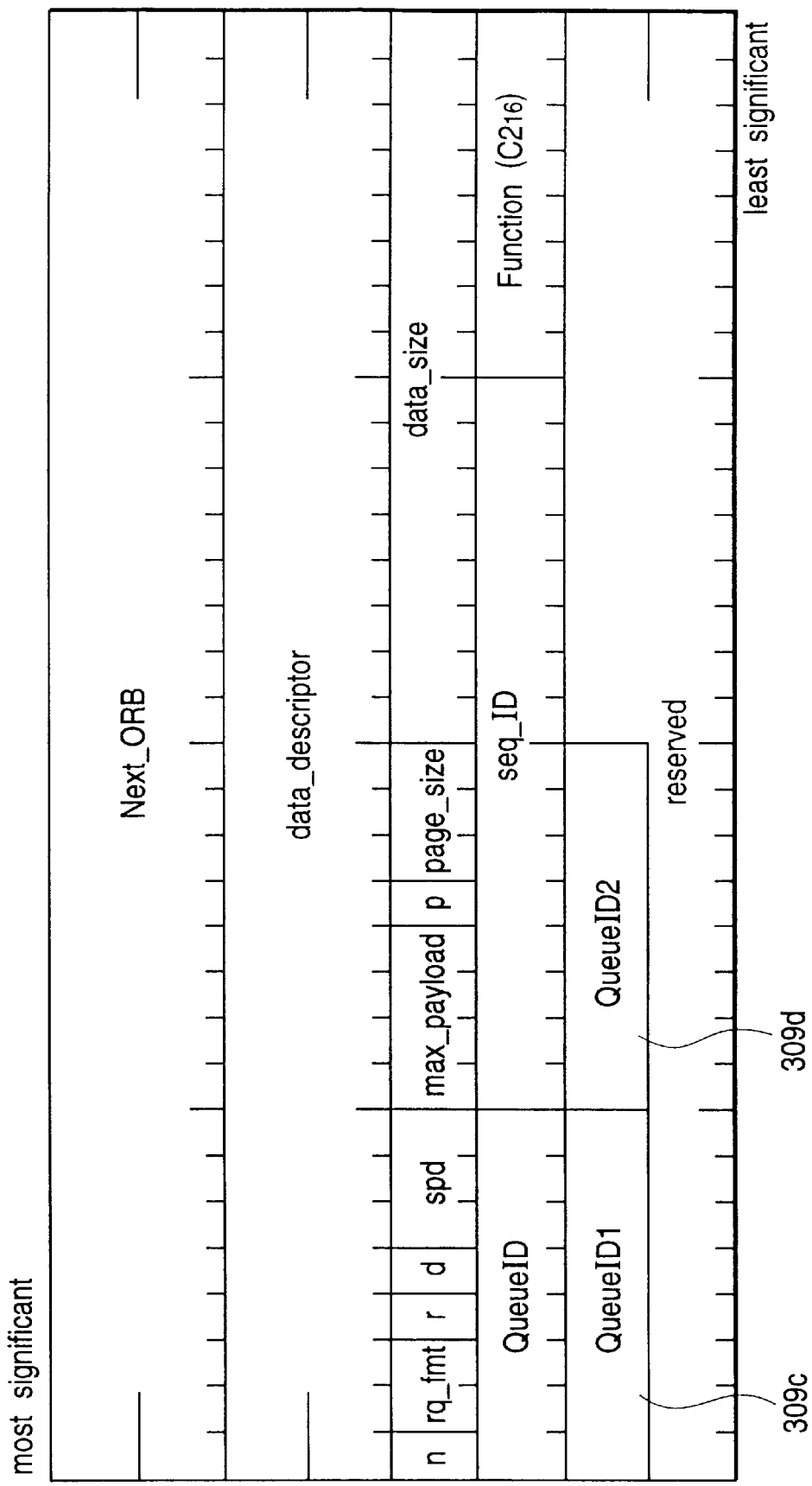
FIG. 11 is a diagram showing a format of a disconnection command ORB.

FIG. 11 shows a disconnection command ORB of the function=C2H. This command is used to close the connection opened by the connection command ORB. This command can be issued for the reference queue to be closed or can be issued for a reference queue for a connection service in which "QueueID"=0. When this command is issued for a reference queue for a connection service in which "QueueID"=0, the connection for the reference queues designated by "QueueID1" field 309c and "QueueID2" field 309d is closed. When only one reference queue is used for connection, 0 is designated in the "QueueID2" field.

(Query Command ORB)

Figure 12:
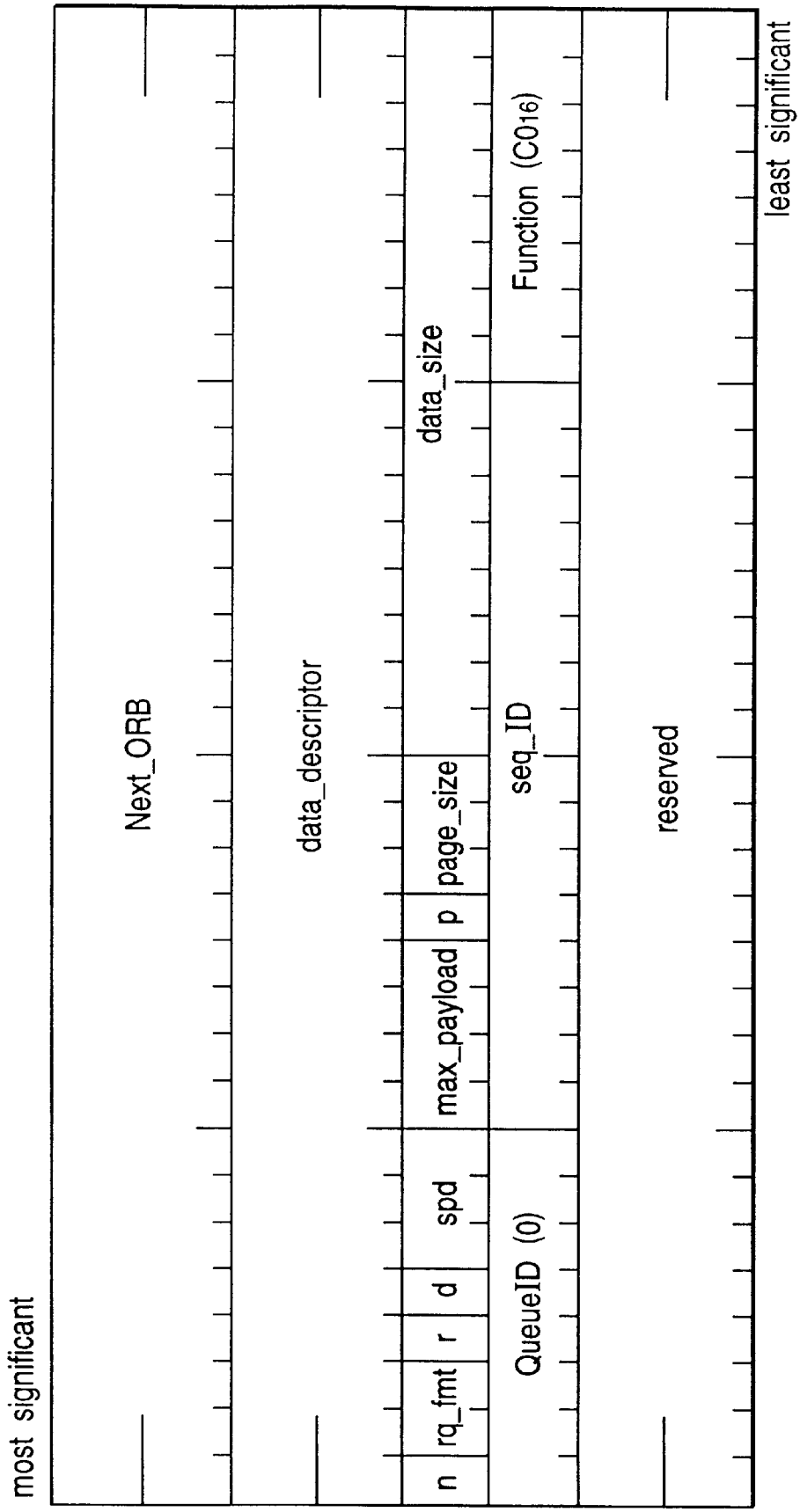
FIG. 12 is a diagram showing a format of a query command ORB.

FIG. 12 shows a query command ORB of the function=C0H. This command is used to get a capacity of the prefetch pool from the target prior to the communication after the login.

(Status Block)

Figure 13:
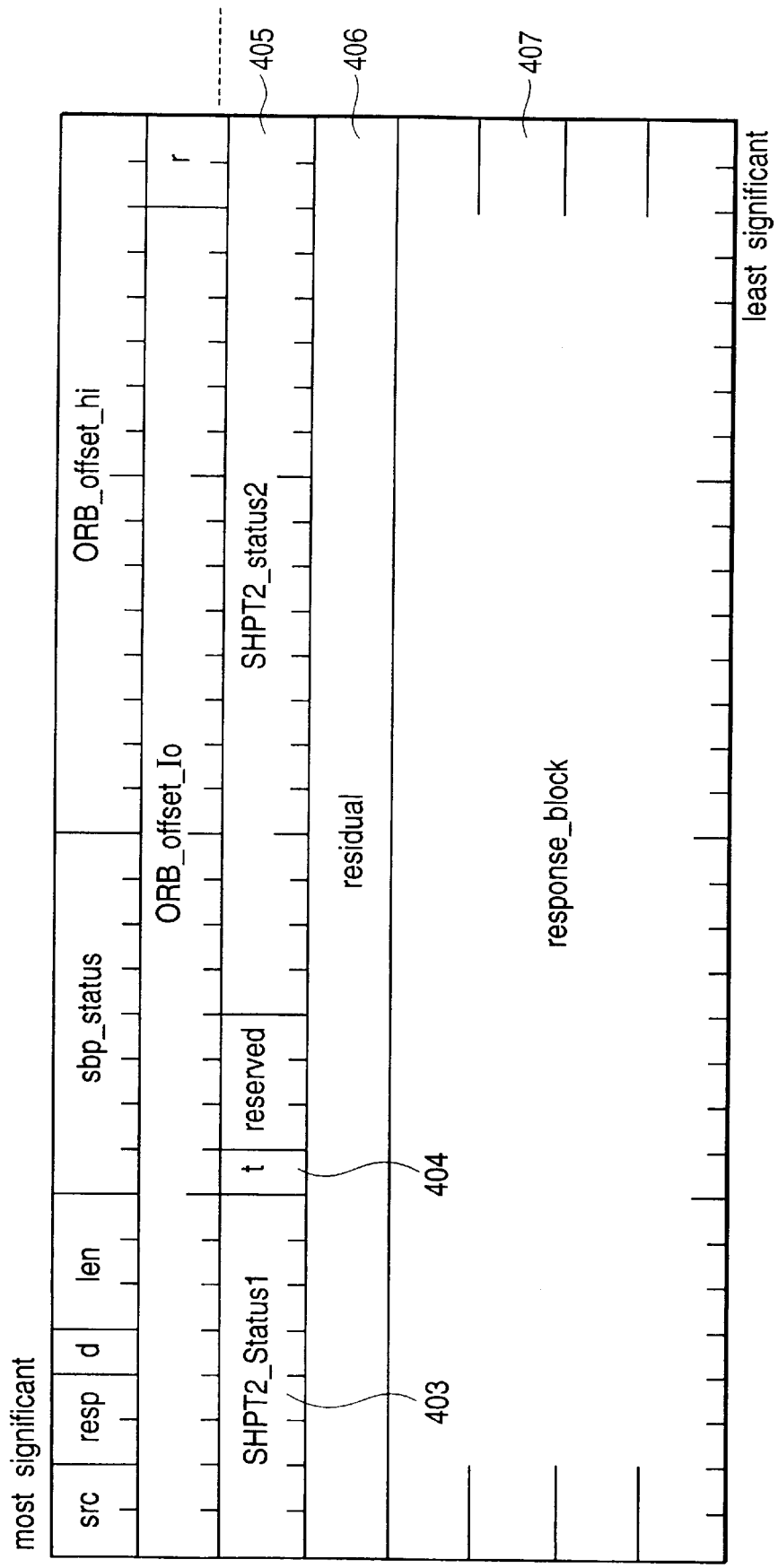
FIG. 13 is a diagram showing a general format of a status block.

FIG. 13 shows a format and contents of a status which is returned from the target to the initiator. In FIG. 13, since the fields locating above a dotted line are the fields specified by SBP-2, they are not described in particular. A tag field 404 shows a data tag and is valid only in the status for the read command ORB.

"SHPT2_status1" and "SHPT2_status2" (SHPT-2 status) fields are fields showing an execution result status of the command ORB and indicate an error when they are other than 0. That is, when the value is equal to 0, this means that the processes with respect to the command ORB corresponding to such a status have been completed. For example, when the corresponding command ORB is the write command, this means that as for the status block in which the SHPT-2 status is equal to 0, the target reads out all of the data from the buffer indicated by the corresponding write command ORB and finishes the writing into the buffer which the target has. When the value is other than 0, this means that a part or all of the processes of the corresponding command ORB are not performed due to the error. The initiator which received this error copes with the error by notifying the client of the occurrence of the error, or the like.

A "residual" (remain) field 406 shows a residual data length excluding a length of data processed for the buffer indicated by the ORB.

(Connection Status Block)

Figure 14:
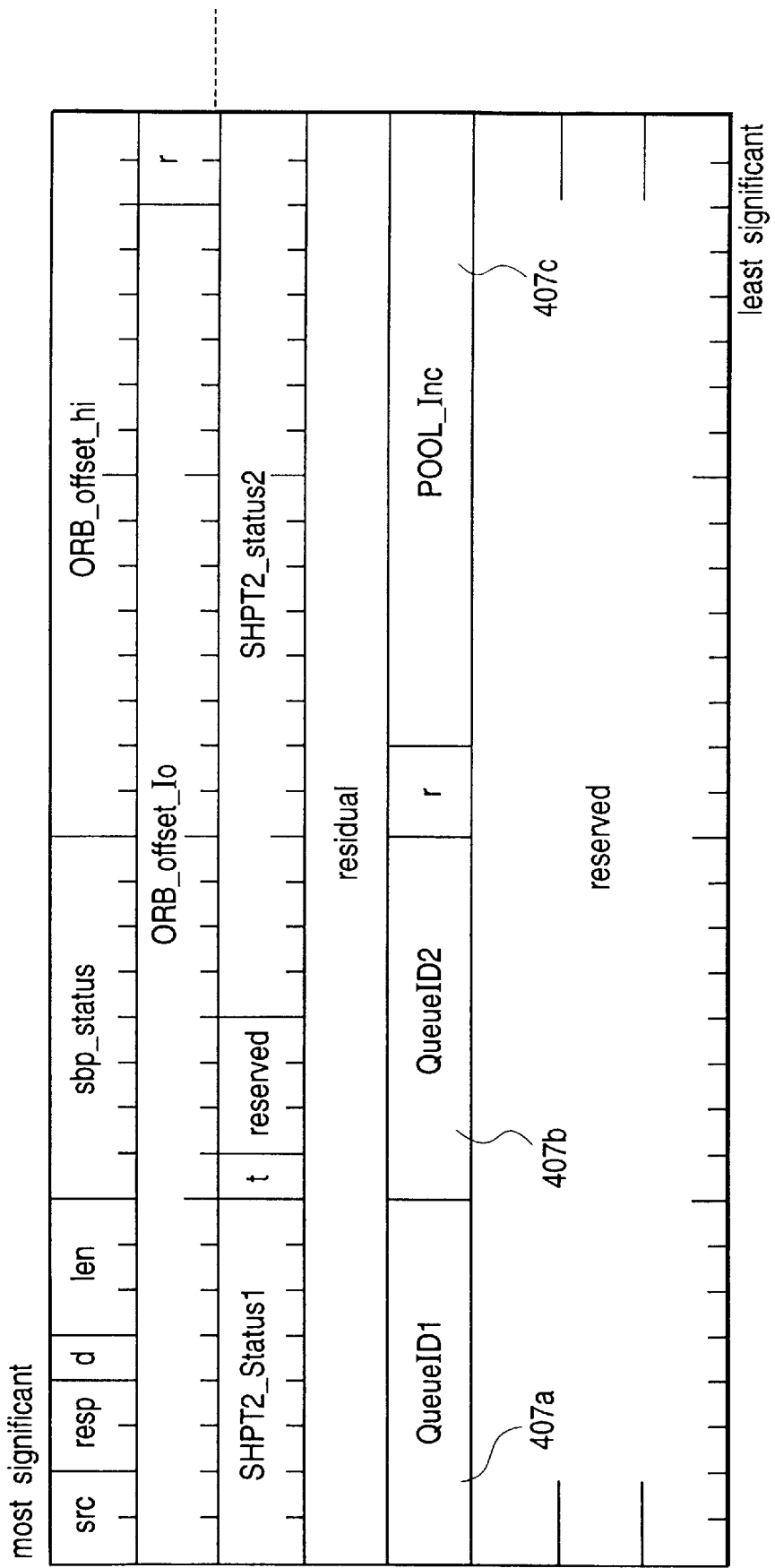
FIG. 14 is a diagram showing a format of a connection status block.

FIG. 14 shows a status block for the connection command ORB of the function=C1H. This block is sent from the target to the initiator when the connection command is terminated. The IDs of the reference queues which are used for new connection are shown in a "QueueID1" field 407a and a "QueueID2" field 407b. When a "Mode" field of the connection command ORB indicates the unidirection, 0 is returned to "QueueID2". In case of the semi duplex, the same ID is returned to "QueueID1" and "QueueID2". In case of the bidirection, different IDs are returned to "QueueID1" and "QueueID2". A "POOL_Inc" field 407c indicates an increase amount of the capacity of the prefetch pool of the target.

(Query Status Block)

Figure 15:
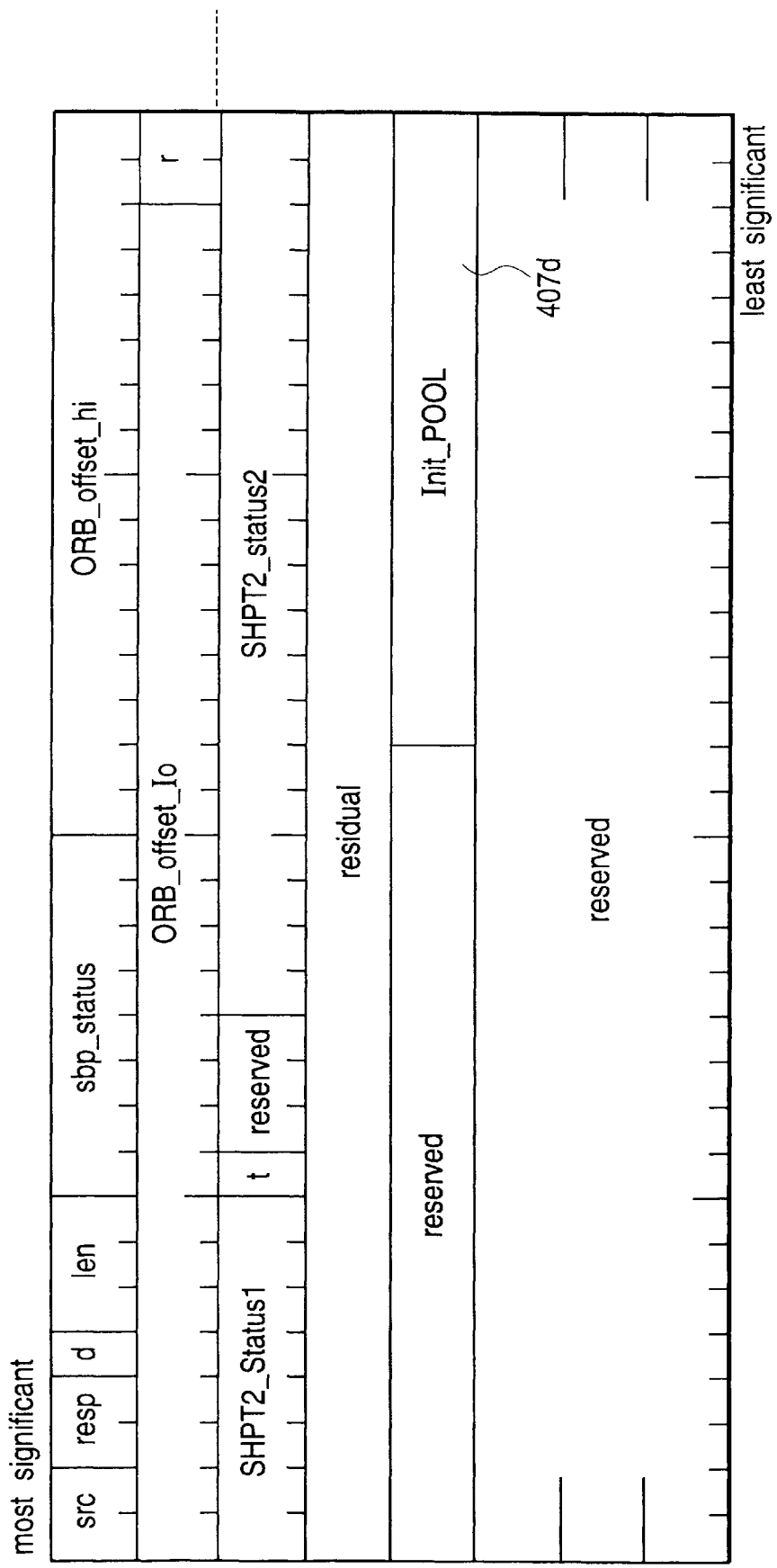
FIG. 15 is a diagram showing a format of a query status block.

FIG. 15 is a status block for the query command ORB of the function=C0H. This block is sent from the target to the initiator when the query command is terminated. The capacity of the prefetch pool of the target is returned to an "Init_POOL" field 407d.

<Management of ORB>

How the ORB is used will now be described on the basis of the constructions of the initiator and target described above and the constructions of the command ORB and status block.

A flow of commands among the initiator, target, and clients will now be described with reference to FIGS. 1 and 2. Explanation will now be made on the assumption that the request queue A 202a and reference queue A 105a are used for the data transmission from the initiator side to the target side and the request queue B 202b and reference queue B 105b are used for the data transmission from the target side to the initiator side.

When a data transmission request from the client of the initiator is issued, the client includes the write command including the address and size of the buffer in which the data to be sent to the target has been stored to the end of the I/O request queue A 202a.

In the SHPT-2 processor 201, a check is made to see if the number of commands (in the current ORB list) belonging to the I/O request queue shown by the Current-QUE counter 203a is equal to or larger than the number of reserved areas in the prefetch pool allocated to the I/O request queue. If it is equal to or less than the number of reserved areas, an ORB is formed from the write command and linked to the end of the ORB list 204. The number of commands (in the current ORB list) belonging to the I/O request queue shown by the Current-QUE counter 203a is increased by 1. If the number in the ORB list is equal to or larger than the number of reserved areas, the Current-POOL counter 203e is checked. If there is a free area, namely, if the count value of the counter 203e is not equal to 0, an ORB is formed from the write command and linked to the end of the ORB list 204. The number of commands (in the current ORB list) belonging to the I/O request queue shown by the Current-QUE counter 203a is increased by 1 and the value of the Current-POOL counter is decreased by 1.

The Current-POOL counter 203e is checked and if there is no free area, the apparatus waits for the free area. In the state of FIG. 2, three ORBs have already been linked from the request queue A and this number is larger than the number 1 of reserved areas. However, since the value of the Current-POOL counter is equal to 3, the value in the Current-POOL counter is reduced to 2 and the number in the ORB list of the Current-QUE counter is increased to 4. The ORB for a writing request Qa-4 which waited in the request queue can be added into the ORB list. Even if the ORB is formed, the write command corresponding thereto is not deleted from the I/O request queue but deleted at a point when a completion status is received from the target.

When the ORB is inserted into the ORB list, the SHPT-2 processor 201 writes it into the doorbell register 101a of the target through the 1394 interface or writes an address of a new ORB into the ORB pointer 101b.

The dispatcher 102 extracts a pointer from the free reference list 104, stores a command of the ORB into a free area in the prefetch pool 103 indicated by the pointer, and connects the pointer to the end of the reference queue in accordance with a QueueID field (in this case, it indicates the reference queue A 105a) of the relevant ORB. The execution agent 106 sequentially executes the commands in the prefetch pool that is referred to by the reference queue. That is, the contents in the buffer shown by the write command are written into the buffer prepared by the client of the target. When the process of the command is completed, the execution agent writes the status block in which the SHPT-2 status indicates "completion" into the status FIFO 205 of the initiator.

The SHPT-2 processor 201 processes the status blocks written into the status FIFO from the head. That is, if the SHPT-2 status indicates "completion", the ORB corresponding to the status block is removed from the ORB list and, at the same time, the corresponding write command in the I/O request queue is deleted. In this instance, a check is made to see if the number of commands (in the current ORB list) belonging to the I/O request queue shown by the Current-QUE counter 203a exceeds the number of reserved areas in the prefetch pool allocated to the I/O request queue. If NO, the number of commands (in the current ORB list) shown by the Current-QUE counter 203a is reduced by 1. When the number of commands in the ORB list exceeds the number of reserved areas, the count value of the Current-POOL counter 203e is increased by 1. The number of commands (in the current ORB list) shown by the Current-QUE counter 203a is decreased by 1.

The above procedure is substantially similar to that of the read command. However, the read command is not processed so long as the data to be read out is not generated in the target. Therefore, the read command ORB issued from the initiator is stored into the prefetch pool 103 and queued and held in the reference queue B 105b until the data to be read out is generated.

When the initiator is the host computer and the target is the printer, to send the print data from the host computer to the printer, it is sent from a printer driver as a client of the initiator to the rasterizer as a client of the target by using the write command. When the host computer requests information showing the construction and status of the printer, a command (command at the client level) indicative of such a fact is transmitted as a write command to the printer. The (client of the) printer which received the write command sends the requested data to the host computer by using the read command stored in the prefetch pool and queued in the reference queue. Further, in a case such that an error occurs in the printer, the client of the printer can spontaneously send error information to the host computer by using the read command stored in the prefetch pool and queued in the reference queue. Therefore, while the host computer is connected to the printer, it issues at least one read ORB to the printer for the purpose of operation. Further, to always allow the read command to be stored in the prefetch pool and queued in the reference queue, it is desirable to issue at least two read ORBs to the printer.

As for the ORB list 204 in FIG. 2, the ORBs are not always sequentially deleted from the head. For example, there is also a case where ORB T4 (command Qb-1) directed to the reference queue B 105*b* is completed and deleted prior to ORB T3 (command Qa-2) directed to the reference queue A 105*a*. Therefore, there is no link destination of ORB T3 (command Qa-2). In this case, since the pointers to ORB T3 (command Qa-2) and ORB T5 (command Qa-3) have already been sent to the target at the time of processing of ORB T4 (command Qb-1), there is no need to re-connect the link destination on the ORB list. Even if the ORB list is cleared due to an error or the like, since the corresponding command remains in the I/O request queue, an error recovering process, which will be explained hereinlater, can be also normally performed.

<Recovery (Initiator) of Error>

As already described above, in SBP-2, the connection between the initiator and the target is disconnected by the bus reset due to an abnormality (error) on the network. Therefore, in SHPT-2, a procedure to recover the status lost by the bus reset is determined.

When the bus resetting process is terminated after the bus reset occurred due to an error or the like on the network, the initiator deletes all of the ORBs from the ORB list in accordance with the regulations of SBP-2. Each I/O request queue is not reset even if the bus reset occurred.

After the connection is reset, the initiator newly forms an ORB from the contents of those queues with reference to the I/O request queue and issues it to the target. In this instance, by designating again the value in the "Seq_ID" field allocated to the corresponding command at the time of formation of the ORB, the status just before the bus reset can be reconstructed.

<Recovery (Target) of Error>

Although the initiator can return the status to the status just before the bus reset merely by recovering the ORB list, since the target performs the reading/writing operation for the buffer in response to the read/write command, if the bus reset occurs during the reading/writing operation, its procedure has to be continued after the recovery. Therefore, the execution agent of the target stores the "Seq_ID" field of the command which is referred to by each reference queue and is being processed and the position in the buffer during the process every reference queue.

For example, in the case where the initiator issues the read ORB and the target processes it by the execution agent, the execution agent 106 reads out the "Seq_ID" field of the read command ORB which is processed from now on before the execution and stores it as a sequence identifier (Sequenceidentifier). When data is written into the buffer of the client, the address in the buffer in which data is being written at present is continuously updated as an execution pointer (Nextexecpointer). Those areas are assured in the memory area which is not erased by the bus reset.

Since the initiator issues an ORB again after completion of the bus reset, if the "Seq_ID" field of the ORB which has been stored in the prefetch pool and is referred to at the head of the reference queue is older than the stored sequence identifier, the process of this ORB has already been completed, so that the execution agent returns the completion status. If both of them coincide, the writing operation is continued from the address indicated by Nextexecpointer.

The recovery is also similarly performed with respect to the write command.

The command and status which are used in the printing system of the embodiment have been described above. A processing procedure of the command and status in the initiator and target will now be described.

<Data Transmission Request by Client of Initiator>

Figure 3:
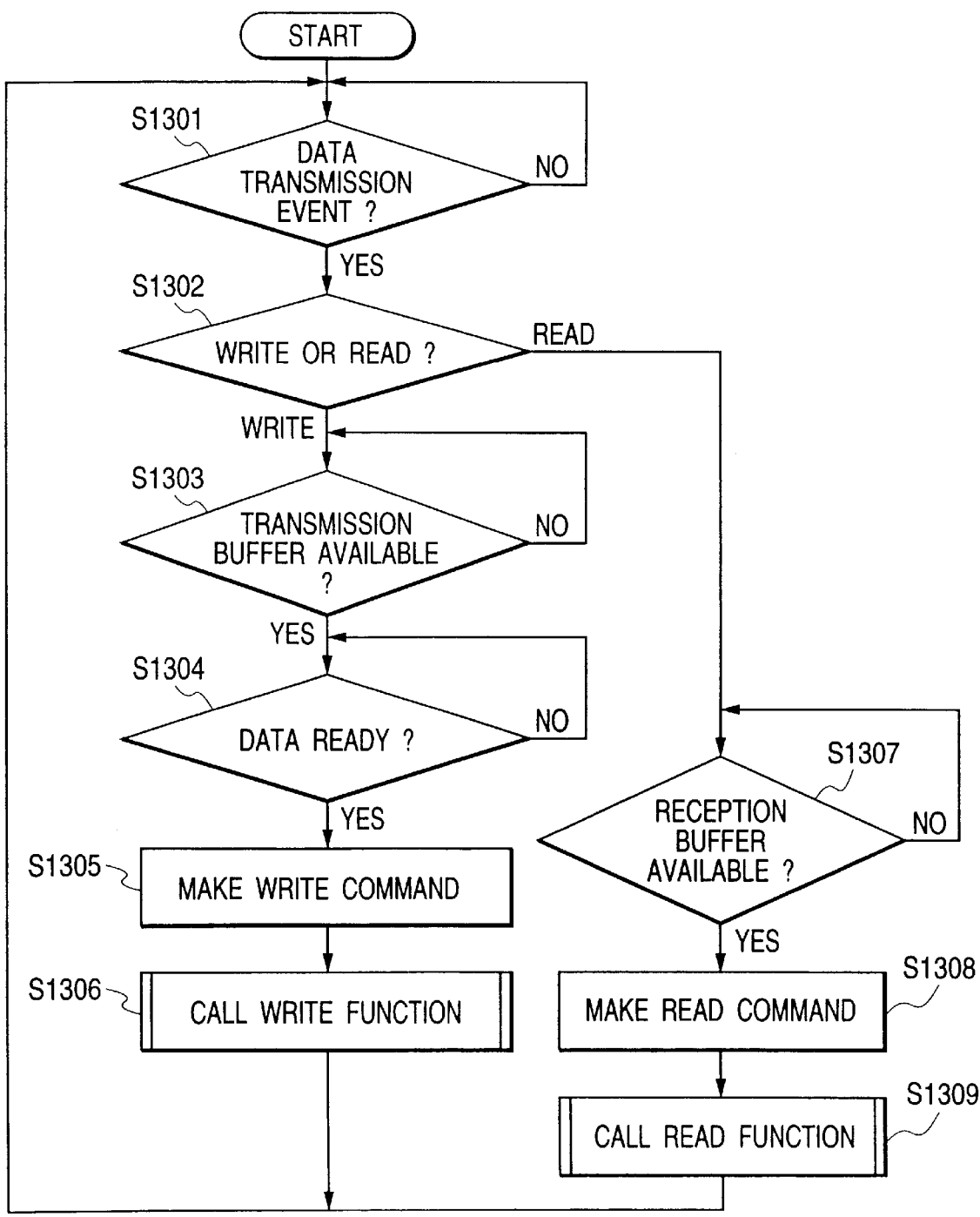
FIG. 3 is a flowchart for a processing procedure when a data transmission request is generated by a client of the initiator.

FIG. 3 shows a procedure when data is transmitted or requested to the target from a printer driver or the like as a client of the initiator.

When a data transmission event occurs (step S1301), whether the command which is necessary for it is the write command or the read command is discriminated (step S1302). If it is the write command, whether there is a data transmission buffer for it or not is discriminated (step S1303). Whether the transmission data to be sent to the target has been prepared or not is discriminated (step S1304). If all of them have been prepared, the write command is formed by giving necessary arguments such as address, size, and the like of the buffer (step S1305). A write function is called (step S1306).

If it is determined that the necessary command is the read command, whether there is a transmission buffer to receive the data is discriminated (step S1307). If YES, the read command is formed by sending the necessary arguments such as address, size, and the like of the buffer (step S1308). The read function is called (step S1309).

For example, when the data transmission event is a transmission of the print data to the printer, a command at the client level and data such as a PDL are prepared in the buffer and the write command is formed. If the data transmission event is the reading operation to read out the status from the printer, a command at the client level indicative of such a fact is prepared and the write command is formed. At the same time, it is necessary to form the read command to receive data from the target. Prior to performing a series of data exchange with the target, the client of the initiator issues several read commands.

Figure 4:
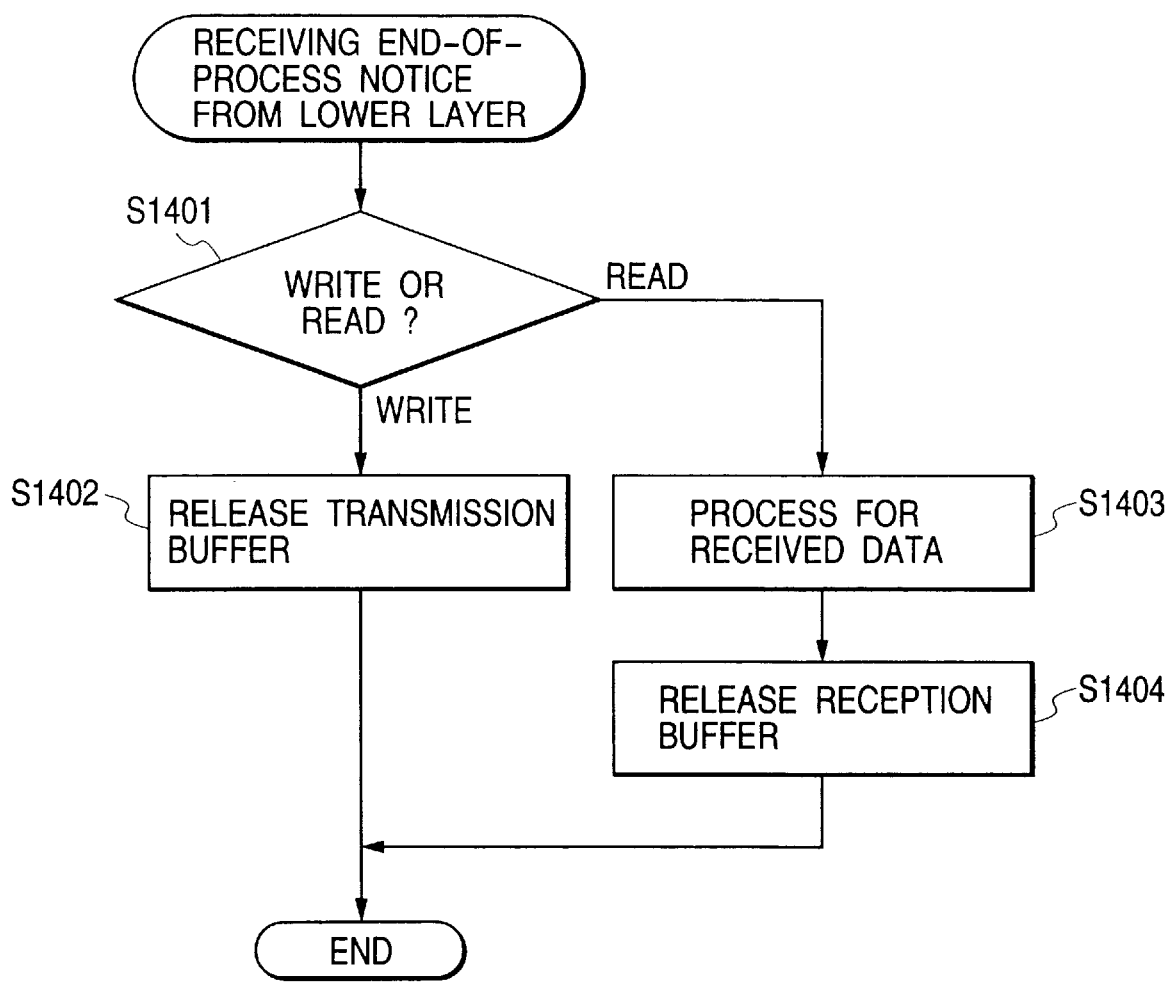
FIG. 4 is a flowchart for a processing procedure when an end-of-process notice is received from SHPT-2 by the client of the initiator.

FIG. 4 shows a processing procedure when the client of the initiator receives an end-of-process notice from a lower layer, namely, the layer of SHPT-2. First, whether the terminated process is the reading process or the writing process is discriminated (step S1401). If it is the writing process, the used data buffer is released (step S1402). If it is the reading process, since the end of the process denotes the completion of the data reception, the process corresponding to the received data is performed (step S1403). The data buffer is released (step S1404).

<Process by SHPT-2 Processor of Initiator>

FIGS. 5A to 5C and 6 show processing procedures by the SHPT-2 processor of the initiator.

Figure 5A:
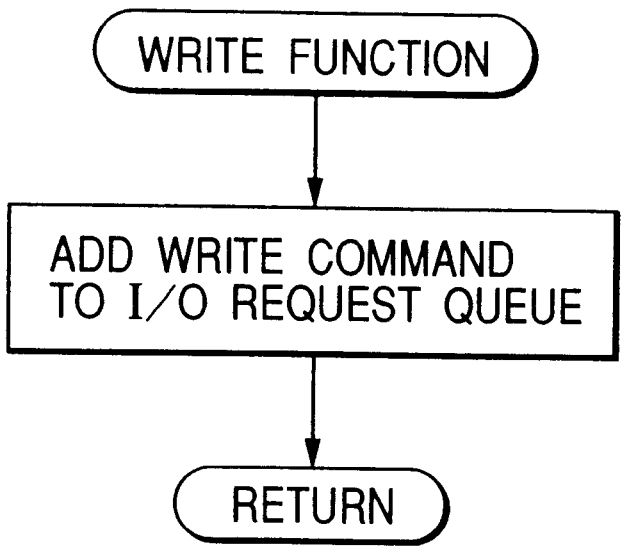
FIGS. 5A, 5B and 5C are flowcharts for a write function and a read function which are executed by an SHPT-2 processor of the initiator and called from the client and a flowchart for a managing procedure of an I/O request queue which is executed by the SHPT-2 processor of the initiator.
Figure 5B:
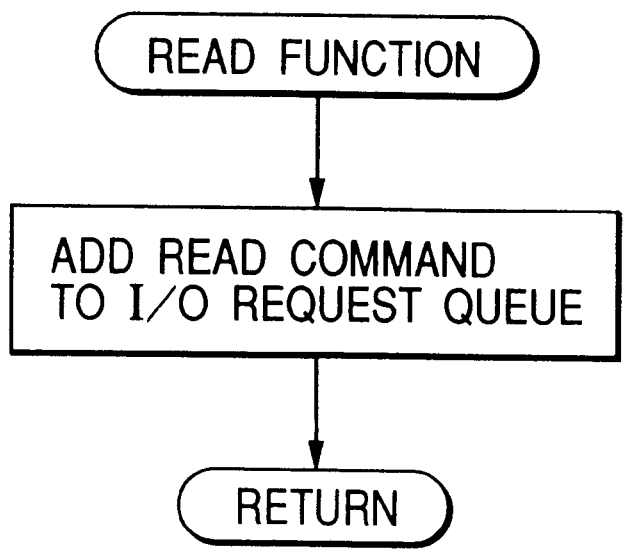

FIGS. 5A and 5B show the contents of a write function and a read function which are called by the client, respectively. In the write function, when the client issues a connecting request and is connected, a connection handle given by the SHPT-2 processor is sent as an argument to the client, and on the basis of the ID of the I/O request queue corresponding to the connection handle, the write command is added into the I/O request queue. In the read function as well, in a manner similar to the above, when the client issues a connecting request and is connected, the connection handle given by the SHPT-2 processor is sent as an argument to the client. On the basis of the ID of the I/O request queue corresponding to the connection handle, the read command is added into the I/O request queue. The commands queued in the I/O request queues respectively are, after that, sent to the reference queues shown by "QueueID1" and "QueueID2" given by the statuses of the connection command on the target side, respectively.

(I/O Request Queue Management)

Figure 5C:
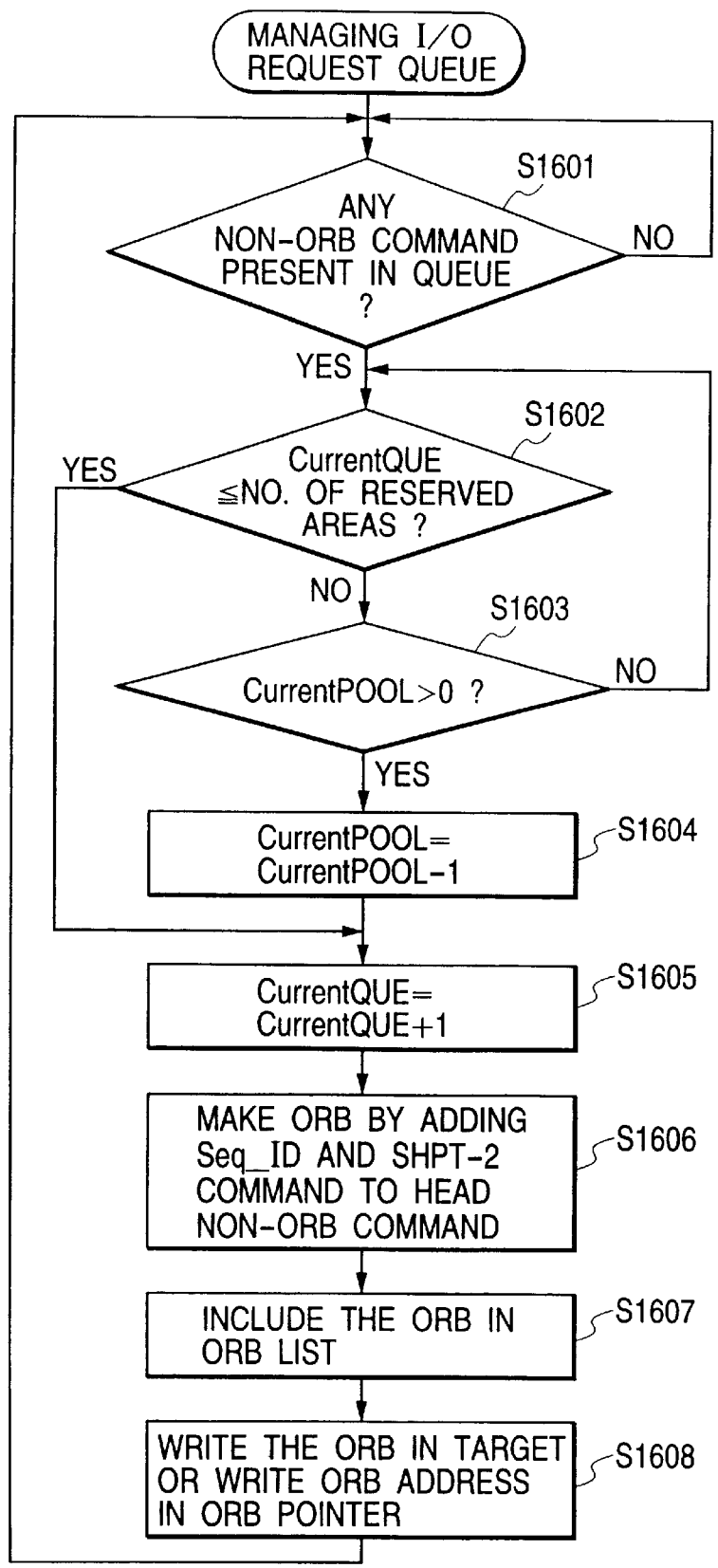

FIG. 5C shows a managing procedure of each I/O request queue. Those procedures can be independently performed by a thread schedule by one thread in each I/O request queue. Or, all of the I/O request queues can be executed in a single thread by independently scheduling them in a manner such that the management of one I/O request queue is not blocked by the operations of the other I/O request queues. Or, a combination of those methods can be also used. FIG. 5C shows a management of one I/O request queue. The management of the I/O request queue is performed every I/O request queue.

First, whether there is a non-ORB command in the I/O request queue or not is discriminated (step S1601). If YES, a check is made to see if the count value of the Current-QUE counter showing the number of commands (in the current ORB list) belonging to the I/O request queue is smaller than the number of reserved areas in the prefetch pool allocated to the I/O request queue (step S1602). If YES, step S1605 follows. If the count value is equal to or larger than the number of reserved areas, step S1604 follows. In step S1604, the count value of the Current-POOL counter is decreased by 1 if the count value of the Current-POOL counter for the prefetch pool is larger than 0 (step S1603). Subsequently, 1 is added to the count value of the Current-QUE counter (step S1605). An ORB is formed by adding the sequence ID (Seq_ID) and SHPT-2 command (Function) on the basis of the non-ORB command at the head stored in the I/O request queue (step S1606).

The ORB formed in this manner is included into the ORB list (step S1607) and written into the doorbell of the target or the address of the ORB is written into the ORB pointer (step S1608). In this manner, the ORB is formed from the command in the I/O request queue.

(Process for Status Block)

Figure 6:
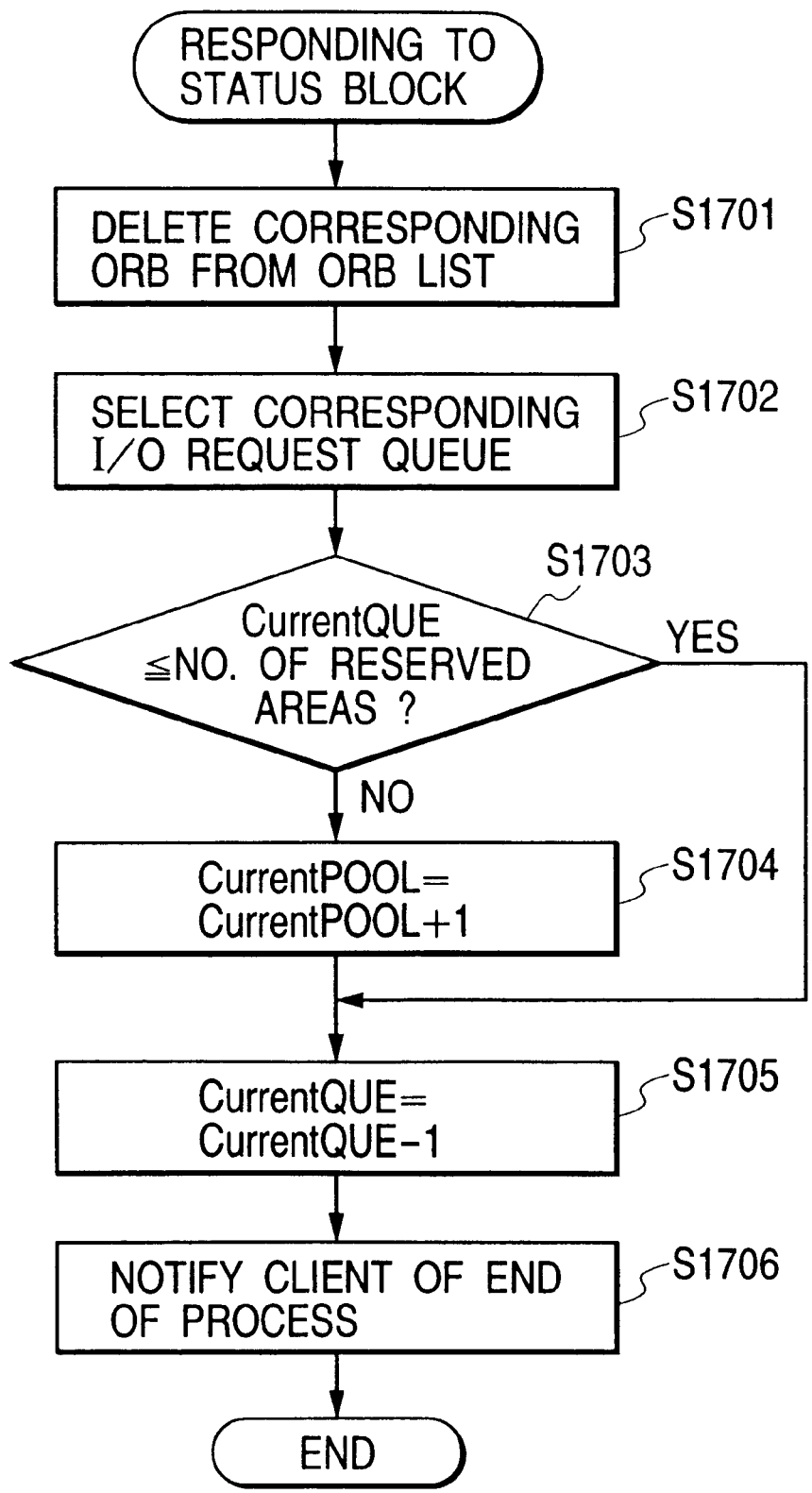
FIG. 6 is a flowchart for a processing procedure which is executed by the SHPT-2 processor of the initiator when a status block is received.

FIG. 6 shows a processing procedure when the status block is received from the target. When the status block of the process completion for the ORB is received, the corresponding ORB is deleted from the ORB list (step S1701). The I/O request queue in which the command for the corresponding ORB has been queued is selected (step S1702). Whether the count value of the Current-QUE counter showing the number of commands (in the current ORB list) belonging to the selected I/O request queue is equal to or less than the number of reserved areas in the prefetch pool allocated to the I/O request queue or not is discriminated (step S1703). If the count value is equal to or less than the number of reserved areas, step S1704 follows. If it is larger than the number of reserved areas, step S1705 follows. In step S1704, the count value of the Current-POOL counter for the prefetch pool is increased by 1. In step S1705, subsequently, the count value of the Current-QUE counter showing the number of commands (in the current ORB list) belonging to the selected I/O request queue is decreased by 1. Finally, the end of process is notified to the client corresponding to the selected I/O request queue (step S1706). The client receives this notice and executes the processes of FIG. 4.

(Error Recovering Process)

The normal processes in the SHPT-2 processor have been mentioned above. A procedure for recovering after the bus reset or the like will now be described with reference to FIG. 18. When the bus reset occurs and the connection between the target and the SBP-2 connection is disconnected, the connection of SBP-2 has to be newly reset.

First, a linking process of the new ORB is intermitted (step S1801) and the ORB list is cancelled (step S1802). After that, a re-connection command of the SBP-2 connection is issued (step S1803) and whether the connection has been established or not is discriminated (step S1804). If the connection is established again, the corresponding ORB is sequentially formed from the command at the head in each I/O request queue (step S1805). In this instance, the same ID as that assigned to the command before the bus reset is given to the "Seq_ID" field of each ORB. The formed ORB is linked to the ORB list (step S1806). The address is written into the ORB pointer (step S1807), thereby notifying the target of the generation of the ORB.

When a predetermined time elapses in a state where the connection cannot be established again (step S1808), all of the commands in each I/O request queue are cancelled (step S1809) and an error is informed to the client (step S1810). The processing routine is terminated. By the above procedure, the SBP-2 connection with the target is newly established after the reset and the ORB list just before the reset can be recovered.

<Processes by target>

Figure 19:
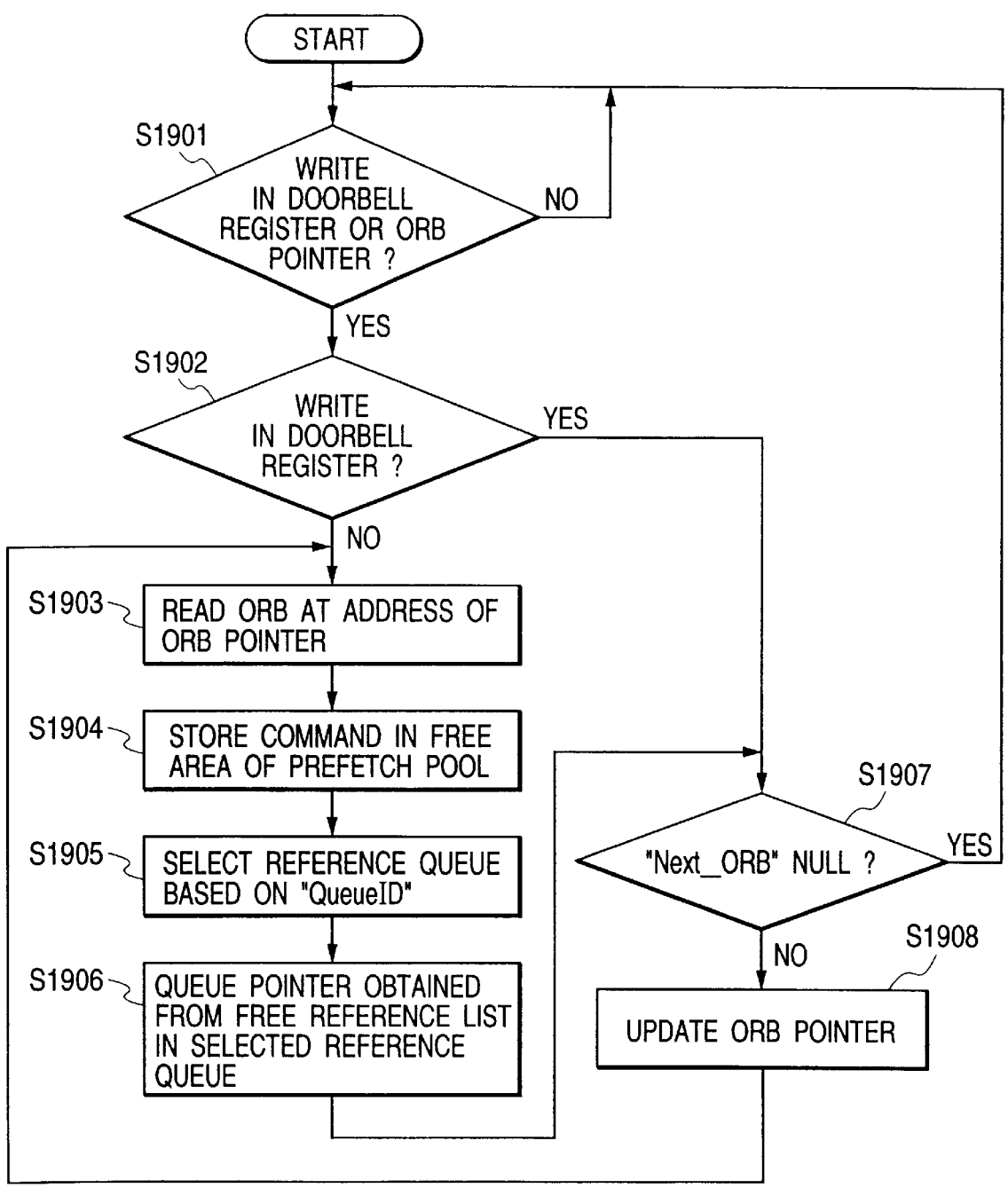
FIG. 19 is a flowchart for a processing procedure which is executed by a fetch agent of the target when writing is performed to a doorbell register or an ORB pointer.
Figure 20:
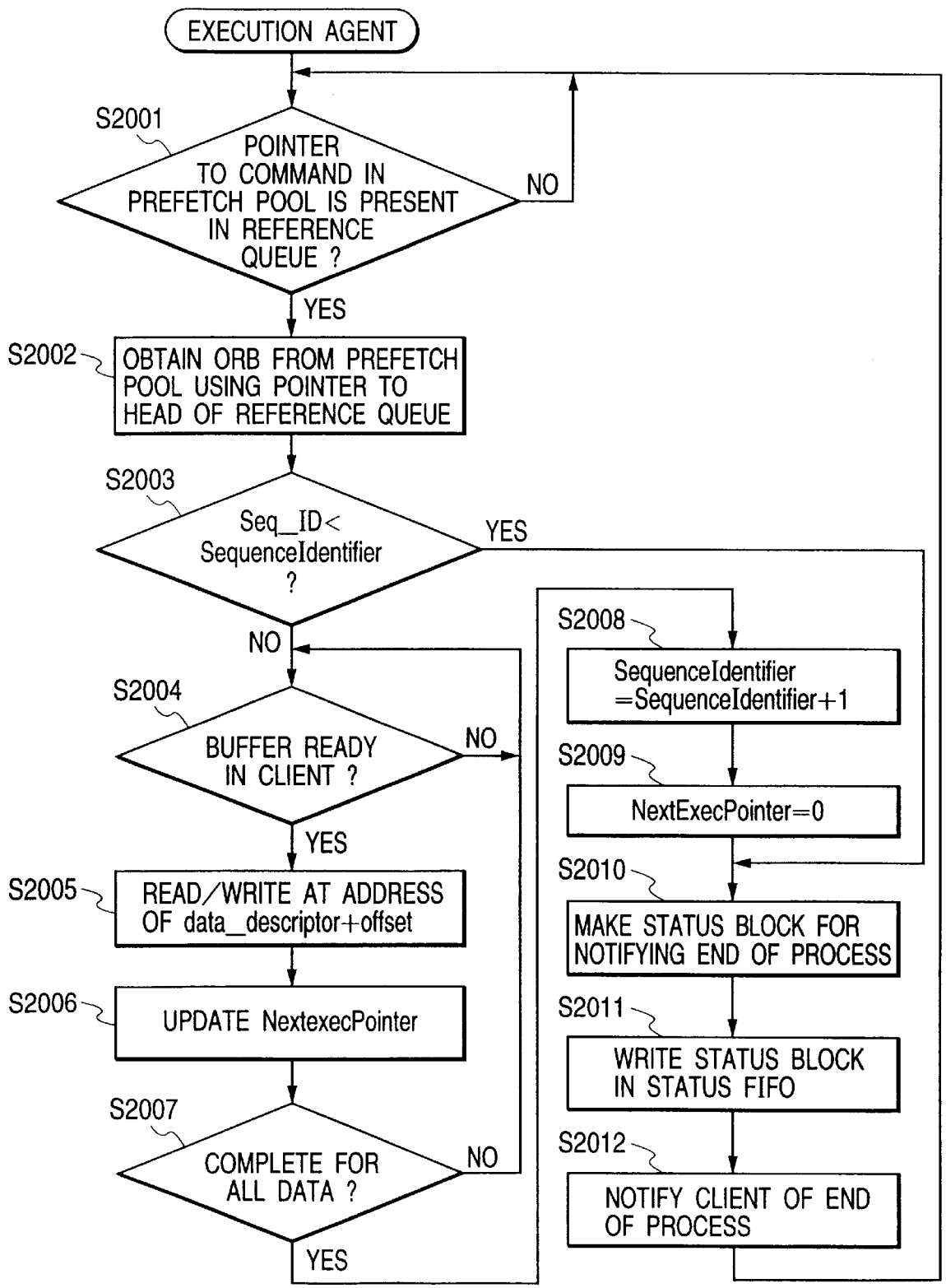
FIG. 20 is a flowchart for a processing procedure which is executed by an execution agent of the target.

FIGS. 19 and 20 show processing procedures by the target which received the ORB.

(Processes by the Fetch Agent)

One fetch agent is prepared for one SBP-2 connection. The fetch agent fetches the ORB when the writing operation is performed to the doorbell register or ORB pointer. First, the apparatus waits until the writing operation is performed to the doorbell register or ORB pointer (step S1901). When it is done, a check is made to see if the apparatus has been activated by the writing to the doorbell register (step S1902). If the apparatus is activated by the writing to the ORB pointer instead of the writing to the doorbell register, step S1903 follows. If the writing is performed to the doorbell register, a test is made to see if a "Next_ORB" field of the ORB designated by the ORB pointer is NULL (there is no subsequent ORB) (step S1907). If it is NULL, the processing routine is returned to step S1901.

If it is not NULL, step S1908 follows and the value in the "Next_ORB" field of the ORB designated by the current ORB pointer is written into the ORB pointer and updated (step S1908). The processing routine advances to step S1903.

If the address of the ORB to be processed is obtained in the ORB pointer as mentioned above, the ORB is read out from the address (step S1903). The pointer indicating the free area in the prefetch pool is taken out from the free reference list and the read-out command ORB is stored into the free area (step S1905).

The reference queue in which the command should be queued is selected with reference to the "QueueID" field of the ORB (step S1905). The pointer extracted from the free reference list is queued to the end of the selected reference queue (step S1906).

After that, the "Next_ORB" field of the ORB in which the queueing process is terminated is referred to and if its contents indicate NULL, namely, if there is not the linked ORB, the processing routine is returned to step S1901, the next ORB is linked, and the apparatus waits until the writing operation is performed to the doorbell register or ORB pointer. If there is the linked ORB, the value in the "Next_ ORB" field of the ORB designated by the ORB pointer is written into the ORB pointer and updated (step S1908). The ORBs linked in the ORB list are sequentially stored into the prefetch pool.

In this manner, the ORBs in the ORB list are stored into the prefetch pool.

Processes in steps S1904 to S1906 are the same as those described as an ORB dispatcher in FIG. 1.

(Execution Agent)

FIG. 20 shows a procedure of the execution agent for each reference queue. Those procedures can be performed independently by a thread schedule by one thread in each reference queue. Or, all of the reference queues can be executed in a single thread by independently scheduling them in a manner such that the management of one reference queue is not blocked by the operations of the other reference queues. Or, a combination of those methods can be also used. FIG. 20 shows a procedure of the execution agent for one reference queue. The procedure of the execution agent for each reference queue is performed every reference queue.

The execution agent first discriminates whether the pointer to the command in the prefetch pool exists in the reference queue or not (step S2001). The ORB is extracted from the prefetch pool (step S2002). The above processes are performed by using the pointer indicative of the head of the reference queue. When the ORB is read out, a check is made to see if the value in the "Seq_ID" field of the ORB is smaller than the value of a variable SequenceIdentifier held by the execution agent (step S2003). Both Seq_ID and SequenceIdentifier are finite digit numbers. Therefore, when Seq_ID and SequenceIdentifier are expressed by n bits, in the comparison in step S2003, it is defined that $((2^n-1)<0 (=2^n))$.

In the normal sequence, 1 is assigned to SequenceIdentifier after completion of the process of one ORB as will be explained hereinlater. SequenceIdentifier and Seq_ID of the ORB are set to the same digit number and Seq_ID is also added by 1 at a time. Therefore, when the process is progressing without a trouble, SequenceIdentifier and Seq_ID of the ORB ought to coincide in step S2003. Therefore, when the process normally progresses, the processing routine is shifted from step S2003 to step S2004.

Whether the buffer is ready in the client or not is discriminated (step S2004). If it is ready, the data of a predetermined size from the address in which the value of data_descriptor of the ORB and an offset value stored in NextexecPointer held in the execution agent are added is accessed. The data is transmitted and received to/from the buffer prepared by the client (step S2005).

In case of newly performing the process of the ORB, since the offset value is equal to 0, data is read out from the head of the buffer indicated by the ORB. In case of subsequently reading out the buffer from the intermitted location in the buffer which has been read out to the halfway, since the offset indicates the subsequent address in the buffer, by adding it, the data can be continuously read out from the intermitted location in the buffer which has been read out to the halfway. When the data is stored into the buffer, NextexecPointer is updated in a manner such that (the value of data_descriptor+offset) indicates the address to be subsequently read out (step S2006). Such reading/writing operations are performed until the size of data reaches the size indicated by data_size of the ORB (step S2007).

When the processes of one ORB are terminated, 1 is added to SequenceIdentifier and it is updated (step S2008). NextexecPointer (offset) is initialized to 0 (step S2009).

If the processing routine is terminated, a status block to notify of the completion of the processes is formed (step S2010) and written into the status FIFO (step S2011). The end of the process is notified to the client of the target (step S2012). At the same time, the pointer in the reference queue indicative of the relevant command is returned to the free reference list.

Figure 18:
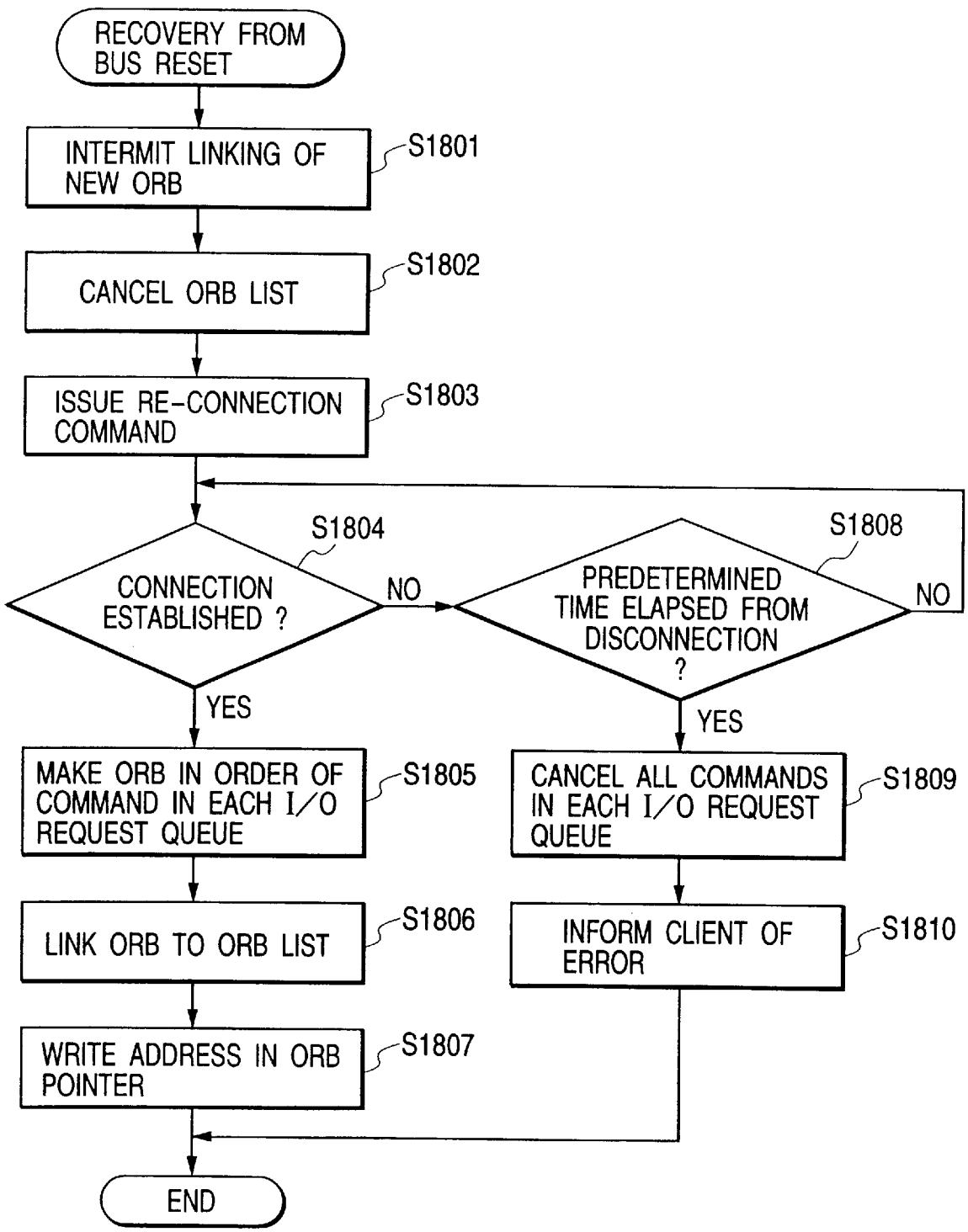
FIG. 18 is a flowchart for a recovery processing procedure which is executed by the SHPT-2 processor of the initiator just after a bus reset.

The case where Seq_ID of the ORB is smaller than SequenceIdentifier in step S2003 corresponds to the case such that the initiator reproduces the ORB list by the procedure of FIG. 18 due to the bus reset or the like. For example, with respect to a certain ORB, even if the target terminated the processes and the value of SequenceIdentifier was also updated, when the bus reset occurs at a point when its status block does not reach the initiator, the initiator also includes the ORB into the ORB list. In this case, the value of SequenceIdentifier of the execution agent is larger than Seq_ID of the ORB. In this case, since the processes of the ORB have already been terminated, the status block is sent to the initiator in step S2010 and subsequent steps.

<Connecting Procedure of Initiator>

Figure 16:
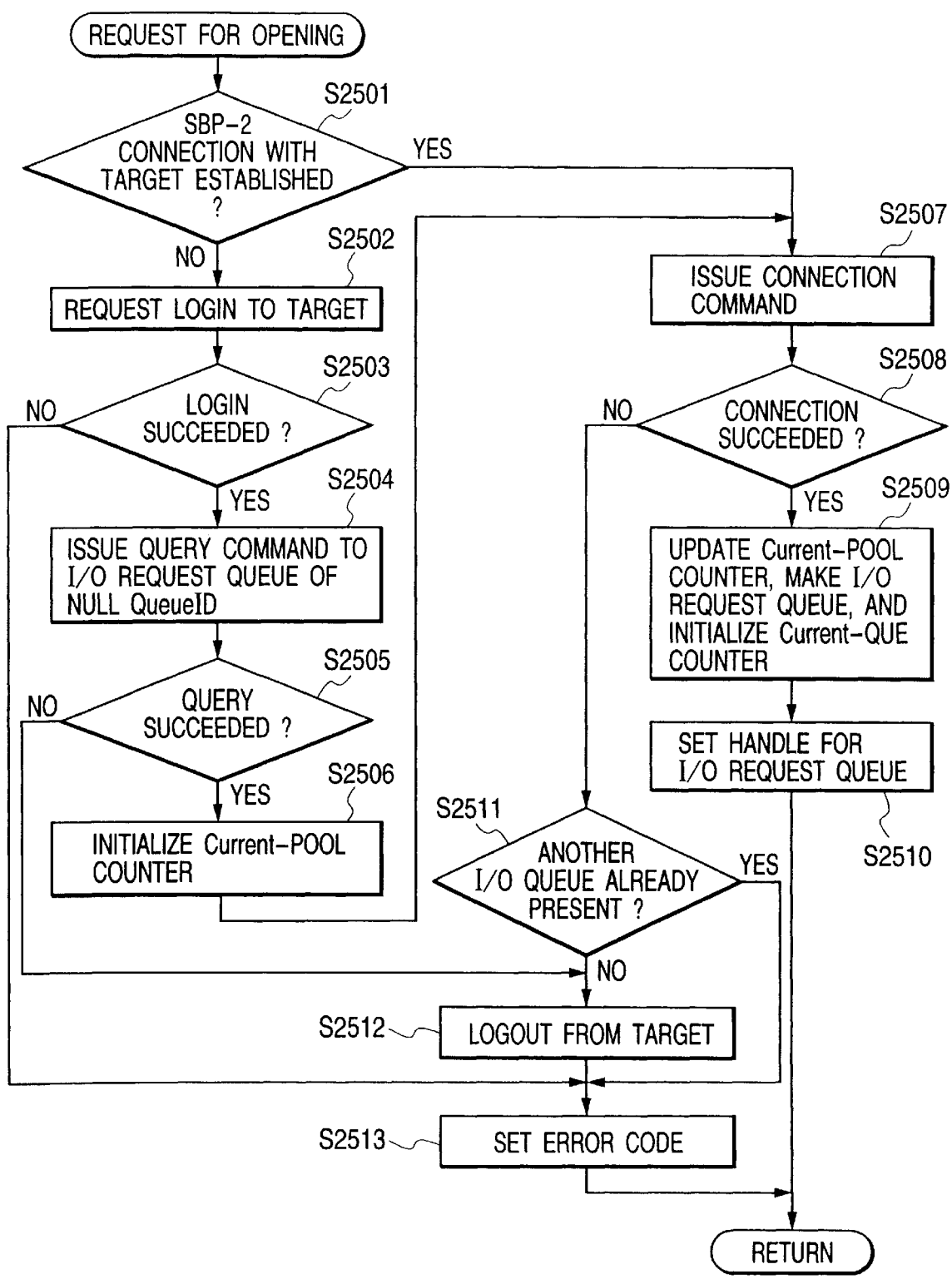
FIG. 16 is a flowchart for a processing procedure which is executed by the SHPT-2 processor of the initiator in response to an opening request from the client.

FIG. 16 shows a processing procedure for an opening request from the client on the initiator side. When the opening request from the client is received, a check is first made to see if the SBP-2 connection (login state) with the target of the connection destination has already been established (step S2501). If the SBP-2 connection has already been established, step S2507 follows. If the SBP-2 connection is not established yet, a login request (SBP-2 connecting request) is issued to the target (step S2502). Whether the login has succeeded or not is discriminated (step S2503). When the login fails, step S2513 follows, an error code is set to a return value, and the processing routine is returned. When the login succeeds, an I/O request queue in which QueueID is equal to 0 is formed and a query command is issued thereto (step S2504). Subsequently, whether the query command has succeeded or not is discriminated (step S2505). If it fails, step S2512 follows and a logout is executed. After that, step S2513 follows. If the query command succeeds, the Current-POOL counter is set on the basis of "Init_POOL" of the status block for the query command. At this time, since the I/O request queue in which QueueID corresponds to 0 has already been tacitly formed, one or more areas are set as reserved areas of the I/O request queue in which QueueID corresponds to 0 and the remaining areas are set into the Current-POOL counter (step S2506).

Further, step S2507 follows and a desired ServiceID and Mode are designated for the I/O request queue in which QueueID corresponds to 0 and the connection command is queued (step S2507). At the time of connection, "i" bit is set to 1 in case of obtaining an increase amount of the prefetch pool for the target. Whether the connection command has succeeded or not is discriminated (step S2508). If it fails, a check is made in step S2511 to see if another I/O request queue except for the queue corresponding to QueueID0 which is tacitly prepared is already present. If it is absent, a logout from the target is performed, namely, SBP-2 is disconnected (step S2512) and step S2513 follows. If it is present, step S2513 follows without performing the logout. When the connection command succeeds, a new I/O request queue is formed in correspondence to QueueID1 and QueueID2 of the status block. After that, a handle for allowing the client to specify this connection is made correspond. One or more reserved areas are set for each queue on the basis of the sum of the value in a Pool_Inc field of the status block and the value in the current Current-POOL register and the value in the Current-POOL register is updated by the number of remaining areas (step S2509). A handle which was made correspond to the I/O request queue formed finally is set to the return value (step S2510) and returned to the client on the calling source side.

<Connecting Procedure of Target>

Figure 17:
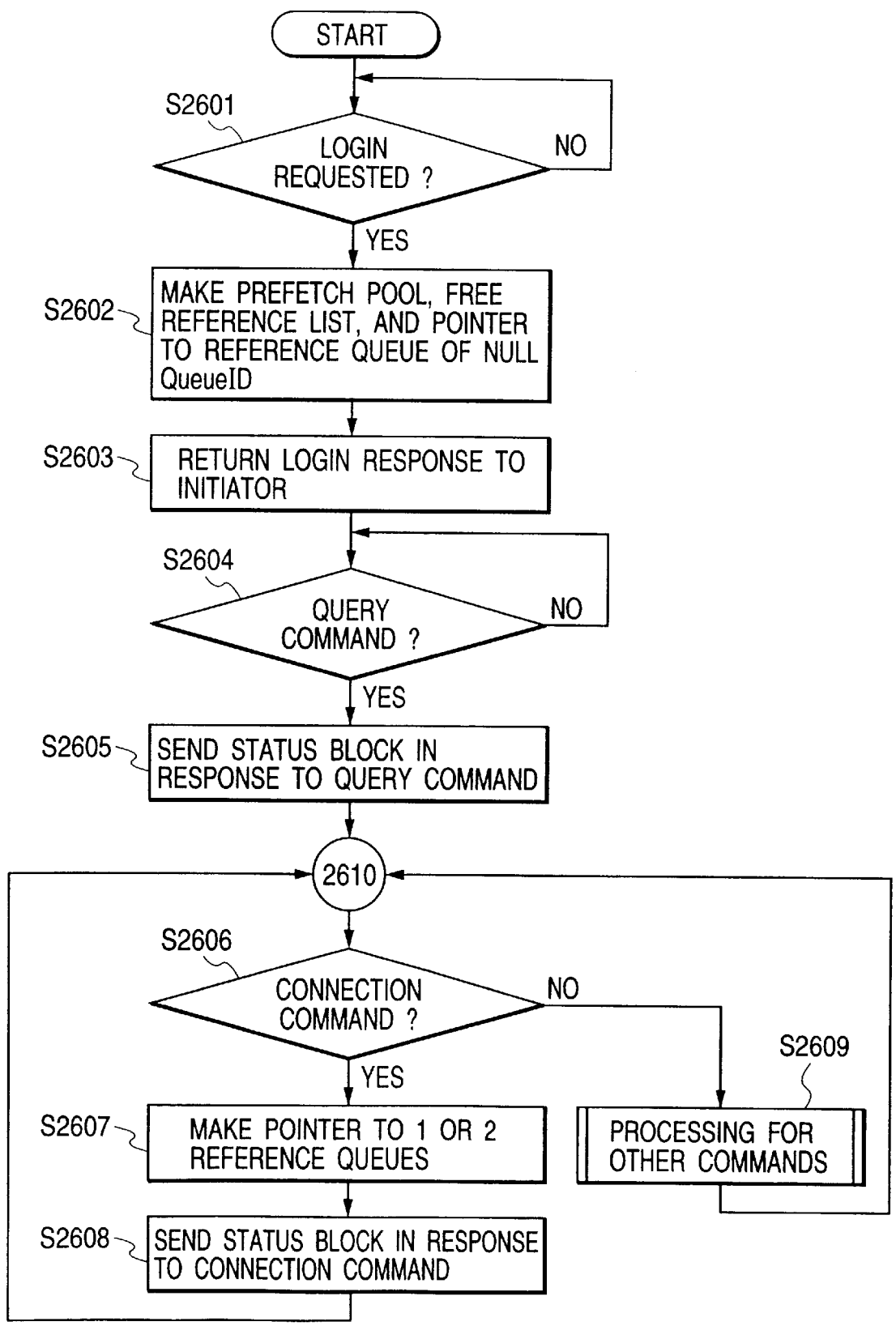
FIG. 17 is a flowchart for a processing procedure for a connecting request of the target.

FIG. 17 shows a processing procedure on the target side corresponding to the processing procedure for the opening request from the client on the initiator side in FIG. 16.

The target first waits for the arrival of a login request (step S2601).

When the login request is received, the target performs a confirmation of the ID of the initiator, a formation of a login descriptor, and the like as operations specified in SBP-2. The target also forms a prefetch pool having at least one entry and forms a free reference list as a list of the pointers for the entries in the prefetch pool. A pointer for the reference queue in which QueueID is equal to 0 and the like are also prepared (step S2602). After completion of the above preparation, the target returns a login response specified in SBP-2 to the initiator (step S2603). Subsequently, the target waits for the arrival of the query command (step S2604). When the query command is received, a size of formed prefetch pool is added into the "Init_POOL" field and a status block in response to the query command is sent (step S2605). The preparation for the communication by SHPT-2 can be made in this manner.

A loop in step S2610 and subsequent steps relates to a processing procedure of the execution agent based on the reference queue of QueueID0. Whether the command is the connection command or not is discriminated in step S2606. If it is not the connection command, the processes of other commands are performed in step S2609. The processing routine is returned to step S2610. If it is the connection command, pointers for one or two reference queues or the like are formed in accordance with the mode designated in the Mode field. At this time, if "i" bit of the connection command is equal to 1, entries of the number that is equal to or larger than the number of formed reference queues are added into the prefetch queue (step S2607). The IDs of the formed reference queues and the number of entries added into the prefetch queue are returned to the initiator by the status block for the connection command (step S2608). The communication between the clients can be performed by using the reference queues formed after that.

By the opening process of each of the initiator and the target in FIGS. 16 and 17, a request queue can be formed in the initiator, a reference queue can be formed in the target, and a path is set between them. The procedures of FIGS. 16 and 17 are also used upon setting of a management path (a pair of management request queue and management reference queue) which is formed at the time of login.

<Connection End Procedure of Initiator>

Figure 21:
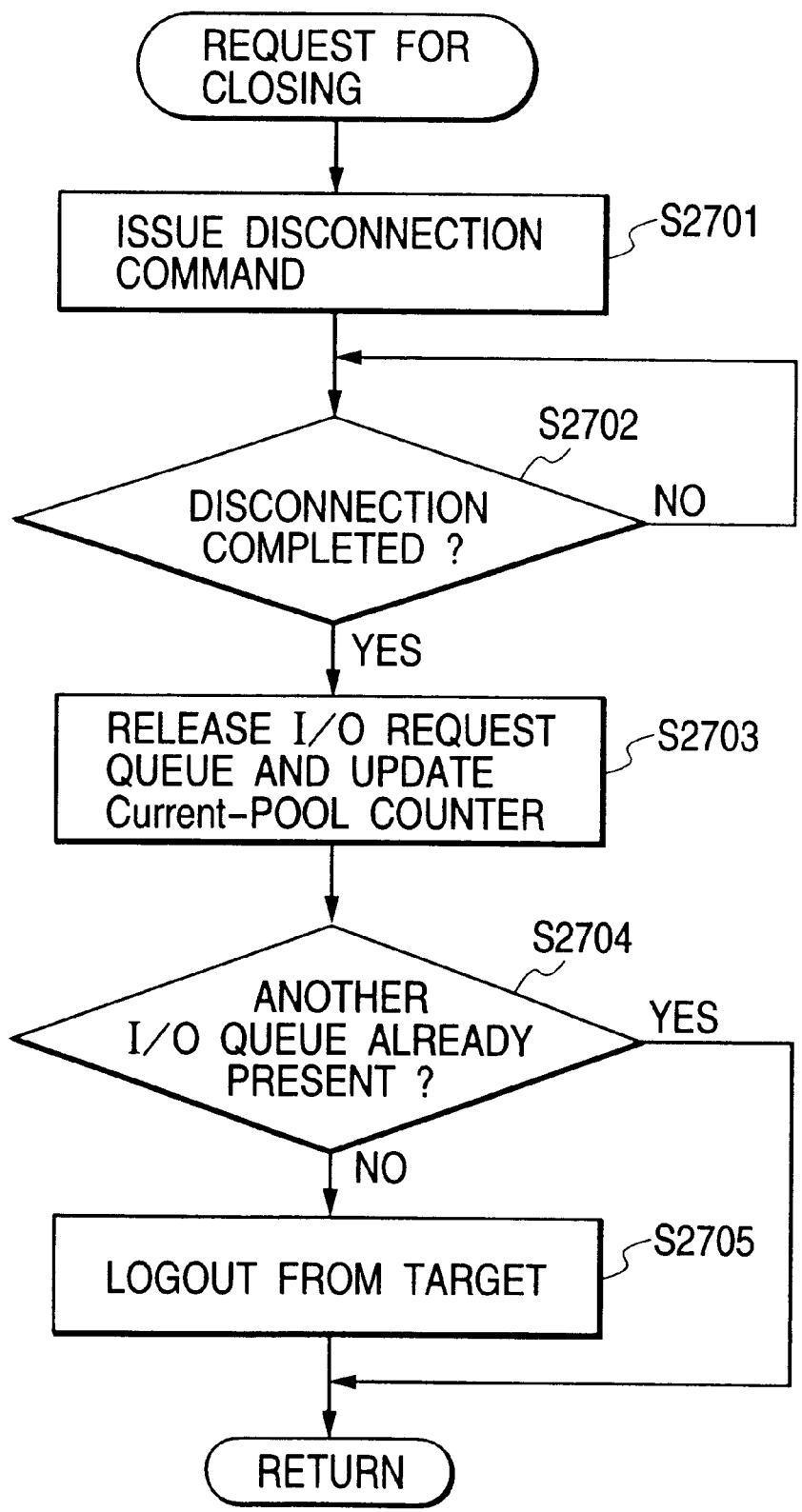
FIG. 21 is a flowchart for a processing procedure which is executed by the SHPT-2 processor of the initiator in response to a closing request from the client.

FIG. 21 shows a processing procedure for a closing request from the client on the initiator side. When the closing request is received, a disconnection command is first issued. When the user wants to disconnect after the command which has already been queued in the I/O request queue of relevant QueueID is terminated, the "QueueID" field of the disconnection command is set to relevant QueueID0. When the user wants to disconnect irrespective of the queued command, the disconnection command is issued to QueueID. In this case, a queue to be disconnected is designated in the "QueueID1" and "QueueID2" fields (step S2701). The apparatus subsequently waits for completion of the disconnection command (step S2702). After completion of the disconnection command, if the ORBs for the disconnected queues remain in the current ORB list, all of them are invalidated by the control field specified by SBP-2. The I/O request queue formed at the time of connection is released. The count value of the Current-POOL counter is increased by a value corresponding to the number of ORBs in the current ORB list shown by the count value of the Current-QUE counter of the I/O request queue and is, further, reduced by a value corresponding to the increased value in the prefetch pool received upon connection (step S2703). A check is further made to see if another I/O request queue except for the queue of QueueID0 that is tacitly prepared is already present (step S2704). If it is absent, a logout from the target is performed, namely, SBP-2 is disconnected (step S2705). The handle allocated upon connection is released. The processing routine is returned.

<Connection End Procedure of Target>

Figure 22:
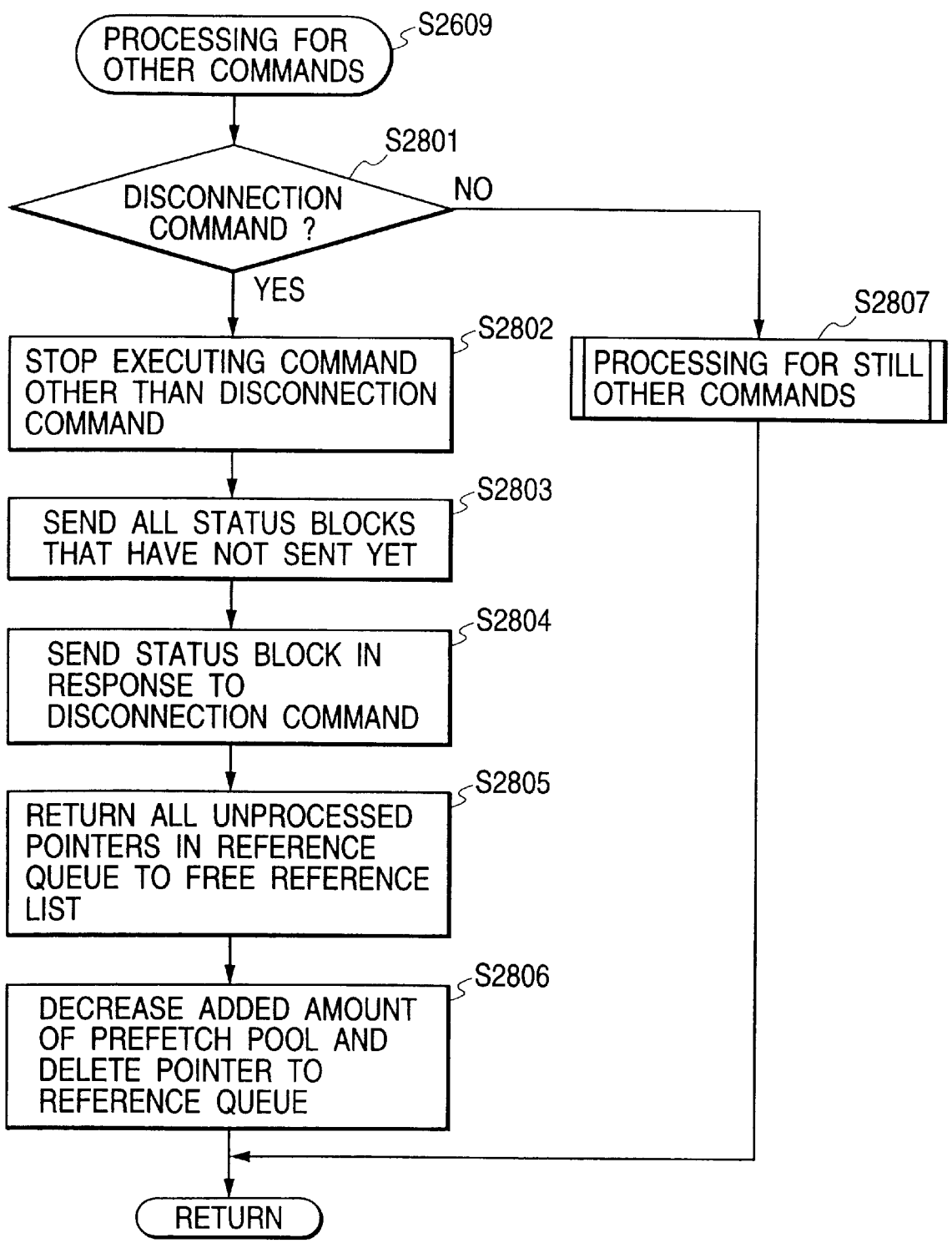
FIG. 22 is a flowchart for a processing procedure for a disconnecting request of the target.

FIG. 22 shows a disconnection processing procedure of the target. This procedure is located in step S2609 in FIG. 17. First, whether the command is the disconnection command or not is discriminated (step S2801). If it is not the disconnection command, processes of other commands are further performed (step S2807). If it is the disconnection command, among the commands referred to by the reference queue serving as a target of the disconnection, if there is a command which is being executed except for the disconnection command, the execution of such a command is stopped (step S2802). After the execution is stopped, if there are status blocks which are not sent yet among the status blocks for the commands other than the disconnection command referred to by the reference queue, all of them are sent (step S2803). After that, the status block in response to the disconnection command is returned (step S2804). At this time point, all of the un-processed pointers remaining in the reference queue are returned to the free reference list (step S2805). If the prefetch pool was increased upon connection, the added amount is decreased and the pointers in the free reference list which is referred to are deleted by the decreased amount. Further, the pointers or the like for the reference queues are also deleted (step S2806). The processing routine is returned.

As shown in FIGS. 7A and 7B, a field of a queue identifier such as QueueID is provided for the ORB. Therefore, the SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included there.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target anytime. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that communicating efficiency and resource using efficiency of the target are improved. Since the command pool area of the target is increased or decreased in accordance with the number of queues which are used for connection, the resource using efficiency of the target is improved.

<KILL Command>

As mentioned above, the multichannels can be provided between the client of the initiator and the client of the target by SHPT-2. However, in this state, for example, in the case where the process of the target is stopped due to some reason, a command in the path in which the process is connected to the initiator is not processed. Therefore, in the case where the issued commands including the command that is being processed are cancelled in a lump for the stopped process or the like, the command is blocked by the ORB which was issued precedently, the cancel command does not reach the process of the target, and the commands cannot be cancelled on a path unit basis.

For example, a printer is now presumed as a target. When the absence of the paper occurs in the printer, since an output destination of data disappears, the rendering process also has to be stopped. When the print job is aborted, the cancel command is linked after the write command which has been issued precedently and is used for allowing the printer to print, so that the cancel command cannot be issued for the rendering process.

Therefore, a queue other than the relevant queue, in the embodiment, the management queue is used and a KILL command to extinguish such a queue for the target is prepared. Since SHPT-2 operates on SBP-2, it is necessary to perform a process of the KILL command in accordance with the rule of SBP-2. Therefore, the initiator and the target mainly operate as follows with regard to the KILL command.

1. The SHPT user (all of the users who give instructions to the SHPT layer) of the initiator designates a specific (logic) channel and instructs the agent to cancel the (logic) channel.
2. The management agent of the queue which received the cancel instruction stops the operation for converting a new command to an ORB and issuing it at this time point. The agent requests the management queue management agent to issue the KILL command for the designated queue.
3. The management queue management agent which received the request writes the designated QueueID as a queue for allowing an ORB of the KILL command to be formed and extinguished.
4. The management queue management agent issues the ORB.
5. The execution agent (execution agent regarding the management reference queue) of the target which received the KILL command of the ORB sends the contents to the execution agent of the relevant queue and stores the status block regarding the KILL command.
6. The execution agent of each queue which received the transmitted message indicating that the KILL command was issued operates as follows.
   If there is an ORB whose execution has already been completed and the status block is not stored, the ORB is stored.
   If there is an ORB which is at present being executed, the execution of the ORB (command) is stopped at this time point and the status block having a status of "Aborted" is stored.
   At this time point, the execution agent of the relevant queue nullifies the substance of the command itself in a manner similar to the case of receiving a disconnect command.
7. As for the subsequent ORBs for the relevant queue, the ORB dispatcher stores the status block by the status of "queueID error".
8. The agent of the relevant queue of the initiator which received the status block of "Aborted" reports the abortion to an upper apparatus with respect to the command corresponding to the status block of "aborted" and releases the memory which is occupied by the corresponding ORB.
9. All of the ORBs for the relevant queue subsequent to the ORB corresponding to the status block of "aborted" are cancelled and a message indicating that they were cancelled is reported to the upper apparatus. However, the ORBs are not released in this instance. When all of the ORBs are cancelled, the agent of the relevant queue nullifies the substance of itself.
10. However, the module of the SHPT layer releases the ORB by using a fact that the status block was received by the status of "queueID error" as a trigger.
11. Even if the bus reset occurs after receiving the status block of "aborted", there is no need to re-issue the ORB of the killed queue.

As mentioned above, by issuing the KILL command for a desired I/O request queue as a target, even in case of the queue including the unprocessed command, the request queue, the corresponding reference queue, the queue management agent, and the execution agent are extinguished and the path constructed by them can be extinguished.

The ORB of the KILL command has the same format as that of the disconnect ORB shown in FIG. 11. That is, the ID of the management queue is set into the "QueueID" field. The ID of the queue to be extinguished is set into the "QueueID1" and "QueueID2" fields. A predetermined code corresponding to the KILL command is set into the "Function" field.

The status block for the KILL command is similar to that shown in FIG. 13. The status for the command aborted by the KILL command is "Aborted".

Figure 26:
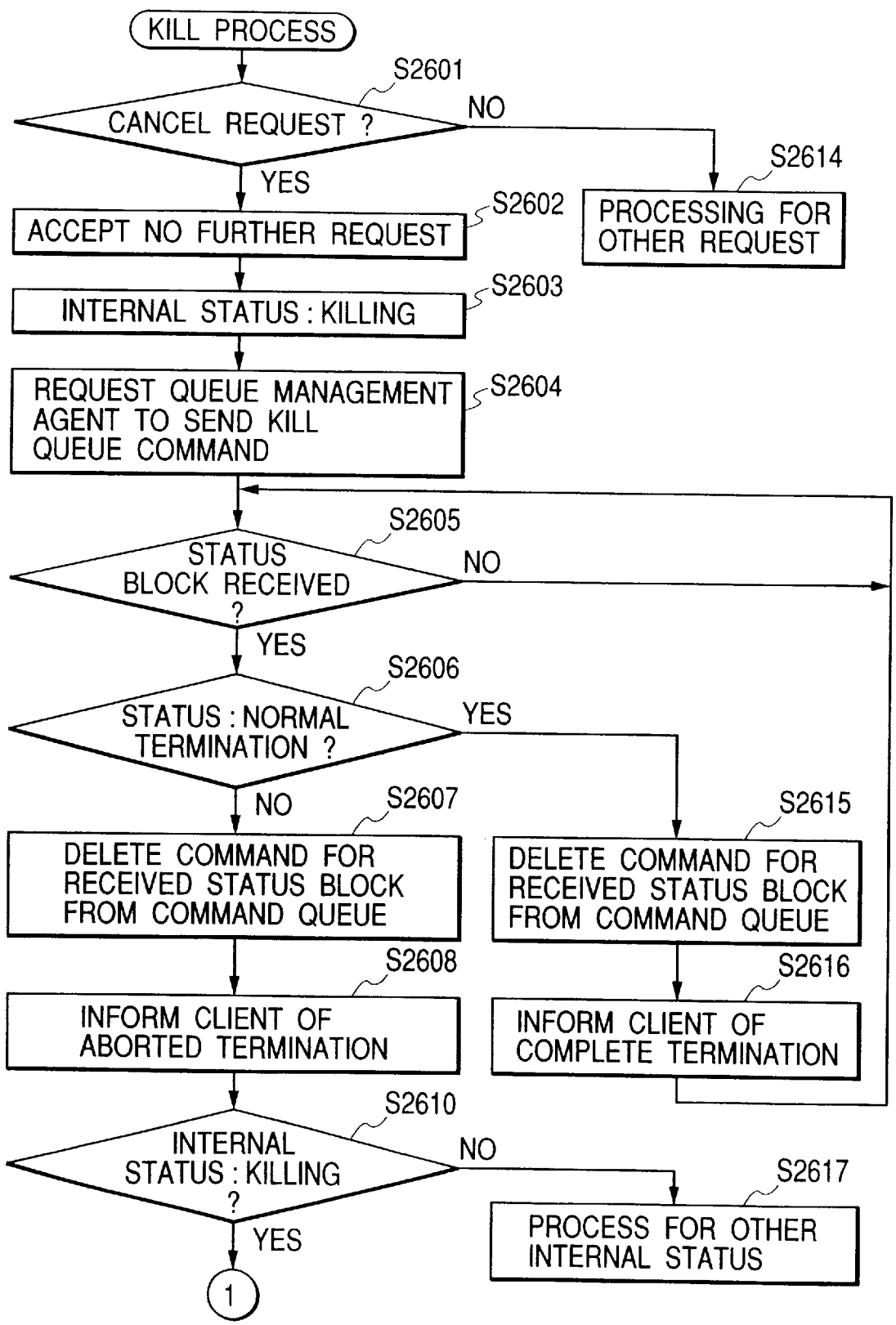
FIG. 26 is a flowchart for a KILL command issuing process by the queue management agent of the initiator.
Figure 27:
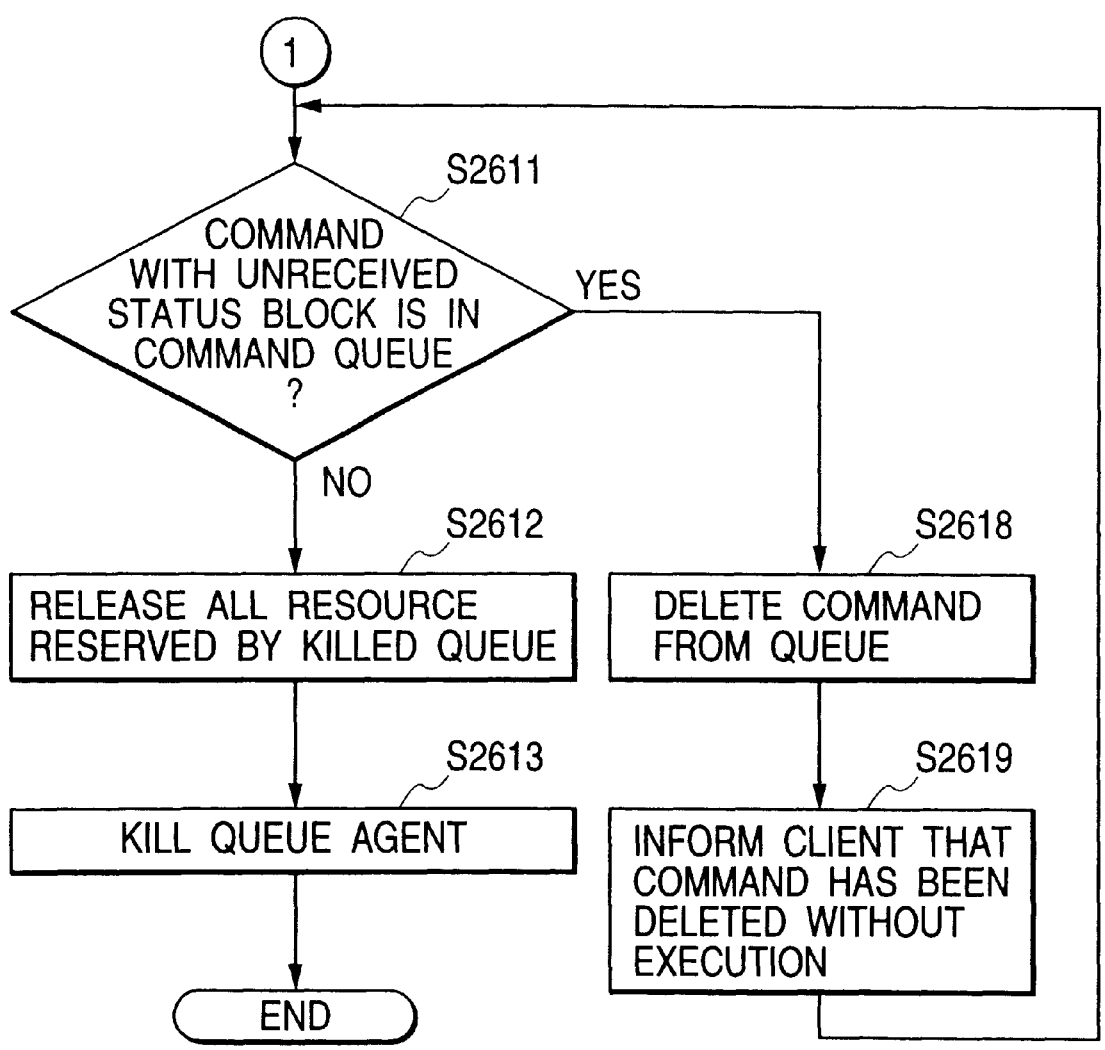
FIG. 27 is a flowchart for the KILL command issuing process by the queue management agent of the initiator.
Figure 28:
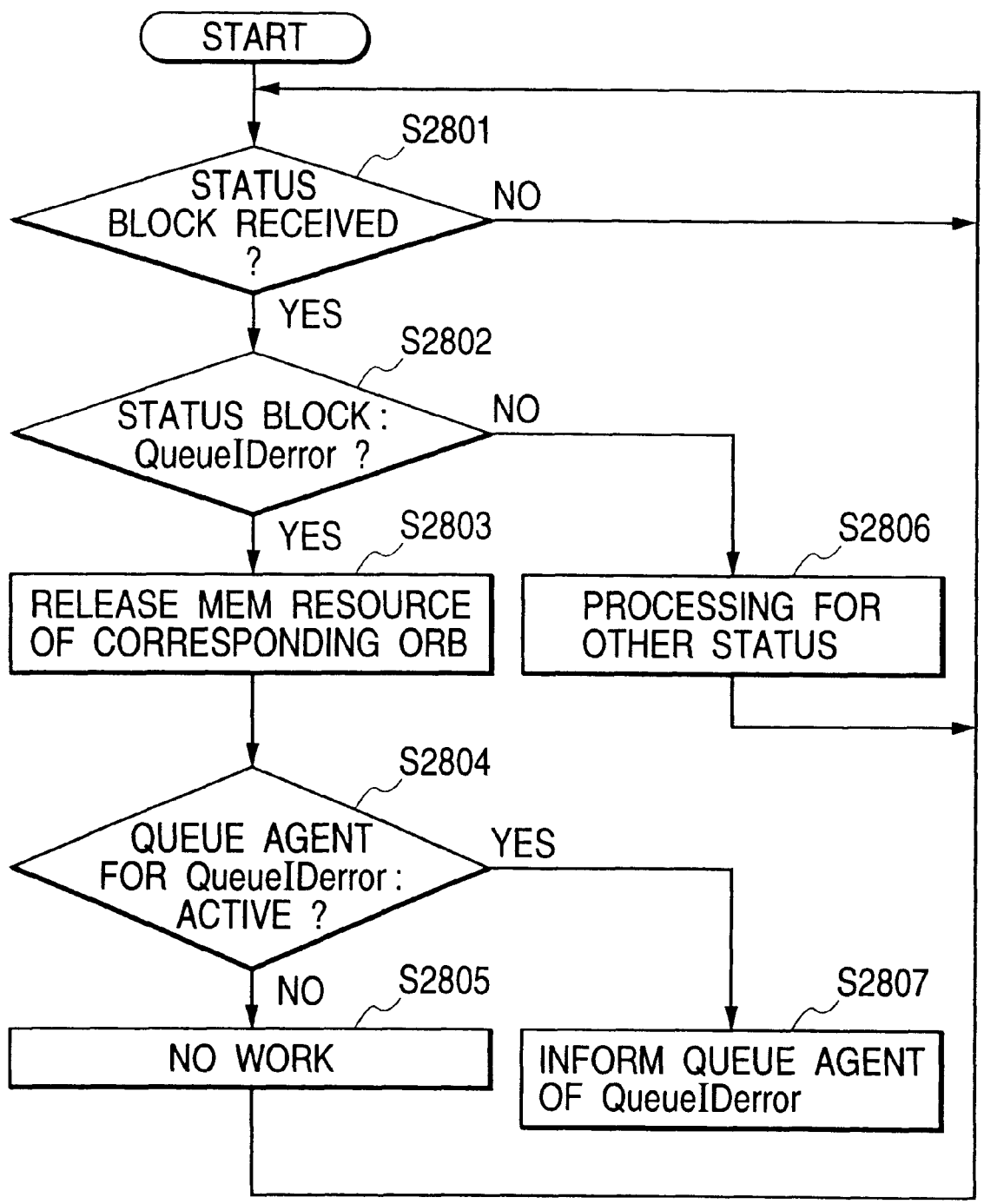
FIG. 28 is a flowchart for a status process by the SBP-2 layer of the initiator.
Figure 29:
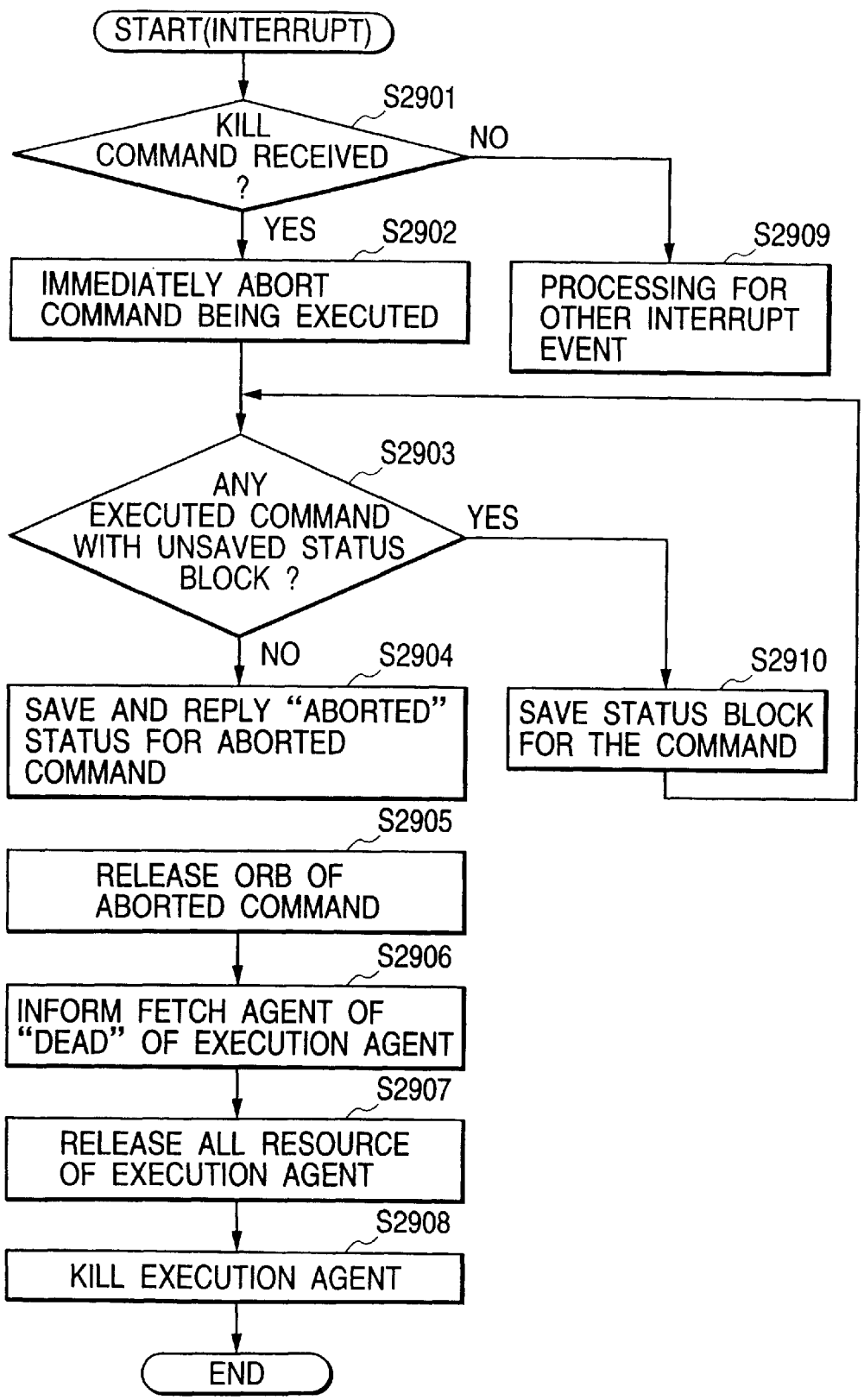
FIG. 29 is a flowchart for the KILL command issuing process by the execution agent of the target.
Figure 30:
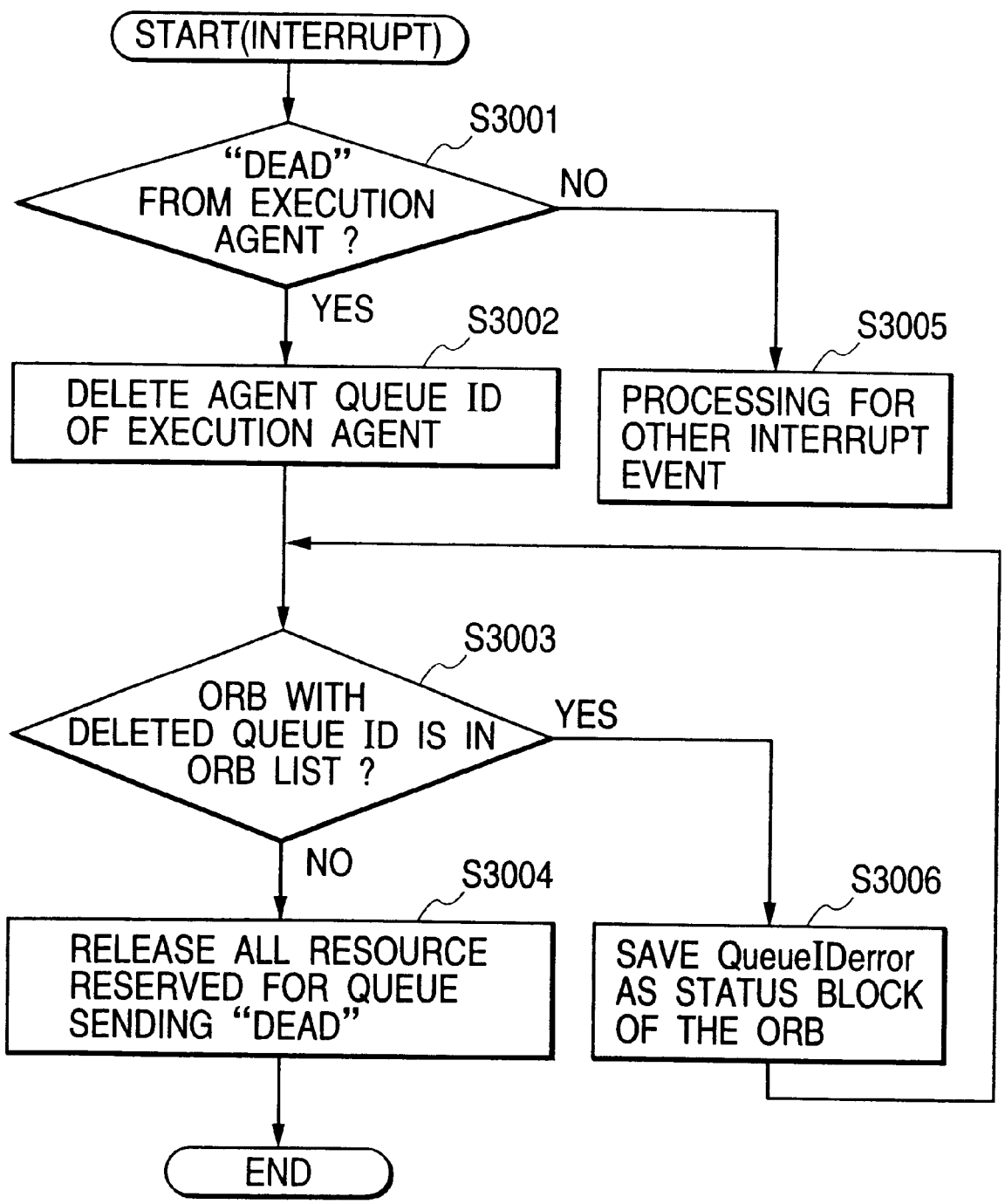
FIG. 30 is a processing flowchart by a fetch agent to fetch a command from a reference queue.

The operation of each section of the initiator and the target is shown in flowcharts of FIGS. 26 to 30. FIGS. 26 and 27 show the operation of the queue management agent to manage each I/O request queue of the initiator. FIG. 28 shows the operation of the manager of the SBP-2 layer. FIG. 28 describes processes which are executed in the SBP-2 layer. FIG. 29 shows processes which are executed by the execution agent of the target. FIG. 30 shows processes which are executed by the fetch agent to fetch the command from the reference queue.

<Process by Queue Management Agent of Initiator>

FIGS. 26 and 27 show a processing procedure when the queue management agent of a certain I/O request queue receives some request from an upper client. However, an explanation of the requests other than the cancel request is omitted here.

The cancel request is issued when the user cancels a certain job. For example, when the print job is cancelled or the like, the cancel request of the queue corresponding to the print job is issued from the client.

First, whether the request from the client is the cancel request or not is discriminated (step S2601). In case of a request other than the cancel request, the process according to it is executed (step S2614).

In case of the cancel request, the request regarding the queue is no longer accepted (step S2602). The internal status is set to "killing" (the KILL command is being processed) (step S2603). It is also possible to construct in a manner such that if the internal status is "killing", the subsequent requests are not accepted. After that, the transmission of the "KILL command (kill queue command)" is requested to the queue management agent of the management queue 203f (step S2604).

After it was requested, the apparatus waits for reception of the status block in step S2605. When the status block is received, the contents of the received status are discriminated (step S2606). When the KILL command is issued and processed, the status for the command which has already been connected to the queue to be killed is "aborted" or "queueID error". Therefore, if the status is normally terminated, it is determined that this status is a response of the normal termination for the command issued before the KILL command. The command corresponding to the status block received from the I/O request queue (command queue) is deleted (step S2615). The normal termination is reported to the upper client (step S2616). After that, the apparatus waits for the status block responsive to the KILL command.

If the received status block is not normally terminated, it is decided that this status is a response to the KILL command. The command corresponding to the status is deleted from the I/O request queue (step S2607). A message indicating that the status block is not normally terminated (it was aborted) is informed to the upper client (step S2608).

After that, whether the internal status is "killing" or not is discriminated in step S2610. This is because the processes in steps S2605 to S2609 and steps S2615 and S2616 can be shared in common with the other processes such as a process "AbortTaskSet", which will be explained hereinlater, and the like.

When the internal status is "killing", whether the command in which the status block is not received yet has been queued in the I/O request queue (command queue) or not is discriminated (step S2611). If there is no command, all of the resources occupied by the queue extinguished by the KILL command are released (step S2612). The management agent itself of the extinguished queue is extinguished (step S2613).

When the command in which the status is not received yet remains in the queue, since this command is not executed anymore, this command is deleted from the queue (step S2618). A message indicating that the command was deleted without being executed is notified to the upper client (step S2619).

By the above procedure, when the KILL command is issued to the queue designated in response to the cancel request and the KILL command is processed in the target, all of the unprocessed commands saved in the queue to be extinguished by the KILL command are cancelled.

<Process by SBP-2 Manager of Initiator>

FIG. 28 shows processes by the manager of the SBP2 layer locating under the SHPT-2 layer. When the execution agent is deleted by the KILL command, a queueID error showing the absence of the queue of the destination is returned as a response of the SBP-2 layer from the fetch agent in response to the command which ought to be processed by the execution agent. FIG. 28 shows a procedure for processing it.

First, the apparatus waits for the reception of the status block (step S2801). Although a similar process is executed even in the diagrams other than FIG. 28, it is assumed that the process for waiting the status black or the like is waited in a loop in the embodiment. However, it is also possible to once terminate the task at a point when the apparatus enters a waiting state and resume it by an interruption of the status reception.

When the status is received, whether the status block is a queueID error or not is discriminated (step S2802). If it is not the queueID error, the process according to this status is performed (step S2806). If it is the queueID error, since this queue does not exist, the memory resource of the corresponding ORB is released (step S2803). Whether the issuing source of the deleted and released ORB, namely, the queue management agent of the SHPT layer corresponding to the queueID error status is not extinguished (it is active) yet or not is discriminated (step S2804). If it is not active, since this means that a partner to which the queueID error is reported is absent, nothing is performed and the apparatus waits for the status block again (step S2805).

If the corresponding agent is active, the queueID error is reported to the agent (step S2807).

By this procedure, the status block for the command which ought to be processed by the extinguished execution agent can be processed by the target.

<Processes by Execution Agent of Target>

In the target, the execution agent of each reference queue which received the notice of the KILL command from the execution agent of the management queue operates as shown in FIG. 29. The notice of the KILL command is accepted by the interruption.

First, whether the notice is the notice of the KILL command is discriminated (step S2901). If NO, the process according to an interrupt event is executed (step S2909). If it is the notice of the KILL command, the command which is being executed at present is immediately aborted (step S2902).

After that, a check is made to see if there is a command in which the status block is unsaved although the execution has been completed (step S2903). If YES, the status block for the command is saved and returned to the initiator (step S2910).

After the process of the completed command is terminated, the status of "Aborted" is informed to the command aborted during the process (step S2904). The ORB of the aborted command is released by a normal procedure (step S2905). A message ("dead") indicative of the extinction of the execution agent is notified to the fetch agent (step S2906). The resource occupied by the execution agent is released (step S2907). Finally, the execution agent itself is extinguished (step S2908).

As mentioned above, in the agent of the target to which the KILL command was issued, the queue and command in the target and the agent itself are extinguished and the "Aborted" status is returned, thereby notifying the initiator of a point that a series of processes regarding the KILL command is executed.

<Operation by Fetch Agent of Target>

The fetch agent which received the notice of "dead" in step S2906 in FIG. 29 operates in accordance with a procedure of FIG. 30.

First, whether the interrupt event is the "dead" notice from the execution agent or not is discriminated and, if NO, the process corresponding to the interrupt event is performed (step S3001). If it is not the "dead" notice, the queueID (agent QueueID) corresponding to the agent which sent the "dead" notice is deleted from an active queue list as a list of the active agents possessed by the fetch agent (step S3002). After that, a check is made to see if the command belonging to the agent queueID, namely, the ORB having the deleted queueID is included in the ORB list (step S3003). If YES, with respect to this ORB, the queueID error status is saved in the status block and returned to the initiator (step S3006). If it is not included, all of the resources reserved by the fetch agent for the queue which sent the "dead" notice are released (step S3004).

As described above, since the process in each of the initiator and the target operates, even if the queue to be extinguished is blocked by the unprocessed command, it can be extinguished by designating the queue (path). Thus, the processes can be progressed in the other queues (paths) without being influenced by the KILL command.

<AbortTaskSet Process>

The "AbortTaskSet" process will now be described. The "AbortTaskSet" process is not the command defined in SHPT-2 but a command defined in SBP-2. When mismatching occurs between the initiator and the target due to an inconvenience of a module of the SBP-2 layer or the like, this command is issued and executed to eliminate the mismatching.

When the AbortTaskSet command is executed, all of the ORBs linked to the ORB list are erased at this time point. Therefore, even if a cause of the mismatching exists in one channel which is provided by SHPT-2, the influence is exercised on all of the other channels. Since the inherent object of SHPT-2 such that the independent channels are provided is consequently lost, in SHPT-2, there is provided a function such that even if the AbortTaskSet command is executed in the SBP-2 layer, the operation specified in SBP-2 such that the ORB is erased is executed in accordance with the specified rule and the influence is minimized. An outline of this function will now be described hereinbelow.

<Outline of the Operation for AbortTaskSet Command>

(Operation Regarding Queue with Error)

The target receives the AbortTaskSet command in the management register.

The management execution agent notifies the execution agent in each queue so as to immediately abort the execution.

Each execution agent which received the notice of the abortion of the execution instantaneously aborts the execution. If there is any ORB in which the status block of the execution completion is not saved although the execution has been completed, the status block of the execution completion is saved to this ORB.

Current execution information of the command whose execution was aborted is stored. Namely, the SeqID of the aborted command is saved into the SeqID at the aborted time point, and the number of unexecuted bytes of the command is saved into residual at that time point. "SeqID" is an identifier assigned to the command, and "residual" is a pointer indicative of the unprocessed area of the data linked to the command. They are held in the target while being updated successively during the process of the command. The "SeqID" and "residual" are saved into areas (called SeqID and residual upon abortion) different from the areas (called current SeqID and residual) for the command which is being processed. That is, a data area of the data that is unprocessed due to the abortion is stored.

Subsequently, "SeqID+1" of the command whose execution was aborted is written into current SeqID. "Null" (no byte is executed) is written into current residual.

The status block having the aborted status is saved to the aborted command (ORB).

All of the ORBs (commands) in the target for the relevant queue as a target are cancelled.

When the status block having the Aborted status is received, the agent of the queue of SHPT in the initiator understands that the AbortTaskSet was issued.

The SBP-2 layer cancels all of the unprocessed ORBs belonging to such a queue are cancelled. In response to the command corresponding to the status block having the Aborted status and the subsequent command belonging to such a queue, the SHPT layer reports the cancellation to the upper layer.

If the upper layer has a will to resume, the upper layer maintains the contents in the memory buffer associated with the ORB corresponding to the status having the Aborted status and the memory buffer associated with the subsequent commands and requests the SHPT layer to resume.

The SHPT layer assigns the same SeqID as the command of the ORB corresponding to the status block having the received Aborted status to a parameter for a resuming request and requests the SBP-2 layer to form and issue an ORB.

If the upper layer does not have the will to resume the aborted command, a new request is asked to the SHPT layer. The SHPT layer assigns SeqID+1 of the command corresponding to the status block having the received Aborted status to the new command and requests the SBP-2 layer to form an ORB.

The execution agent of the relevant queue which received the ORB (command) for the first time after completion of the AbortTaskSet command refers to SeqID of the received command.

If the SeqID is the same as the current SeqID as a result of the reference, the execution agent understands that it is a new command, and executes the command from the beginning. All of the contents of SeqID and residual upon abortion are cleared at a point when the first data transmission is terminated normally.

If the SeqID is different from the current SeqID as a result of the reference, it is compared with the SeqID upon abortion. If it is identical to the current SeqID, the execution agent understands that the aborted command is resumed, copies the contents of the SeqID and residual upon abortion to the current SeqID and residual, and resumes the execution in accordance with the copied contents.

When a transaction of the first data transmission succeeds, all of the contents in the SeqID and residual upon abortion are cleared.

(Operation Regarding Queue without Error)

The target receives the AbortTaskSet command into the management register.

The management execution agent notifies the execution agent in each queue so as to immediately abort the execution.

Each execution agent which received the notice to abort the execution immediately aborts the execution. If there is any ORB in which the status block of the execution completion is not saved although the execution has already been completed, the status block of the execution completion is saved into this ORB.

Current execution information of the command whose execution was aborted is stored. Namely, the SeqID of the aborted command is saved into the SeqID at the aborted time point, and the number of unexecuted bytes of the command is saved into residual at that time point. SeqID+1 of the command whose execution was aborted is written into the current SeqID. "Null" (no byte is executed) is written into the current residual.

The status block having the Aborted status is saved into the aborted command (ORB).

All of the ORBs (commands) in the target for the relevant queue as a target are cancelled.

When the status block having the Aborted status is received, the agent of the queue of SHPT in the initiator understands that the AbortTaskSet command was issued.

The unprocessed ORBs belonging to the queue are cancelled in the SBP-2 layer.

To resume the aborted command, the SHPT layer forms a command having a buffer of the same parameter, same SeqID, and same contents as those of the command of the ORB corresponding to the status block having the received Aborted status, and requests the SBP-2 layer to form and issue an ORB.

The execution agent of the relevant queue which received the ORB (command) for the first time after completion of the execution of the AbortTaskSet command refers to the SeqID of the received command.

If it is the same as the current SeqID as a result of the reference, the execution agent understands that it is a new command and executes the command from the beginning. All of the contents of SeqID and residual upon abortion are cleared at a point when the first data transmission is normally terminated.

If the SeqID differs from the current SeqID as a result of the reference, it is compared with the SeqID upon abortion. If it is identical to the current SeqID, the execution agent understands that the aborted command is resumed, copies the contents of the SeqID and residual upon abortion to the current SeqID and residual, and resumes the execution in accordance with the copied contents.

When the transaction of the first data transmission succeeds, all of the contents of the SeqID and residual upon abortion are cleared.

As mentioned above, with respect to the queue with the error, the command can be executed continuously or a new command can be processed in accordance with a will of the upper client. As for the queue without an error, the AbortTaskSet command can be processed without influencing the upper client of the SHPT layer.

Figure 36:
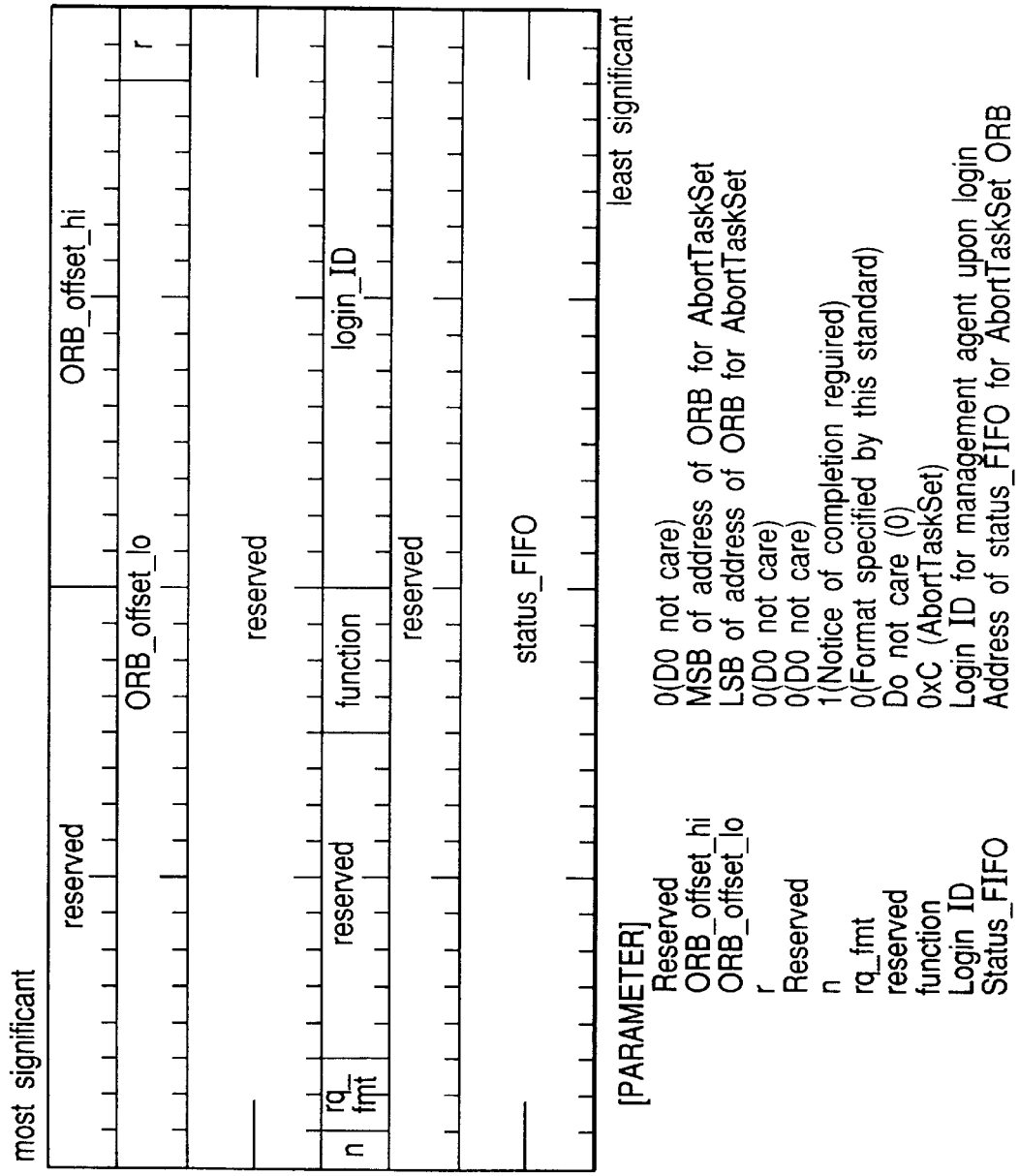
FIG. 36 is a diagram showing a format of a management ORB of the AbortTaskSet command.

FIG. 36 shows a format of the management ORB of the AbortTaskSet command. The kind of command is shown by the "function" field. An address in an FIFO to return the status is designated by a "status_FIFO" field of the command. This command is executed by the management execution agent (not shown in FIG. 1).

Figure 37:
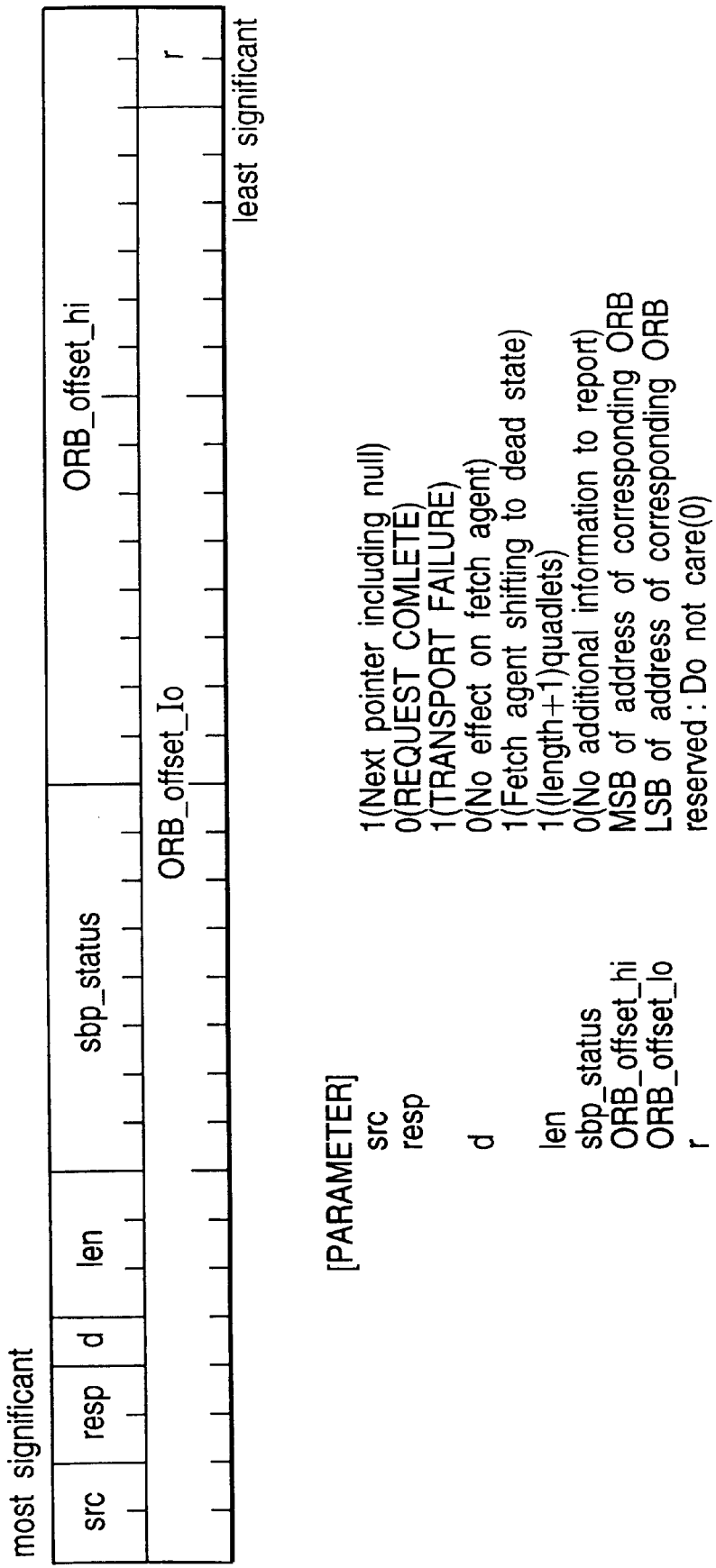
FIG. 37 is a diagram showing a format of a status block for the AbortTaskSet command.

FIG. 37 shows a format of the status block for the AbortTaskSet command. The issuer of the AbortTaskSet command can discriminate whether this command has been processed normally or not by referring to this status.

Figure 31:
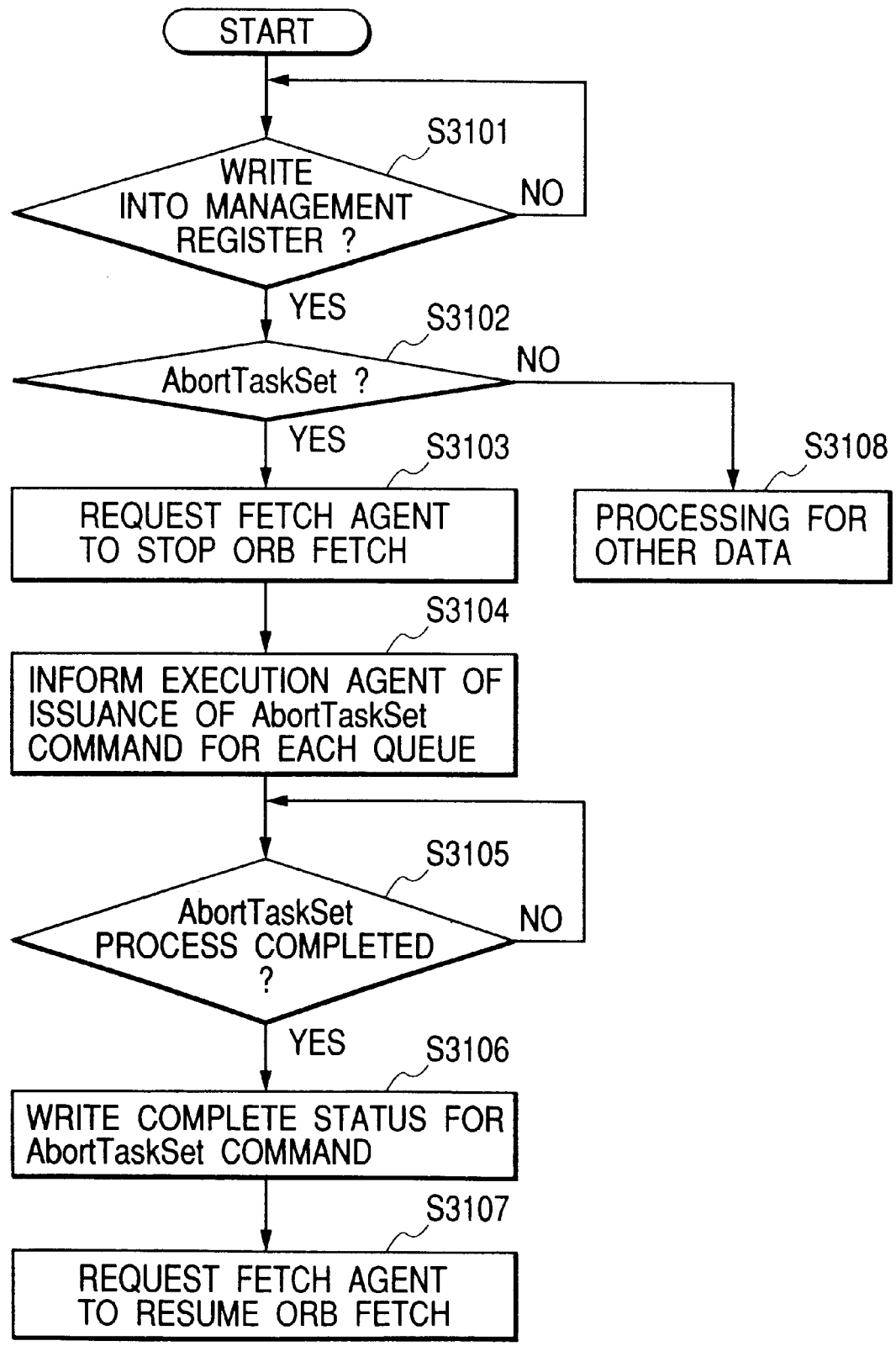
FIG. 31 is a processing flowchart for an AbortTaskSet command by a management register execution agent of the target.
Figure 32:
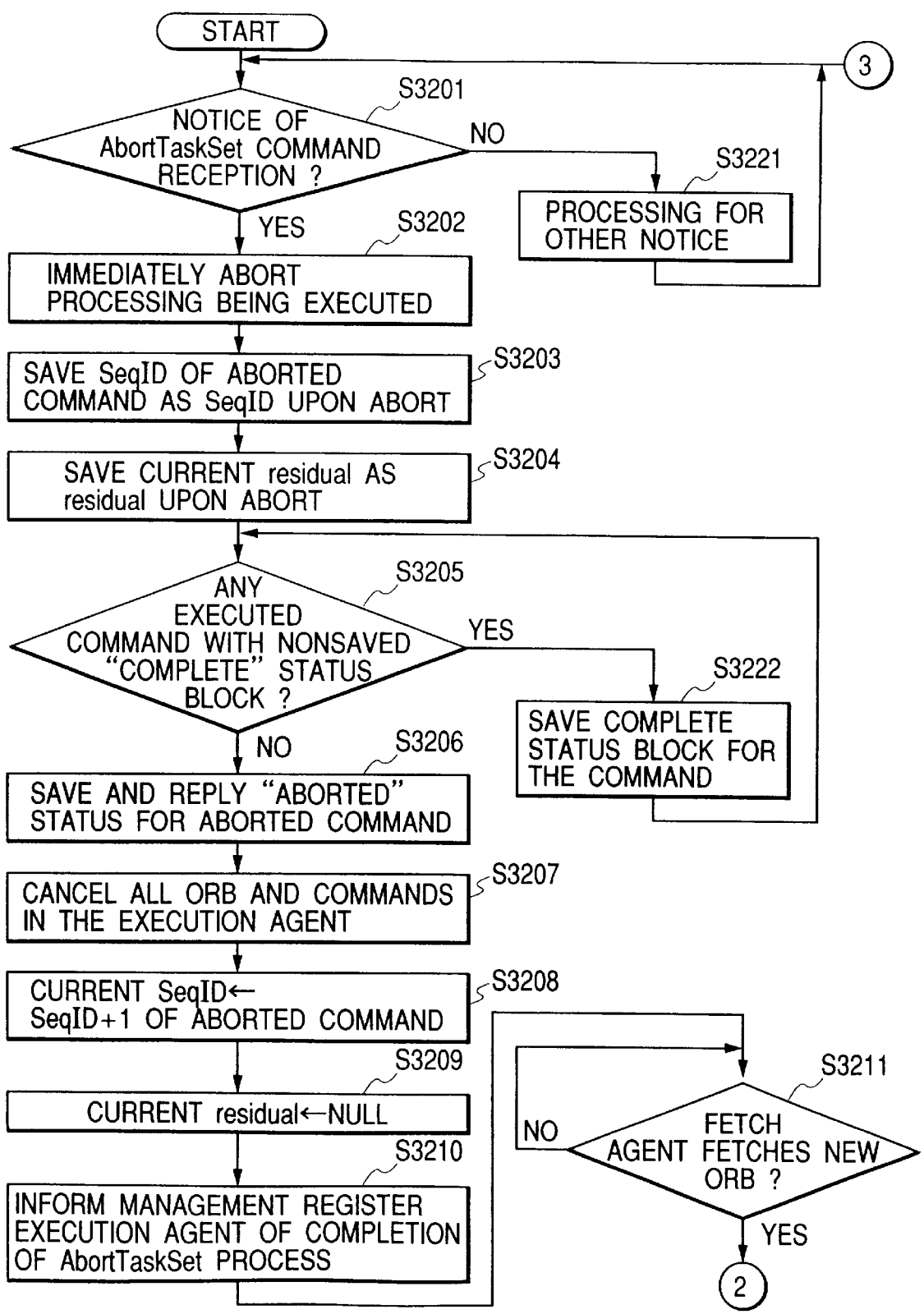
FIG. 32 is a processing flowchart after the reception of the AbortTaskSet command by the execution agent of each target.
Figure 33:
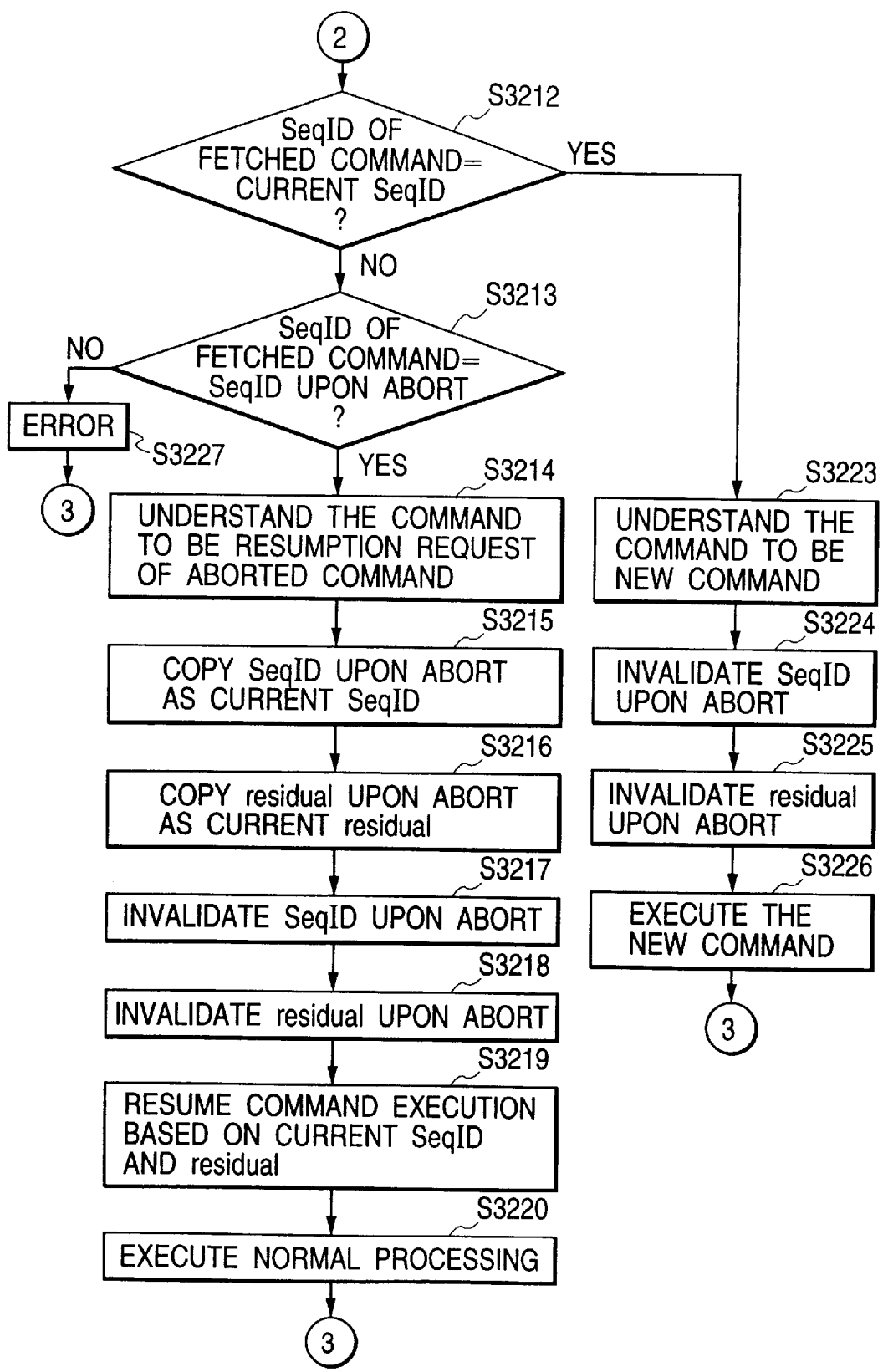
FIG. 33 is a processing flowchart after the reception of the AbortTaskSet command by the execution agent of each target.
Figure 34:
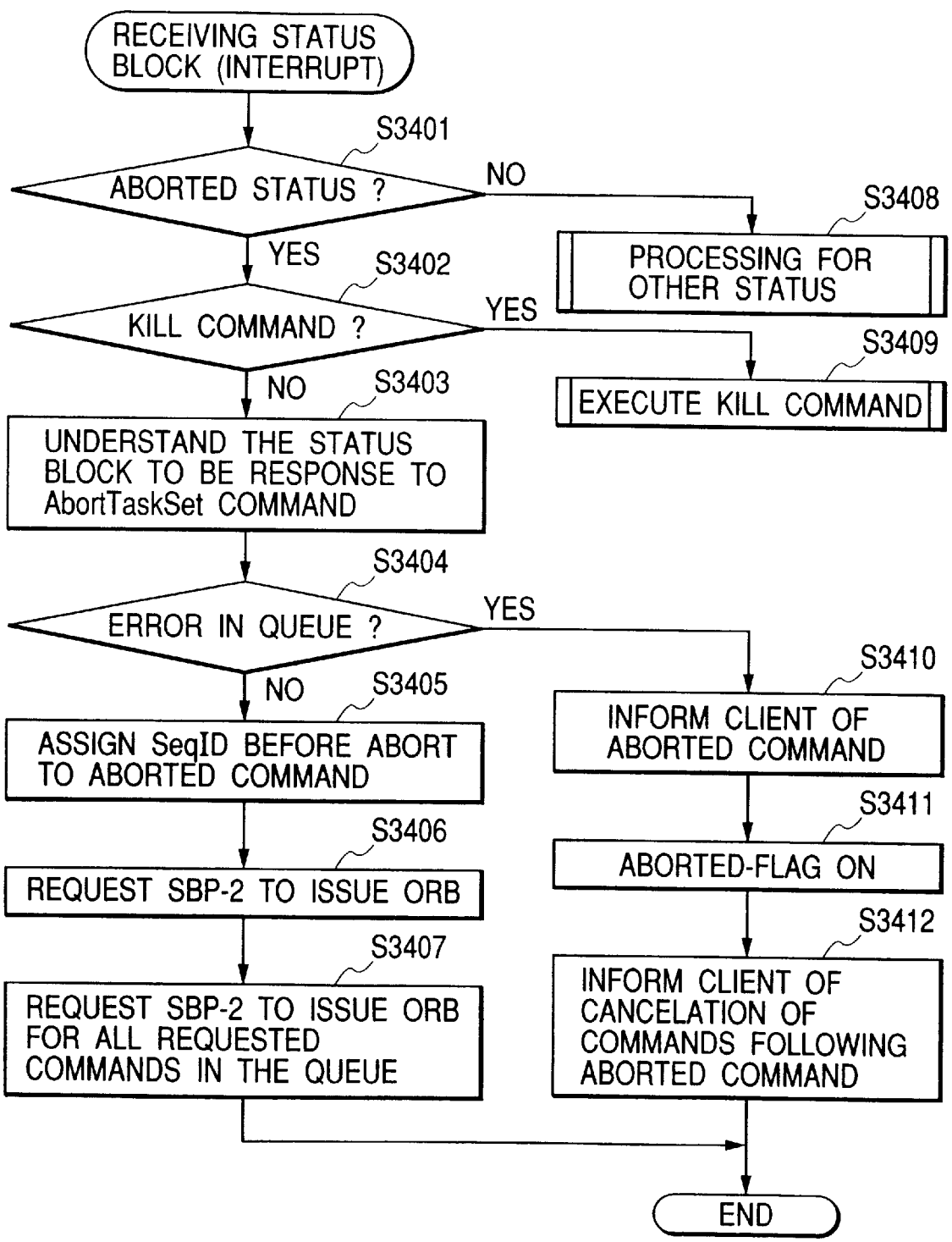
FIG. 34 is a flowchart for a status receiving process by the queue management agent in the initiator.
Figure 35:
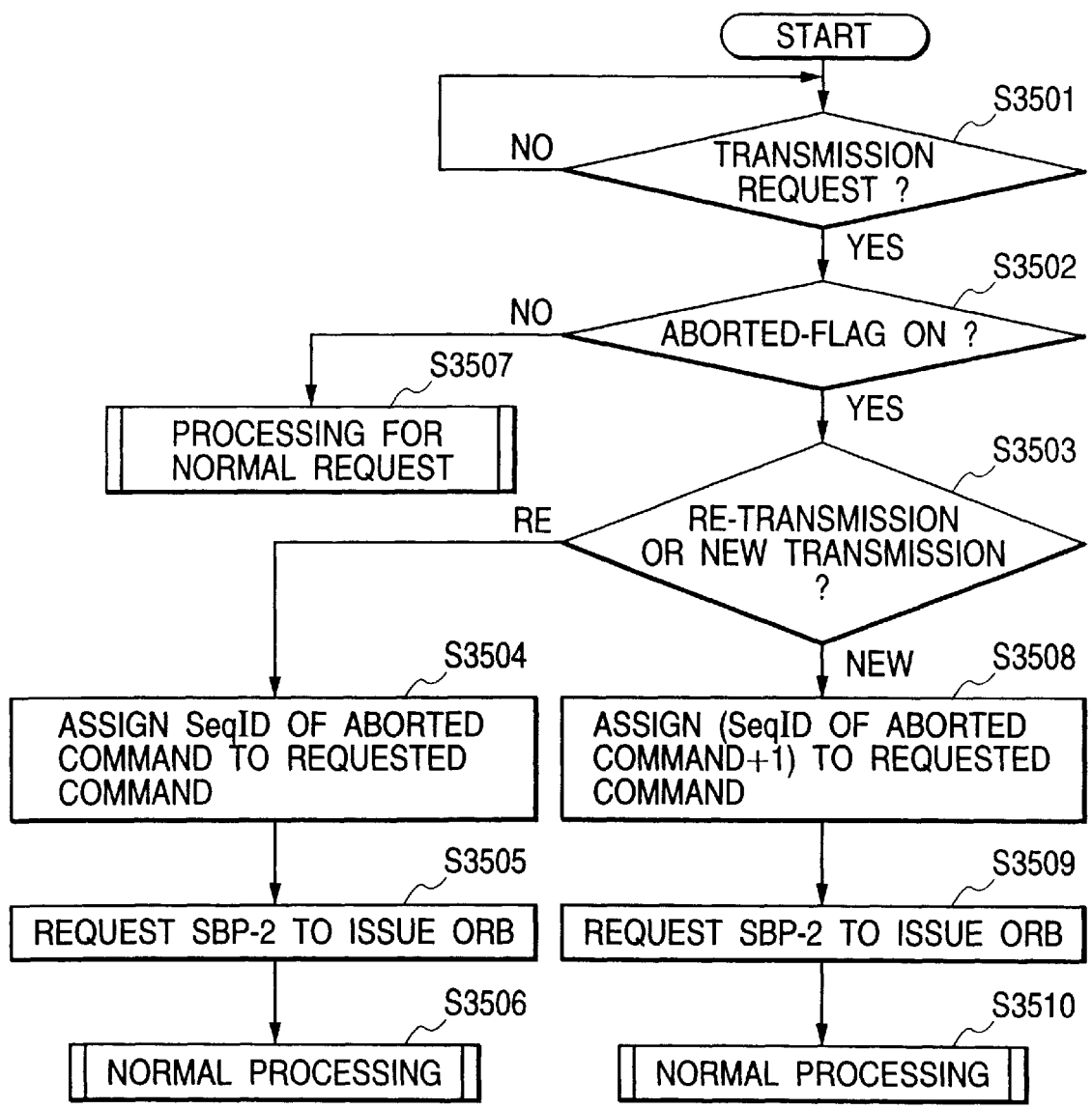
FIG. 35 is a flowchart for a requesting process from a client by the queue management agent in the initiator.

The contents of the processes by each of the initiator and the target will now be described with reference to flowcharts of FIGS. 31 to 35. FIG. 31 shows a processing procedure by the management register execution agent when data is written into a management register existing in the target. FIGS. 32 and 33 show processes in the execution agent with respect to each queue of the target. FIG. 34 shows a processing procedure when the queue management agent of the initiator receives the status block. FIG. 35 likewise shows a processing procedure when the queue management agent receives a transmission request from the upper client.

<Processes by Management Register Execution Agent in Target>

The management register exists in the target as shown in FIG. 1 and can write some data from the initiator. This writing operation is performed to send the command for managing the SBP-2 layer to the target. For example, the AbortTaskSet command is written in the case where an error of the SBP-2 layer, for example, an error of the queueID, a time-out of a retry, an error report from the upper client, or the like is found out by the client process or the like. FIG. 31 shows a procedure for performing the process according to a value which is written in the management register when it is written therein.

In step S3101, the apparatus first waits until a command is written into the management register. The writing operation can be also performed by using the interruption as a trigger. When a command is written, whether its contents indicate the AbortTaskSet command or not is discriminated (step S3102). If NO, a process corresponding to the contents is performed but its description is omitted here (step S3108).

If YES, the fetching of the ORB by the fetch agent is stopped (step S3103). A message showing that the AbortTaskSet command was issued to the execution agent with respect to all of the queues is informed (step S3104). The execution agent performs processes, which will be explained hereinlater, on the basis of this notice. The completion of the process for the AbortTaskSet command is reported to the management register execution agent. In step S3105, the apparatus waits for the arrival of the completion notices from all of the execution agent.

When the completion notices are received from all of the execution agent, the status of the completion for the AbortTaskSet command is returned to the initiator (step S3106). This response is not concerned with the SHPT layer. Finally, the resume of the fetching of the ORB is requested to the fetch agent (step S3107). The processing routine is terminated.

<Processes by Execution Agent in Target>

FIGS. 32 and 33 show a processing procedure by each execution agent which receives the notice in step S3104 in FIG. 31.

First, whether the a notice indicative of the reception of the AbortTaskSet command has arrived or not is discriminated (step S3201). If NO, the normal process is performed (step S3221). If YES, the process which is being executed at present is aborted immediately. The processing routine of FIG. 32 can be started from step S3202 by an interruption. At the same time, the SeqID of the aborted command is saved as SeqID upon abortion every execution agent (step S3203). The address in the data buffer which is unprocessed due to the abortion, namely, the current residual is saved as a residual upon abortion (step S3204).

A check is made to see if there is any command in which the status block of the completion notice is not saved after the abortion of the command process in spite of a fact that is has already been completed, namely, command (ORB) which does not send a response showing the completion to the initiator (step S3205). If YES, the status block of the completion is saved with respect to all of those commands (step S3222).

After the saving, the status block to wait for the Aborted status is saved for the command whose execution was aborted and the apparatus responds to the initiator (step S3206). All of the ORBs and commands belonging to the execution agent are cancelled (step S3207). The SeqID of the aborted command is saved as a current SeqID (step S3208). "NULL" is saved as a current residual (step S3209). The processes for AbortTaskSet are terminated in this manner and a preparation for processing a new command is completed. Therefore, the completion of the process of AbortTaskSet is informed to the management register execution agent (step S3210).

In step S3211, the apparatus waits until the fetch agent activated in step S3107 in FIG. 31 fetches a new ORB. In this instance, the process can be also started by the interruption after the fetching.

When the new ORB is fetched, whether the SeqID of the fetched command (ORB) is equal to the current SeqID set in step S3208 or not is discriminated (step S3212). When it is determined that they are not equal, whether the SeqID of the fetched command is equal to the value saved as SeqID upon abortion in step S3203 or not is discriminated (step S3213). If the SeqID of the fetched command is none of the above values, since this means that the incorrect SeqID has been assigned to the command, an error process is performed (step S3227).

When the SeqID of the fetched command is equal to the value saved as SeqID upon abortion in step S3203, it is understood that the command is a request to resume the aborted command, and the value saved as SeqID upon abortion in step S3203 is copied as a current SeqID (steps S3214 and S3215). Similarly, the residual upon abortion saved in step S3204 is copied as a current residual (step S3216). The unnecessary SeqID and residual upon abortion are invalidated (steps S3217 and S3218).

The execution of the command is resumed in accordance with the current SeqID and residual set in steps S3215 and S3216 (step S3219). After that, the processing routine is returned to the normal process (step S3220).

When it is determined in step S3212 that the SeqID of the fetched command (ORB) is equal to the current SeqID set in step S3208, it is understood that the command is a new command, and the unnecessary SeqID and residual upon abortion are invalidated (steps S3223 to S3225). The new fetched command is executed (step S3226). The processing routine is returned to the normal process.

As mentioned above, in the target, whether the command is a command to resume after the abortion or a new command is discriminated by the value of SeqID assigned to the command. In accordance with the discrimination result, if it is the command to resume, the process is executed continuously. If it is the new command, this command is newly executed.

<Processing Procedure (Status Process) by Queue Management Agent in Initiator>

FIG. 34 shows a processing procedure by each queue management agent to manage each I/O request queue of the initiator.

When the status block is received, whether the Aborted status exists in the received status block or not is discriminated (step S3401). If NO, the normal process is performed (step S3408). If YES, whether the KILL command has been issued or not is discriminated (step S3402). It is sufficient to perform this discrimination with reference to the internal status set in step S2603 in FIG. 26. If the KILL command was issued, the process of the KILL command shown in FIGS. 26 and 27 is executed (step S3409).

If the KILL command is not issued, it is understood that there is a response to the AbortTaskSet command, and whether an error has occurred in the queue regarding the queue management agent which executes the relevant process or not is discriminated (steps S3403 and S3404). Various contents of the generated error are considered. For example, there are an error of the queueID, a time-out of the retry, an error state notified from the upper client, and the like.

When it is decided that no error occurs, the same SeqID as that before abortion is assigned to the aborted command (step S3405) and the issue of the ORB is requested to the SBP-2 layer (step S3406). The ORB issuing request itself is similar to the process which is executed ordinarily.

After that, the SHPT of the same queue after the aborted command requests the SBP-2 to issue the ORBs for all of the commands which received the request from the upper client (step S3407). That is, the issue of the ORB is requested again to the SBP-2 with respect to all of the commands linked to the request queue as a target of the management of the agent to execute the current process.

With regard to the command included in the queue which was determined to be the queue having no error in steps S3405 to S3407, the process is returned to the state before the abortion by AbortTaskSet.

When it is decided in step S3404 that the error occurred, all of the commands regarding the queue having an error are cancelled. Therefore, the aborted command is informed to the upper client (step S3410) and an aborted flag (Aborted FLG) is turned on (step S3411). All of the commands queued after the aborted command are erased and a message showing that the erased commands were cancelled is informed to the client (step S3412).

By this procedure, as for the queue without an error, even if the AbortTaskSet command is executed, it is guaranteed to return to the state before execution. With respect to the queue having the error, the process can be continued or another process can be started newly in accordance with the process by the upper client.

<Processing Procedure (Instruction from Upper Client) by Queue Management Agent in Initiator>

FIG. 35 shows a procedure when the queue management agent receives a request from the upper client.

First, the apparatus waits for the transmission request from the upper client (step S3501). When the transmission request arrives, the aborted flag (Aborted FLG) is tested (step S3502). When the queue management manager which received the status block of Aborted status determines that there is an error in the queue as a management target, the Aborted FLG is set in step S3411 in FIG. 34. If this flag is not ON, since this transmission request is a normal request, the command is processed in the normal manner (step S3507).

When this flag is ON, whether the transmission request indicates the re-transmission of the aborted transmission request or a new transmission request is discriminated. As a standard in this discrimination, for example, it is sufficient to provide a flag for retransmission or the like every queue and discriminate by the ON/OFF state of such a flag.

In case of the re-transmission request, the same SeqID as that of the aborted command is assigned to the command in which the re-transmission was requested (step S3504) and the issue of the ORB is requested to the SBP-2 layer (step S3505). After that, the processing routine is returned to the normal process. When the process is terminated, the apparatus waits for the arrival of the transmission request (step S3506).

When the request is the new transmission request, the SeqID that is larger than that of the aborted command by 1 is assigned to the command to be transmitted (step S3508) and the issue of the ORB is requested to the SBP-2 layer (step S3509). After that, the normal process is executed (step S3510).

As mentioned above, when the command execution is aborted by the AbortTaskSet command, with respect to the queue in which the error occurred, all of the commands assigned to this queue are cancelled. However, as for the aborted command, by setting SeqID to the same value as that of the aborted command, the process can be continued or can be switched to a new process.

<Summary of AbortTaskSet Process>

The above processes will now be described with reference to FIGS. 38 to 40. It is now assumed that the execution agent of the target is a write execution agent.

Figure 38:
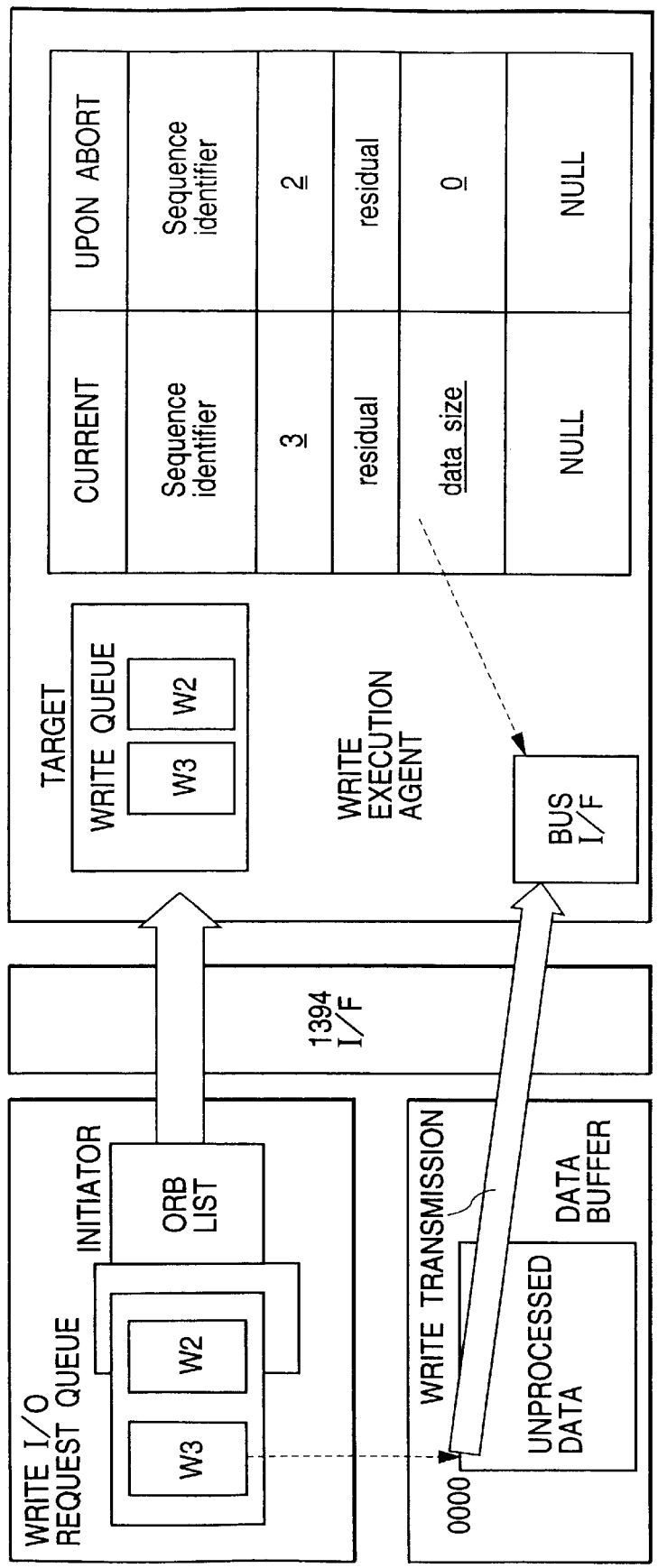
FIG. 38 is a diagram showing a state (no error) after the execution of the AbortTaskSet command.

First, FIG. 38 shows an example of a state after the AbortTaskSet process when there is no error with regard to a write I/O request queue. Commands W2 and W3 (a numeral denotes SeqID) included in the queue upon issuing of the AbortTaskSet command have been queued as they are in a write I/O request queue 3802 of an initiator 3801. The AbortTaskSet is issued during the W2 process, the SeqID of W2 is equal to 2, and the value of residual upon abortion is equal to 4000. Those values are held as a saving value 3806 upon abortion. "3" (=2+1) is set as a current SeqID at the time of abortion.

Since there is no error in the write I/O request queue, all of the contents of an ORB list 3807 and a write queue 3804 are once erased and an ORB for the command in the write I/O queue 3802 is newly issued. In this instance, "2" is assigned as SeqID to the command W2. Thus, the commands W2 and W3 are queued into a write queue of the target in a manner similar to the case before abortion. Since the SeqID of the aborted command is given to the SeqID of the command W2, the values saved at the time of abortion are copied to the current SeqID and residual and the process is continued. The values upon abortion are invalidated. This state is shown in FIG. 38.

Thus, the write I/O request queue and the reference queue regarding this queue are recovered to the states before AbortTaskSet.

Figure 39:
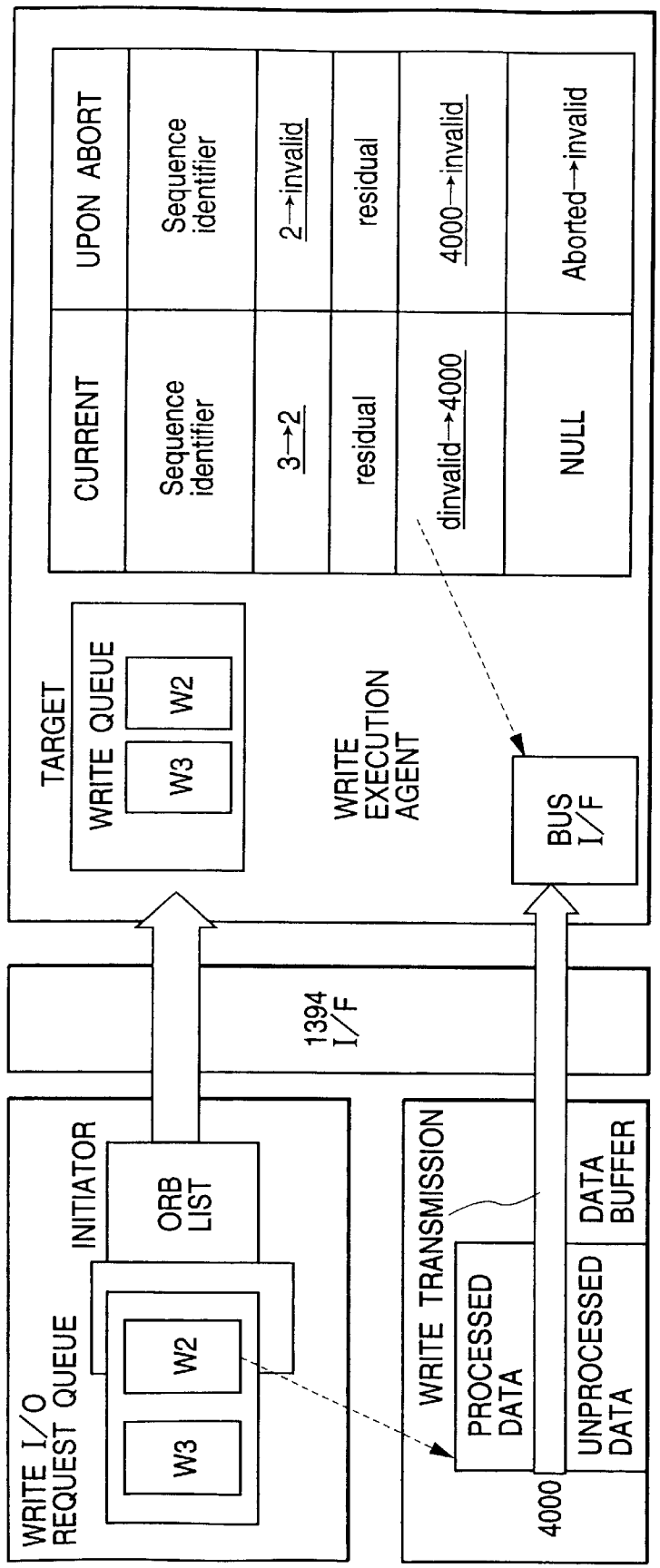
FIG. 39 is a diagram showing a state (error exists) after the execution of the AbortTaskSet command.

FIG. 39 shows a state when the process is started from a new command without continuing the aborted command with respect to the queue with an error. In this case, since the queue has the error, all of the contents in the write I/O queue 3802 in addition to those in the ORB list 3807 and those in the write queue 3804 of the target are once cancelled. After that, when there is a transmission request of the command W3 from the client process, the ORB to which the next value "3" of SeqID upon abortion has been assigned is newly issued. Since this SeqID coincides with a current SeqID 3805, the command W3 is executed from the beginning. This state is shown in FIG. 39.

Even in FIG. 39, by issuing the ORB by the SeqID of the aborted command, the command W2 is continued from the aborted time point.

As described above, according to the communication control method and apparatus of the embodiments, a set of a desired request queue and its management agent and a set of the corresponding reference queue and the execution agent, namely, desired paths can be extinguished at a desired timing by the KILL command using the management queue. Therefore, even if the process of the command in the path to be extinguished is aborted due to some causes, the path can be extinguished immediately. Since no influence is exercised on the paths other than the path to be extinguished, not only the formation and the extinction for every channel linked between the client processes, but also the abortion and extinction of the process can be realized every command of the contents with respect to the channel in which the command which is being processed remains.

Even in the case where the AbortTaskSet command in the SBP-2 layer is executed, as for the queue (path) without an error, the process can be returned to the state before execution of the AbortTaskSet command without participation by the client process. With respect to the queue (path) with an error, although all of its contents are erased, the aborted command can be continued or the process can be resumed from a new command in dependence on the client process.

(Other Embodiments)

The invention can be applied to a system constructed by a plurality of equipment (for example, a host computer, interface equipment, a reader, a printer, and the like) or can be also applied to an apparatus (for example, a copying apparatus, a facsimile apparatus, or the like) comprising one piece of equipment.

As for the initiator, the object of the invention is also accomplished by a method whereby a storage medium in which program codes of the procedures shown in FIGS. 3 to 6, 16, 18, 21, 26 to 28, 34, and 35 have been recorded is supplied to a computer and the computer (or a CPU or an MPU) reads out and executes the program codes stored in the storage medium. As for the target as well, the object of the invention can be also accomplished by a method whereby a storage medium in which program codes of the procedures shown in FIGS. 17, 19, 20, 22, and 29 to 33 have been recorded is supplied to a computer and the computer (or a CPU or an MPU) reads out and executes the program codes stored in the storage medium.

In this case, the program codes themselves read out from the storage medium realize the functions of the foregoing embodiment and the storage medium in which the program codes have been stored constructs the invention.

As a storage medium to supply the program codes, for example, a floppy disk, a hard disk, an optical disk, a magnetooptic disk, a CD-ROM, a CD-R, a magnetic tape, a non-volatile memory card, an ROM, or the like can be used.

The invention incorporates not only a case where the functions of the embodiment mentioned above are realized by executing the read-out program codes by a computer but also a case where the functions of the embodiment mentioned above are realized by a method whereby the OS (Operating System) or the like which operates on the computer executes a part or all of the actual processes on the basis of instructions of the program codes and the functions of the embodiment mentioned above are realized by those processes.

Further, the invention also incorporates a case where the program codes read out from the storage medium are written into a memory equipped for a function expanding board inserted into the computer or a function expanding unit connected to the computer and, after that, a CPU or the like equipped for the function expanding board or function expanding unit executes a part or all of the actual processes on the basis of instructions of the program codes, and the functions of the embodiment mentioned above are realized by those processes.

A main apparatus serving as an initiator by executing the program codes read out from the storage medium is not limited to the computer but any data transmission equipment can be used so long as it has a login ability of SBP-2.

As for the target, pipeline processes can be realized by using a plurality of reference queues, for example, by storing a print job into a first reference queue, storing a read command to confirm a status of the target into a second queue, and storing a finisher control command into a third queue, and after completion of the printing based on a print job, a next print job can be stored into the first reference queue prior to terminating the execution of the function by the finisher.

(Second Embodiment)

Figure 23:
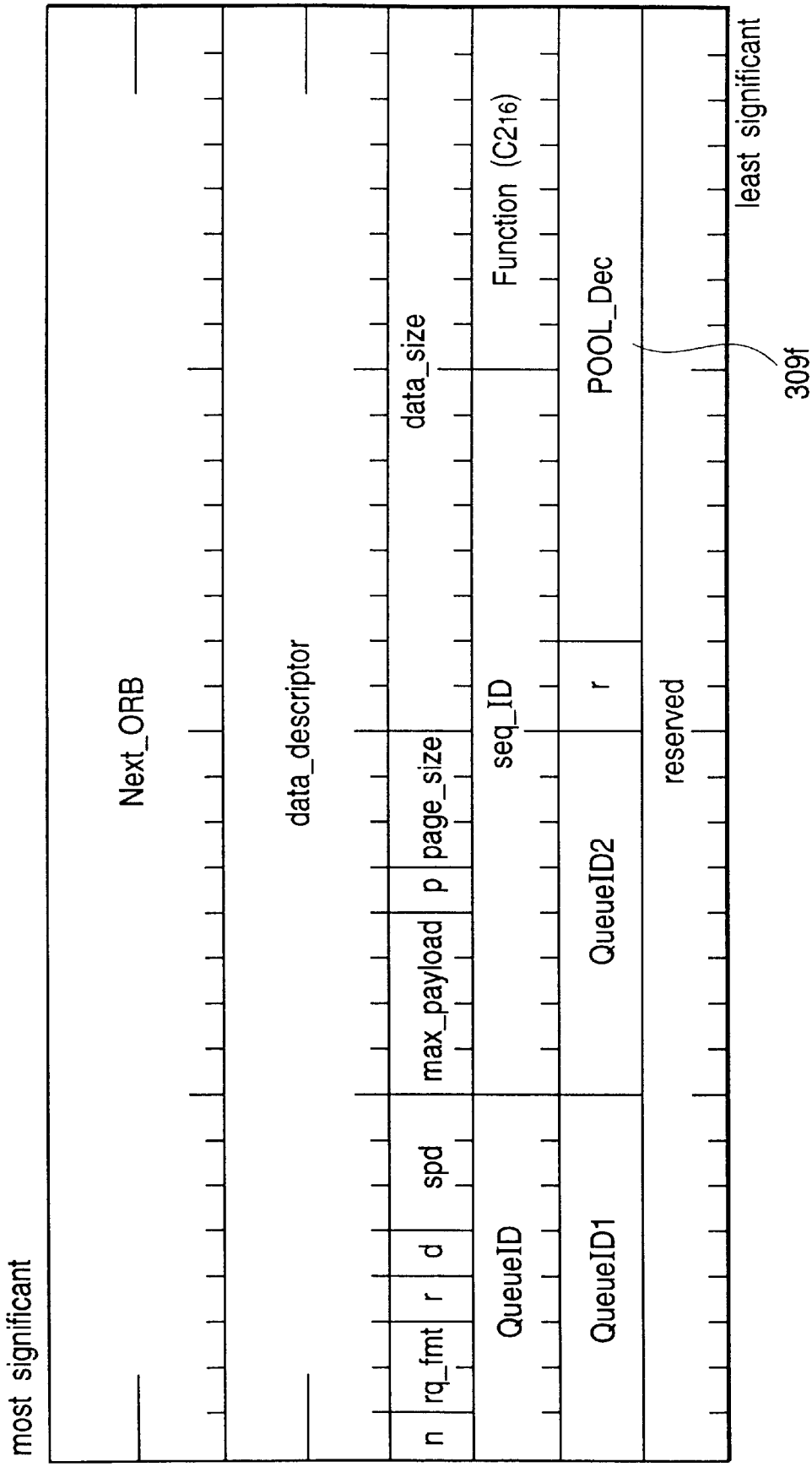
FIG. 23 is a diagram showing a format of a disconnection command ORB according to the second embodiment.

Although the first embodiment has been constructed in a manner such that the capacity of the prefetch pool upon disconnection is decreased by the increased amount at the time of the corresponding connection, the initiator can instruct the decrease amount upon disconnection. In this case, for the disconnection command ORB in FIG. 11, a "POOL_Dec" field 309f is provided and an amount of prefetch pool to be released to the target is designated in this field when the initiator issues the disconnection command as shown in FIG. 23. The command is issued in step S2701 in FIG. 21. The target decreases the prefetch pool by the amount designated by the "POOL_Dec" field in step S2806 in FIG. 22.

Even in this embodiment, the following effects are obtained in a manner similar to the first embodiment. The SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included therein.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target anytime. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that communicating efficiency and resource using efficiency of the target are improved. Since the command pool area of the target is increased or decreased in accordance with the number of queues which are used for connection, the resource using efficiency of the target is improved.

(Third Embodiment)

Although the first embodiment has been constructed in a manner such that the initiator designates only a discrimination about whether the increase in the prefetch pool is requested or not by "i" bit in the connection command, the initiator can also request the increase by designating the increase number. In this case, it is sufficient to increase the number of bits in the "i" field in the connection command in FIG. 10 and indicate the increase number. Further, although the first embodiment has been constructed in a manner such that the reserved areas corresponding to the prefetch pool for the queue on the initiator side are set only at the time of the connection, the reserved areas can be also increased or decreased anytime other than the time of the connection. In this case, the increased amount of the reserved areas is set so as not to exceed the value in the Current-POOL counter, the number of reserved areas is increased and the count value in the Current-POOL counter is decreased within such a range. To decrease it, when the number of ORBs (in the current ORB list) which is shown by the count value in the Current-QUE counter and belongs to the relevant queue is lower than the number of reserved areas, the count value can be decreased in a range such that a difference between the number of ORBs and the number of reserved areas is set to an upper limit and a range in which the number of reserved areas after the reduction is equal to or larger than 1 in such a range. In this case, the number of reserved areas is reduced within such a range and the count value in the Current-POOL counter is increased.

Even in this embodiment, the following effects are obtained in a manner similar to those in the first embodiment. The SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included there.

Therefore, for example, in case of a digital hybrid apparatus such as scanner, printer, or the like having a plurality of functions, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target at any time. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that communicating efficiency and resource using efficiency of the target are improved. Since the command pool area of the target is increased or decreased in accordance with the number of queues which are used for connection, the resource using efficiency of the target is improved.

(Fourth Embodiment)

In the embodiment, although the increase or decrease of the prefetch pool is designated by the "i" bit 309e of the connection command (FIG. 10) and the disconnection command (FIG. 23), the "POOL_Dec" field, or the like or the value designated in the "POOL_Inc" field in the connection status (FIG. 14) is used, independent commands for increasing or decreasing the prefetch pool can be also provided in place of them.

Figure 25:
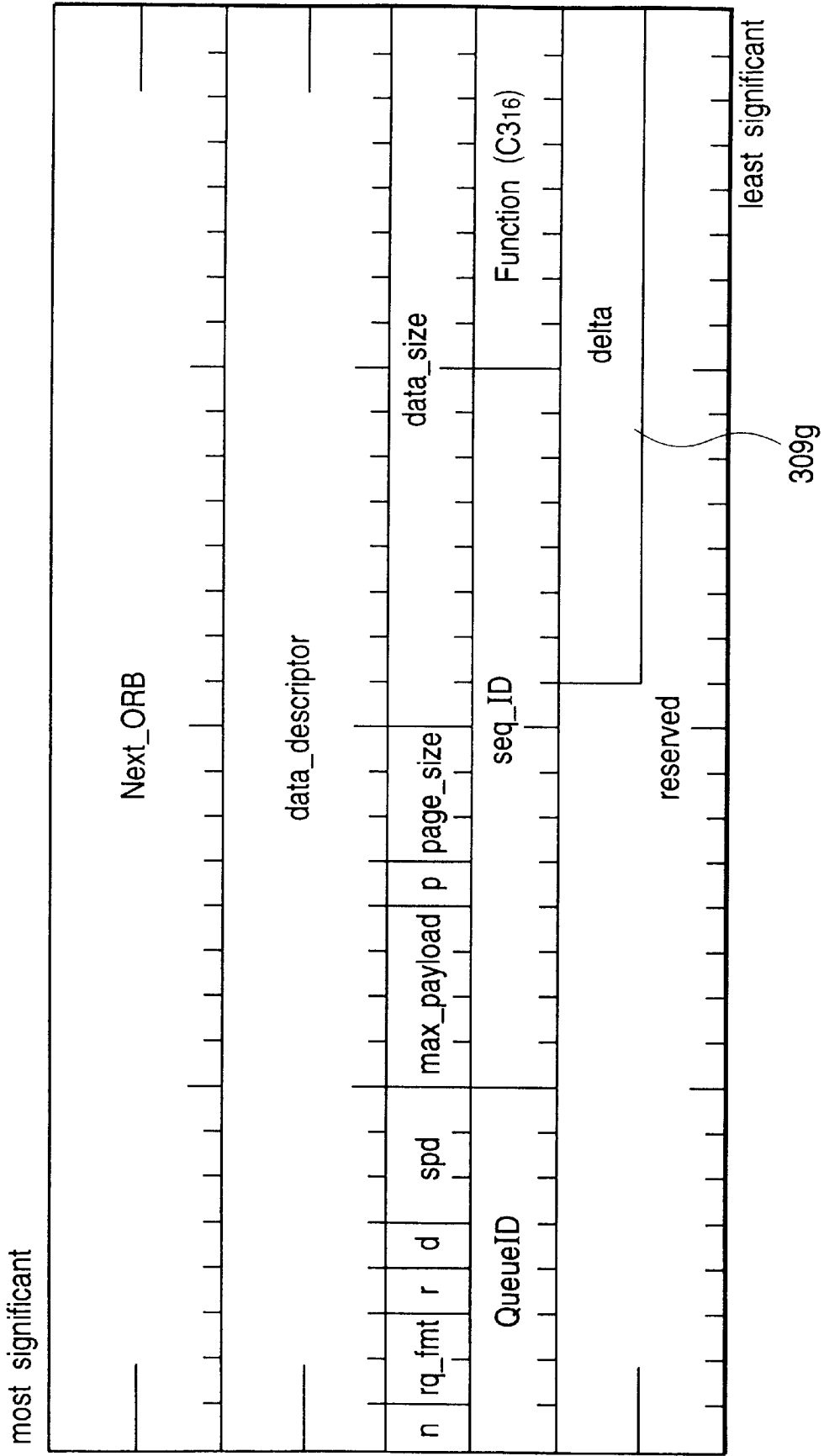
FIG. 25 is a diagram showing a format of a prefetch pool capacity change command.

FIG. 25 shows a format of a prefetch pool capacity changing command (function code=C3H). In FIG. 25, a "delta" field 309g shows a numerical value with a sign of a format of a complement of 2. If this field is positive, the increase in the prefetch pool is instructed to the target. If it is negative, the decrease in the prefetch pool is instructed to the target. The target actually increases or decreases the prefetch pool in response to the instruction of the command.

In case of using the command, when the opening request from the client of the initiator is processed, if the increase in the prefetch pool is necessary, prior to step S2507 in FIG. 16, the initiator issues a prefetch pool changing command, thereby increasing the prefetch pool. Since the target has already received the prefetch pool changing command separately if necessary before step S2607 in FIG. 17, only the pointers or the like for the reference queues are formed. When the closing request from the client of the initiator is processed, after the disconnection command succeeds (step S2703), the prefetch pool capacity changing command is issued, thereby reducing the prefetch pool. Since the prefetch pool capacity changing command ought to be issued from the initiator later, in the process (FIG. 22) of the disconnection command, only the pointers or the like which are used for the reference queues are deleted and the prefetch pool is not decreased in step S2806.

Even in this embodiment, the following effects are obtained in a manner similar to those in the first embodiment. The SHPT-2 processor and ORB dispatcher identify the queue identifier and each of them independently executes the process, namely, performs the formation and process of the ORB every queue, so that a multiconnection (channel) by a plurality of queues can be realized. In this case, even in one piece of equipment, an asynchronous communication can be performed every client by allocating one connection (channel) to each of a plurality of clients included there.

Therefore, for example, in case of a digital hybrid apparatus, if an application serving as a client is provided for each of the scanners and printers which the hybrid apparatus has, the hybrid apparatus can be used by the host computer connected thereto as if each function were independent equipment. As shown in the flowcharts, since the management of each queue and the execution agent are logically independent processes, the multiconnection (channel) can be easily realized.

By using two queues which are identified by QueueID for one connection, a data exchange can be performed bidirectionally between the initiator and the target by a simple control procedure. That is, the initiator can send desired data to the target at any time. The target can read out the data sent from the initiator in accordance with circumstances of the target itself. So long as the initiator is prepared, the target can send data to the initiator any time irrespective of a spontaneous purpose or a request from the initiator. Even if the bus reset occurs, the continuation of the processes from the intermitted state just before the bus reset can be guaranteed.

Further, the initiator dynamically performs the allocation of the whole command pool area of the target on the multiplex path by the queue, so that communicating efficiency and resource using efficiency of the target are improved. Since the command pool area of the target is increased or decreased in accordance with the number of queues which are used for connection, the resource using efficiency of the target is improved.

According to the invention as described above, an asynchronous bidirectional communication can be performed and its multichannel can be realized by one login between the initiator and the target and the resources such as processes and memory which are necessary for data exchange can be efficiently used.

Since the IEEE1394 interface is used, in the data transmission to the target side, the target can read out the data in accordance with its circumstances and a situation such that the initiator is occupied by the data transmission due to the circumstances of the target can be prevented.

Since the SBP-2 protocol is used, only the ORB is queued in the target and the data itself which is actually transmitted is stored in the initiator for a process waiting period of time. Thus, a capacity of the memory resources of the target can be reduced.

By holding the latest processing state, even if the bus reset occurs, the process can be restarted from the state just before the bus reset after the bus reset, and the normal continuation of the processes can be guaranteed.

The number of commands which can be transmitted from the initiator to the target is not managed every queue of the target but is unitarily managed, so that the resources can be efficiently used.

By dynamically allocating the whole command pool area of the target on the multiplex path due to the queues by the initiator, the communicating efficiency and the resource using efficiency of the target are improved. The command pool areas of the target are increased or decreased in accordance with the number of queues which are used for connection. Thus, the resource using efficiency of the target can be improved.

The set of a desired request queue and its management agent and the set of the corresponding reference queue and the execution agent, namely, desired paths can be extinguished at a desired timing irrespective of the state of the path.

Even when the AbortTaskSet command in the SBP-2 layer is issued, as for the queue (path) without an error, the process can be returned to the state before the execution of the AbortTaskSet command without anticipation by the client process. With regard to the queue (path) having an error, although the contents are erased, the aborted command can be continued or the process can be resumed from a new command in accordance with the client process.

What is claimed is:

1. A communication control method of communicating between an initiator and a target through a plurality of paths, wherein the initiator, using at least one of the plurality of paths, transmits an erase command of a desired path different from the at least one path to said target, when the erase command is received from the initiator, the target aborts the communication using the desired path, erases the target side of the desired path, and sends a response to the initiator, and when the response is received from the target, the initiator erases the initiator side of the desired path.

2. A method according to claim 1, wherein when the communication using the desired path is aborted, if the command received from the desired path is being executed, the target aborts the execution.

3. A method according to claim 1, wherein when the response is received from the target, the initiator erases a command in a process waiting state to erase the initiator side of the desired path.

4. A method according to claim 1, wherein when the command is transmitted from the initiator through the path in which the target side has been erased, the target informs the initiator of a fact that the destination is incorrect.

5. A communication control method of communicating between an initiator connected through a plurality of paths and a target having a function to erase all commands in the paths by an abort command from the initiator, wherein when the abort command is received from the initiator, the target erases all of the commands in the paths, aborts an execution of a command which is being executed, stores an identifier of the aborted command and a position of unprocessed data, erases said command, and sends a response showing this fact to the initiator, when said response is received from the target, the initiator discriminates the presence or absence of an error for each of the plurality of paths, re-transmits the command to which the identifier of the command aborted by the target has been assigned and the subsequent commands to the target with respect to the path having no error, and cancels all of the aborted command and subsequent commands with respect to the path having an error, and when the command transmitted from the initiator is received after the process of said aborted command, the target discriminates whether said command has the same identifier as that of the aborted command or not, and resumes the process of said command from the stored position of the unprocessed data if it has the same identifier.

6. A method according to claim 5, wherein the initiator notifies a requesting source which issued the aborted command of a fact that the command was aborted with respect to the path having an error after the reception of the response from the target, and when a request to re-transmit said command is issued from the requesting source, the initiator issues a command having the same identifier as that of the aborted command to the target.

7. A communication system for communicating between an initiator and a target through a plurality of paths,
   wherein the initiator, using at least one of the plurality of paths, transmits an erase command of a desired path different from the at least one path to the target,
   when the erase command is received from the initiator, the target aborts the communication using the desired path, erases the target side of the desired path, and sends a response to the initiator, and
   when the response is received from the target, the initiator erases the initiator side of the desired path.

8. A system according to claim 7, wherein when the communication using the desired path is aborted, if the command received from the desired path is being executed, the target aborts the execution.

9. A system according to claim 7, wherein when the response is received from the target, the initiator erases a command in a process waiting state to erase the initiator side of the desired path.

10. A system according to claim 7, wherein when the command is transmitted from the initiator through the path in which the target side has been erased, the target informs the initiator of a fact that the destination is incorrect.

11. A communication system for communicating between an initiator connected through a plurality of paths and a target having a function to erase all commands in said paths by an abort command from said initiator,
   wherein when the abort command is received from said initiator, said target erases all of the commands in said paths, aborts an execution of a command which is being executed, stores an identifier of the aborted command and a position of unprocessed data, erases said command, and sends a response showing this fact to said initiator, and when the command transmitted from said initiator is received after the process of said aborted command, said target discriminates whether said command has the same identifier as that of the aborted command or not, and resumes the process of said command from the stored position of the unprocessed data if it has the same identifier, and
   when said response is received from said target, said initiator discriminates the presence or absence of an error for each of said plurality of paths, re-transmits the command to which the identifier of the command aborted by said target has been assigned and the subsequent commands to the target with respect to the path having no error, and cancels all of the aborted command and subsequent commands with respect to the path having an error.

12. A system according to claim 11, wherein said initiator notifies a requesting source which issued the aborted command of a fact that the command was aborted with respect to the path having an error after the reception of the response from said target, and when a request to re-transmit said command is issued from said requesting source, said initiator issues a command having the same identifier as that of the aborted command to the target.

13. A computer-readable storage medium which stores a program for communicating with a target connected through a plurality of paths by an initiator,
   wherein said program realizes a function such that, using at least one of the plurality of paths an erase command of a desired path different from at least one path is transmitted to the target, the initiator side of the desired path is erased when a response is received from the target.

14. A computer-readable storage medium which stores a program for communicating with a target by an initiator connected through a plurality of paths, said target having a function to erase all commands in said paths by an abort command from said initiator,
   wherein said program realizes a function such that from said target, all of the commands in said paths are erased in accordance with said abort command, an execution of a command which is being executed is also aborted, an identifier of said aborted command and a position of unprocessed data are stored, and when a response showing that said commands were erased is received, the presence or absence of an error is discriminated for each of said plurality of paths, the command to which the identifier of the command aborted by said target has been assigned and subsequent commands are re-transmitted to said target with respect to the path having no error, and all of the aborted command and subsequent commands are cancelled with respect to the path having an error.

15. A communication system for communicating between an initiator connected through a plurality of paths and a target having a function to erase all commands in said paths by an abort command from said initiator, wherein said initiator uses at least one of said plurality of paths and transmits an erase command of a desired path different from said path to said target, and when a response is received from said target, said initiator erases the initiator side of the path as a target of the erasure,
   when said erase command is received, said target aborts the communication using said desired path, erases the target side of said path, and sends a response showing this fact to said initiator,
   when the abort command is received from said initiator, said target erases all of the commands in said paths, aborts an execution of a command which is being executed, stores an identifier of the aborted command and a position of unprocessed data, erases said command, and sends a response showing this fact to said initiator, and when the command transmitted from said initiator is received after the process of said aborted command, said target discriminates whether said command has the same identifier as that of the aborted command or not, and resumes the process of said command from the stored position of the unprocessed data if it has the same identifier, and
   said response is received from said target, said initiator discriminates the presence or absence of an error for each of said plurality of paths, re-transmits the command to which the identifier of the command aborted by said target has been assigned and the subsequent commands to the target with respect to the path having no error, and cancels all of the aborted command and subsequent commands with respect to the path having an error.

16. A system according to claim 15, wherein said erase command is issued from the user who uses said initiator.

17. A system according to claim 15, wherein said abort command is issued when said initiator detects the error.

18. A communication control method of communicating through a plurality of paths between an initiator and a target that has a function to erase all commands in the paths by an abort command from the initiator, wherein when the abort command is received from the initiator, the target erases all of the commands in the paths, aborts an execution of a command which is being executed, stores an identifier of the aborted command and a position of unprocessed data, and sends a response to the initiator, when the response is received from the target, the initiator discriminates the presence or absence of an error for each of the plurality of paths, re-transmits the command to which the identifier of the aborted command has been assigned and the subsequent commands to the target with respect to the path having no error, and cancels the command with respect to the path having an error, and when the command transmitted from the initiator is received after the process of the abort command, the target discriminates whether the command has the same identifier as that of the aborted command or not, and resumes the process of the command from the stored position of the unprocessed data if it has the same identifier.

19. A communication control method of communicating through a plurality of paths between an initiator and a target that has a function to erase all commands in the paths by an abort command from the initiator, wherein when the abort command is received from the initiator, the target erases all of the commands in the paths, aborts an execution of a command which is being executed, stores an identifier of the aborted command and a position of unprocessed data, and sends a response to the initiator, when the response is received from the target, the initiator discriminates the presence or absence of an error for each of the plurality of paths, re-transmits all outstanding commands for which the initiator has not received the response from the target and the subsequent commands to the target with respect to the path having no error, and cancels all outstanding commands with respect to the path having an error, and when the command transmitted from the initiator is received after the process of the abort command, the target discriminates whether the command has the same identifier as that of the aborted command or not, and resumes the process of the command from the stored position of the unprocessed data if it has the same identifier.

20. An apparatus for communicating with an external apparatus through a plurality of paths, wherein said apparatus, using at least one of the plurality of paths, receives an erase command of a desired path different from the at least one path from the external apparatus, aborts the communication using the desired path, erases the target side of the desired path, and sends a response to the external apparatus, and when the external apparatus receives the response from said apparatus, the external apparatus erases the initiator side of the desired path.

21. An apparatus for communicating with an external apparatus through a plurality of paths and having a function to erase all commands in the paths by an abort command from the external apparatus, wherein when the abort command is received from the external apparatus, said apparatus erases all of the commands in the paths, aborts an execution of a command which is being executed, stores an identifier of the aborted command and a position of unprocessed data, and sends a response to the external apparatus, when the command transmitted from the external apparatus is received after the process of the abort command, said apparatus discriminates whether the command has the same identifier as that of the aborted command or not, and resumes the process of the command from the stored position of the unprocessed data if it has the same identifier.

22. A communication control method for a target that communicates with an initiator through a plurality of paths, comprising:

an erasure step, of, in response to an erasure command of a designated path from the initiator, aborting communication using the designated path and erasing that path; and a sending step, of sending a response reporting the erasure of the path to the initiator so as to allow the initiator to erase the designated path.

23. A method according to claim 22, wherein if a command that was received through the designated path is being executed, said erasure step aborts the execution of the command.

24. A method according to claim 22, wherein when a command is received from the initiator through one of the plurality of paths which has been erased in the target, said sending step sends the response reporting an incorrect destination to the initiator.

25. A communication control method for an initiator that communicates with a target through a plurality of paths, comprising:

a transmission step, of transmitting, through at least one of the plurality of paths, an erasure command of a designated path different from the at least one path to the target; and an erasure step, of erasing the designated path when a response is received from the target.

26. A method according to claim 25, wherein when the response is received from the target, said erasure step erases a command which was transmitted to the target for execution, but for which completion of execution has not been informed from the target, and then erases the designated path.

27. An apparatus that communicates with a target through a plurality of paths, comprising:

transmission means for transmitting, through at least one of the plurality of paths, an erasure command of a designated path different from the at least one path to the target; and erasure means for erasing the designated path when a response is received from the target.

28. An initiator according to claim 27, wherein when the response is received from the target, said erasure means erases a command which was transmitted to the target for execution, but for which completion of execution has not been informed from the target, and then erases the designated path.

* * * * *

UNITED STATES PATENT AND TRADEMARK OFFICE
CERTIFICATE OF CORRECTION

PATENT NO. : 6,647,016 B1
DATED : November 11, 2003
INVENTOR(S) : Takashi Isoda et al.

It is certified that error appears in the above-identified patent and that said Letters Patent is hereby corrected as shown below:

Title page,
Item [56], References Cited, OTHER PUBLICATIONS, second occurrence, "Ueda S.," should read -- Ueda, S., --.

Drawings,
Sheet 15, Fig. 13, "ORB_offset_Io" should read -- ORB_offset-lo --.
Sheet 16, Fig. 14, "ORB_offset_Io" should read -- ORB_offset-lo --.
Sheet 17, Fig. 15, "ORB_offset_Io" should read -- ORB_offset-lo --.
Sheet 36, Fig. 34, "CANCELATION" should read -- CANCELLATION --.
Sheet 38, Fig. 36, "0(D0 not care)" should read -- O(Do not care) --;
Sheet 38, Fig. 36, "0(D0 not care)" should read -- O(Do not care) --;
Sheet 38, Fig. 36, "0(D0 not care)" should read -- O(Do not care) --;
Sheet 38, Fig. 36, "reguired)" should read -- required) --.
Sheet 39, Fig. 37, "ORB_offset_Io" should read -- ORB_offset_lo --; and
Sheet 39, Fig. 37, "COMLETE)" should read -- COMPLETE) --.
Sheet 41, Fig. 39, "dinvalid→4000" should read -- invalid→4000 --.

Column 5,
Line 67, "and" should be deleted.

Column 7,
Line 66, "manages a" should read -- manages --.

Column 11,
Line 40, "locating" should read -- located --;
Line 50, "ORBS." should read -- ORBs. --; and
Line 66, "every" should read -- for every --.

Column 12,
Line 45, "locating" should read -- located --.

Column 15,
Line 42, "process" should read -- process for --.

Column 22,
Line 36, "performed" should read -- performed for --.

UNITED STATES PATENT AND TRADEMARK OFFICE
CERTIFICATE OF CORRECTION

PATENT NO.    : 6,647,016 B1
DATED         : November 11, 2003
INVENTOR(S)   : Takashi Isoda et al.

It is certified that error appears in the above-identified patent and that said Letters Patent is hereby corrected as shown below:

Column 25,
Line 47, "SBP2" should read -- SBP-2 --;
Line 48, "locating" should read -- located --; and
Line 58, "black" should read -- block --.

Column 26,
Line 54, "QueneID)" should read -- queue ID) --.

Column 30,
Line 21, "the a" should read -- the --; and
Line 28, "abortion" should read -- abortion by --.

Column 35,
Line 3, "performed" should read -- performed by --.

Column 36,
Line 4, "performed" should read -- performed by --.

Column 37,
Line 12, "performed" should read -- performed by --.

Column 40,
Line 8, "paths" should read -- paths, --.

Signed and Sealed this

Twenty-eighth Day of September, 2004

JON W. DUDAS
*Director of the United States Patent and Trademark Office*